(12) United States Patent
Kozar et al.

(10) Patent No.: US 11,135,805 B2
(45) Date of Patent: Oct. 5, 2021

(54) MULTI-COMPONENT FILMS

(71) Applicant: The Boeing Company, Chicago, IL (US)

(72) Inventors: Michael P. Kozar, Mercer Island, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 16/011,546

(22) Filed: Jun. 18, 2018

(65) Prior Publication Data

US 2018/0304574 A1   Oct. 25, 2018

Related U.S. Application Data

(63) Continuation-in-part of application No. 13/523,141, filed on Jun. 14, 2012, now Pat. No. 10,005,256.

(51) Int. Cl.
*B32B 3/10* (2006.01)
*B32B 3/18* (2006.01)
(Continued)

(52) U.S. Cl.
CPC .............. *B32B 5/14* (2013.01); *B29C 48/08* (2019.02); *B29C 48/21* (2019.02); *B32B 3/18* (2013.01); *B32B 3/28* (2013.01); *B32B 3/30* (2013.01); *B32B 7/02* (2013.01); *B32B 7/12* (2013.01); *B32B 2307/412* (2013.01);
(Continued)

(58) Field of Classification Search
CPC .... B32B 3/18; B32B 3/10; B32B 3/22; B32B 3/30; B32B 3/14; B32B 3/26; B32B 3/263; Y10T 428/24132; Y10T 428/24479; Y10T 428/24537
See application file for complete search history.

(56) References Cited

U.S. PATENT DOCUMENTS 3,569,995 A   3/1971   Mallon
4,409,274 A   10/1983  Chaplin et al.
(Continued)

FOREIGN PATENT DOCUMENTS

DE   102009043360   5/2011
DE   202011002787   5/2011
(Continued)

OTHER PUBLICATIONS

Russian Patent Office, Russian Office Action, Appl. No. 2017146000/05, dated Feb. 12, 2019.
(Continued)

*Primary Examiner* — Joanna Pleszczynska

(57) ABSTRACT

A non-fibrous film has at least one film body that is non-fibrous, and at least one film element that is non-fibrous. The film element is coupled to the film body at an interface that is non-continuous across a film width of the non-fibrous film. The non-fibrous film has at least one of the following characteristics: the interface has at least one mechanical property having a value that is different than the value of the mechanical property of at least one of the film element and the film body, and/or the film element has at least one mechanical property having a value that is different than the value of the mechanical property of the film body.

22 Claims, 37 Drawing Sheets

(51) Int. Cl.
*B32B 3/22* (2006.01)
*B32B 3/30* (2006.01)
*B32B 3/26* (2006.01)
*B32B 5/14* (2006.01)
*B32B 7/02* (2019.01)
*B29C 48/08* (2019.01)
*B29C 48/21* (2019.01)
*B32B 3/28* (2006.01)
*B32B 7/12* (2006.01)

(52) U.S. Cl.
CPC ... *B32B 2307/516* (2013.01); *B32B 2307/558* (2013.01); *B32B 2307/56* (2013.01); *B32B 2605/18* (2013.01); *Y10T 29/49* (2015.01); *Y10T 29/49826* (2015.01); *Y10T 156/10* (2015.01); *Y10T 428/24479* (2015.01); *Y10T 428/24694* (2015.01); *Y10T 428/24711* (2015.01); *Y10T 428/24802* (2015.01)

(56) References Cited

U.S. PATENT DOCUMENTS

| | | | |
|---|---|---|---|
| 4,465,729 A | 8/1984 | Cancio | |
| 4,704,315 A | 11/1987 | McClintock | |
| 5,080,957 A * | 1/1992 | Leseman | B29C 48/16 428/167 |
| 5,360,116 A | 11/1994 | Schmiletzky | |
| 5,580,629 A | 12/1996 | Dischler | |
| 5,665,450 A | 9/1997 | Day | |
| 5,993,929 A | 11/1999 | Bizer | |
| 7,393,577 B2 | 7/2008 | Day et al. | |
| 7,923,094 B1 * | 4/2011 | Harding | B29C 66/919 428/156 |
| 8,173,245 B2 * | 5/2012 | Montgomery | H01L 21/6835 428/172 |
| 9,960,389 B1 | 5/2018 | Hao et al. | |
| 2003/0087048 A1 * | 5/2003 | Chaussade | H05K 9/00 428/34 |
| 2005/0227564 A1 | 10/2005 | Bond | |
| 2007/0297702 A1 | 12/2007 | Zaggia | |
| 2009/0047482 A1 | 2/2009 | Starke | |
| 2009/0269538 A1 | 10/2009 | Buhring | |
| 2009/0286100 A1 | 11/2009 | Wadley et al. | |
| 2009/0311466 A1 | 12/2009 | Marissen | |
| 2009/0314429 A1 * | 12/2009 | Hoya | B32B 27/06 156/334 |
| 2010/0266833 A1 | 10/2010 | Dat et al. | |
| 2011/0028671 A1 * | 2/2011 | Backer | B29B 13/021 526/352 |
| 2011/0210161 A1 | 9/2011 | Madai | |
| 2011/0247958 A1 | 10/2011 | Lucas et al. | |
| 2012/0141786 A1 * | 6/2012 | Uh | H01L 21/6836 428/343 |

FOREIGN PATENT DOCUMENTS

| | | |
|---|---|---|
| EP | 2674293 | 12/2013 |
| GB | 1025623 | 4/1966 |
| JP | S61-143116 | 6/1986 |
| JP | S61143116 | 6/1986 |
| JP | 2005517101 | 6/2005 |
| RU | 2296054 | 3/2007 |
| WO | WO1989009129 | 10/1989 |
| WO | WO02094674 | 11/2002 |
| WO | WO2006016393 | 2/2006 |
| WO | WO2010066819 | 6/2010 |

OTHER PUBLICATIONS

JPO, Notice of Rejection, Appl. No. 2017-113193, dated Jun. 26, 2018.
JPO, Notice of Rejection, Appl. No. 2017-113193, dated Feb. 5, 2019.
BYK-Gardner GmbH, "Optics Pamphlet," retrieved on May 19, 2018.
JPO, Notice of Rejection, Appl. No. 2017-113193, dated Oct. 2, 2018.
JPO, Notice of Rejection, Appl. No. 2017-113193, dated Jul. 14, 2020.
Korean Patent Office, Korean Office Action, Appl. No. 10-2013-0049798, dated Nov. 22, 2019.
EPO, Extended European Search Report, dated Nov. 14, 2019.
EPO, European Search Report, dated Nov. 18, 2019.
Russian Office Action, Application No. 2017146000/05, dated Nov. 6, 2018.
European Search Report for Application No. 13170925.5-1305 dated Aug. 2, 2013.
Chinese Office Action for Application No. 201310236333.X dated Dec. 14, 2016.
Canadian Office Action, application No. 2,815,473, dated Jan. 5, 2017.
Japanese Office Action for Application No. 2013-121598 dated Feb. 2, 2017.
Canadian Office Action, Application No. 2,815,473, dated May 24, 2016.
Russian Office Action for Application No. 2013126911/05 dated Apr. 21, 2017.
Canadian Office Action, application No. 2,815,473, dated Aug. 9, 2017.
Russian Office Action for Application No. 2013126911/05, dated Aug. 16, 2017.
European Search Report for EP Application No. 13170925.5 dated Oct. 18, 2017.
GCC Patent Office, Examination Report for Application No. GC 2013-24637 dated Oct. 24, 2017.
European Search Report for EP Application No. 13170925.5 dated Dec. 18, 2013.
Australian Office Action for Application No. 2013205456 dated Dec. 2, 2015.
Korean Patent Office, Korean Office Action, Appl. No. 10-2013-0049798, dated May 24, 2019.
EPO, European Search Report, dated Feb. 19, 2020.
EPO, European Examination Report, dated Jun. 8, 2021.

* cited by examiner

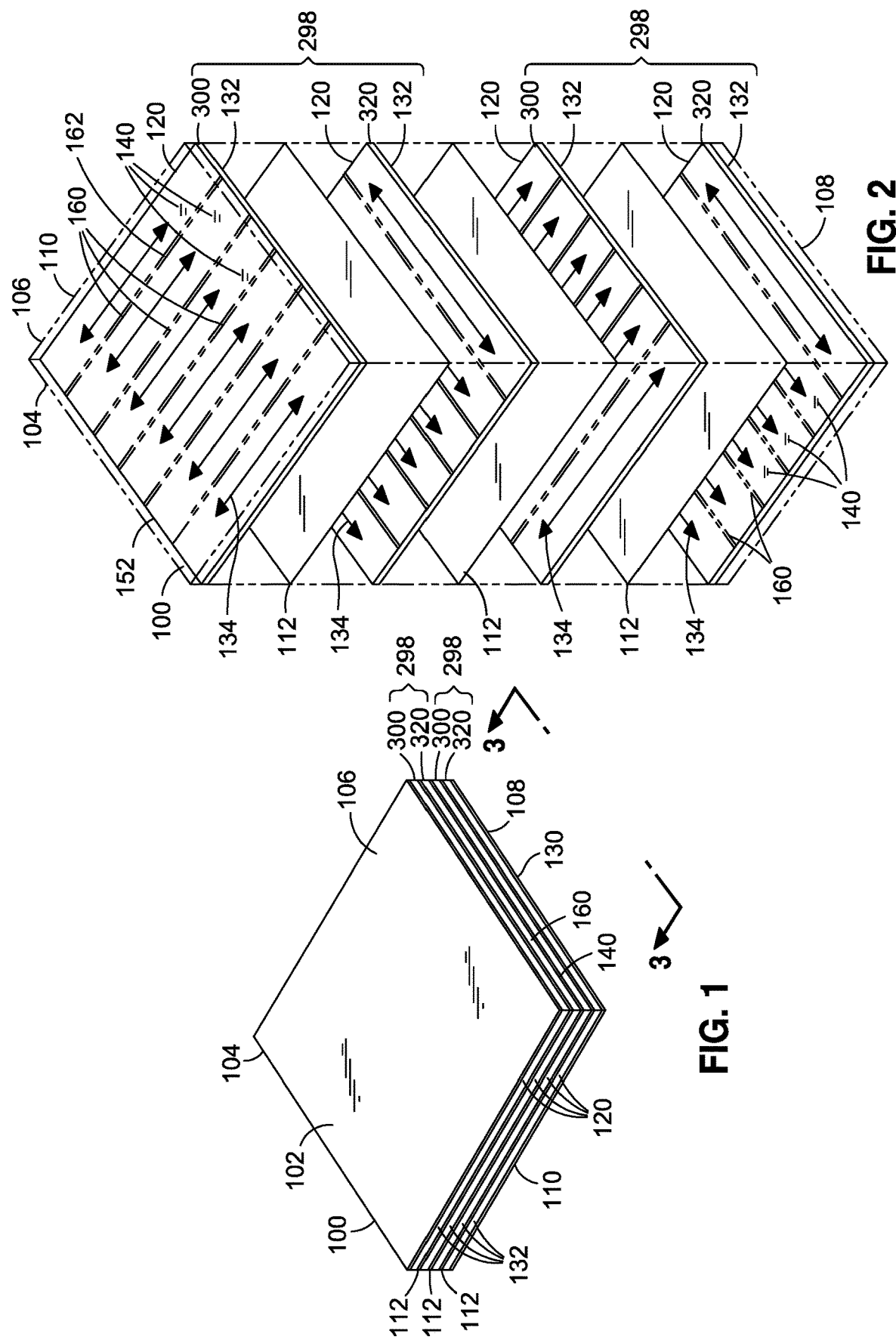

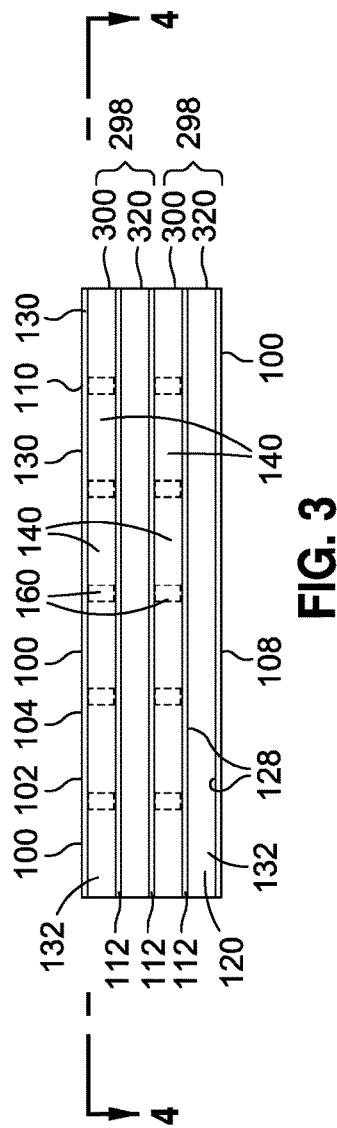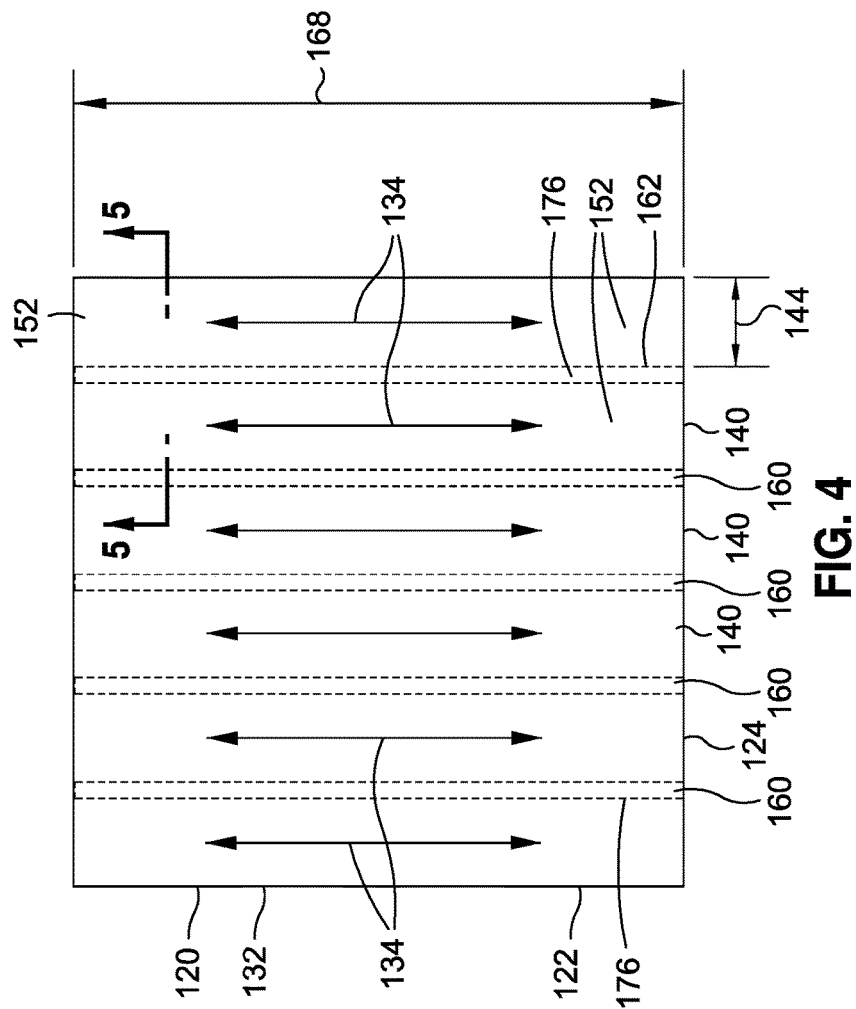

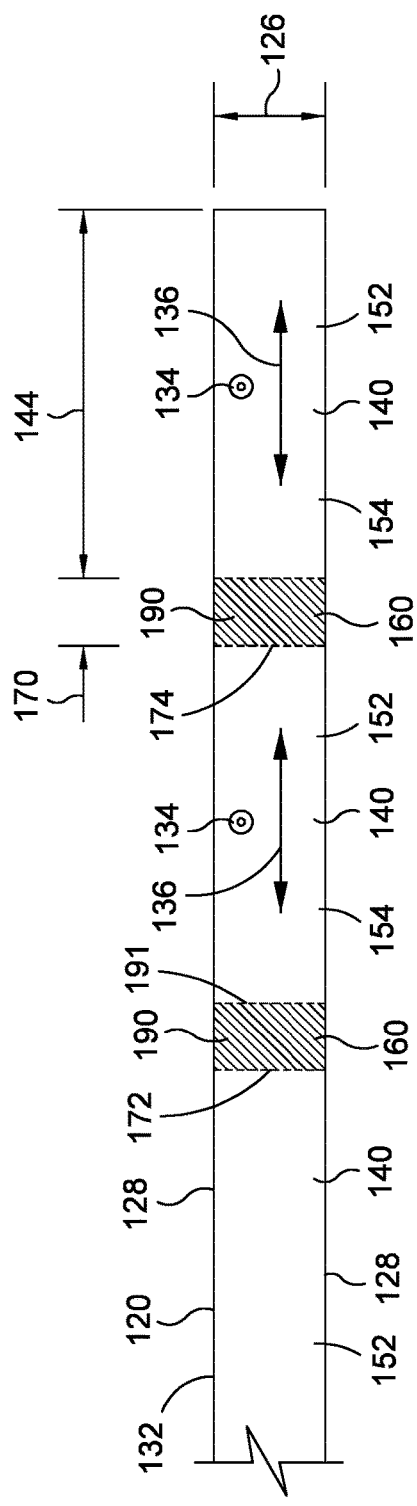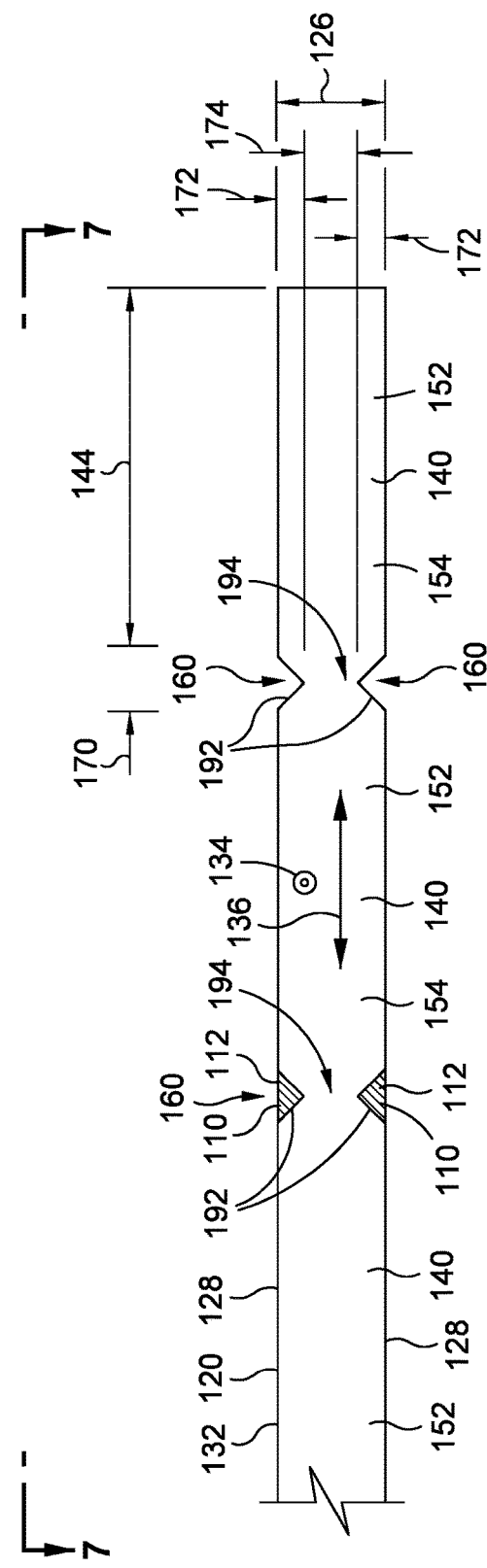

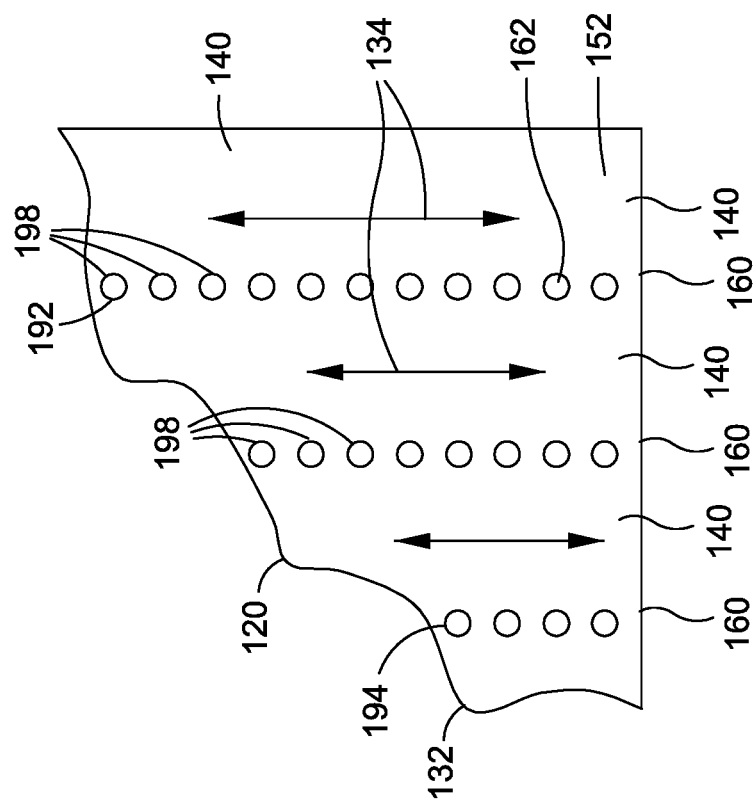
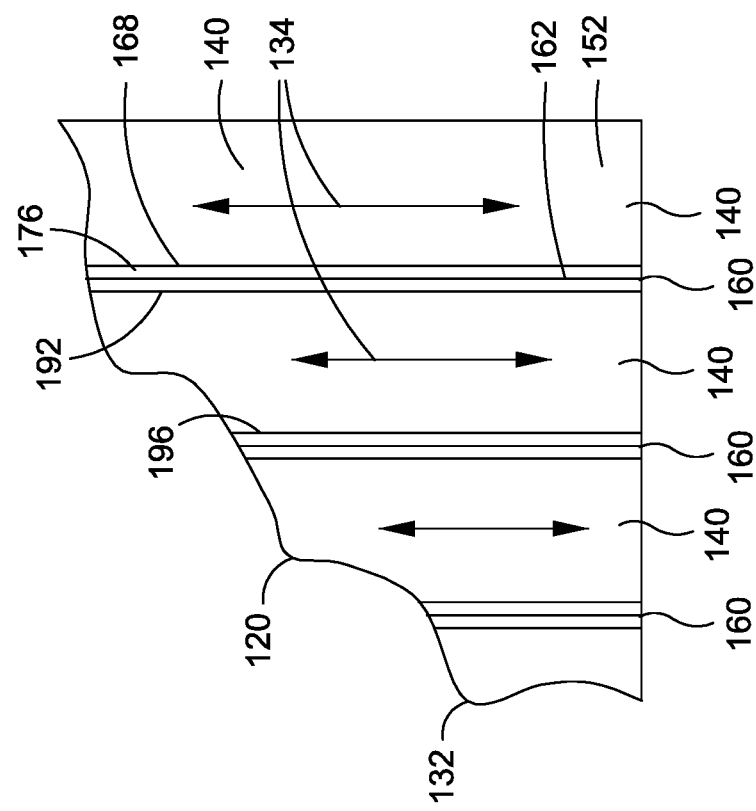

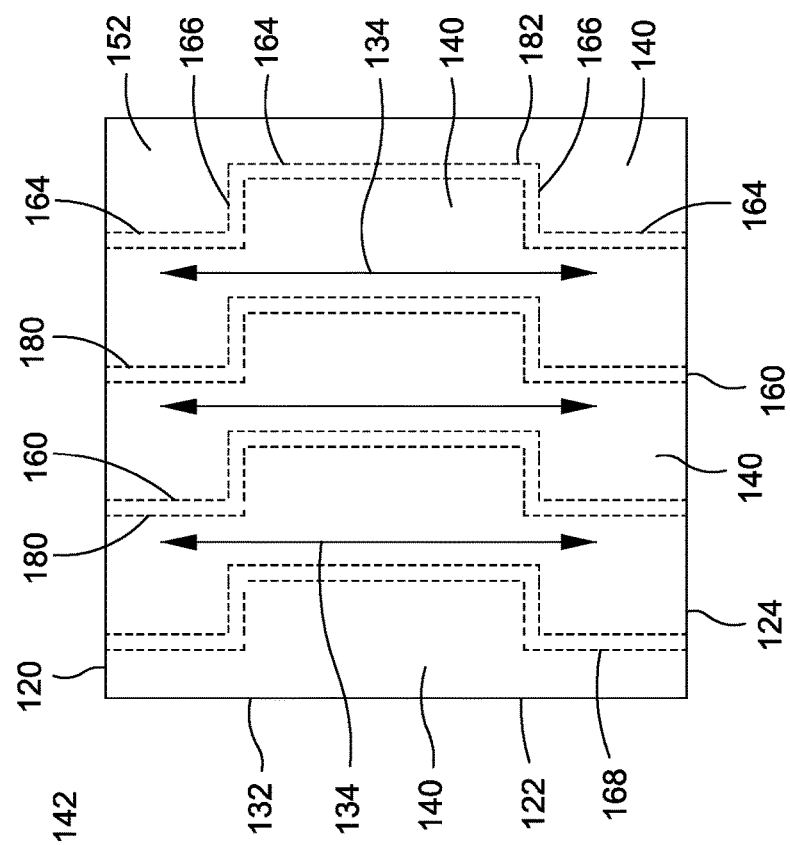
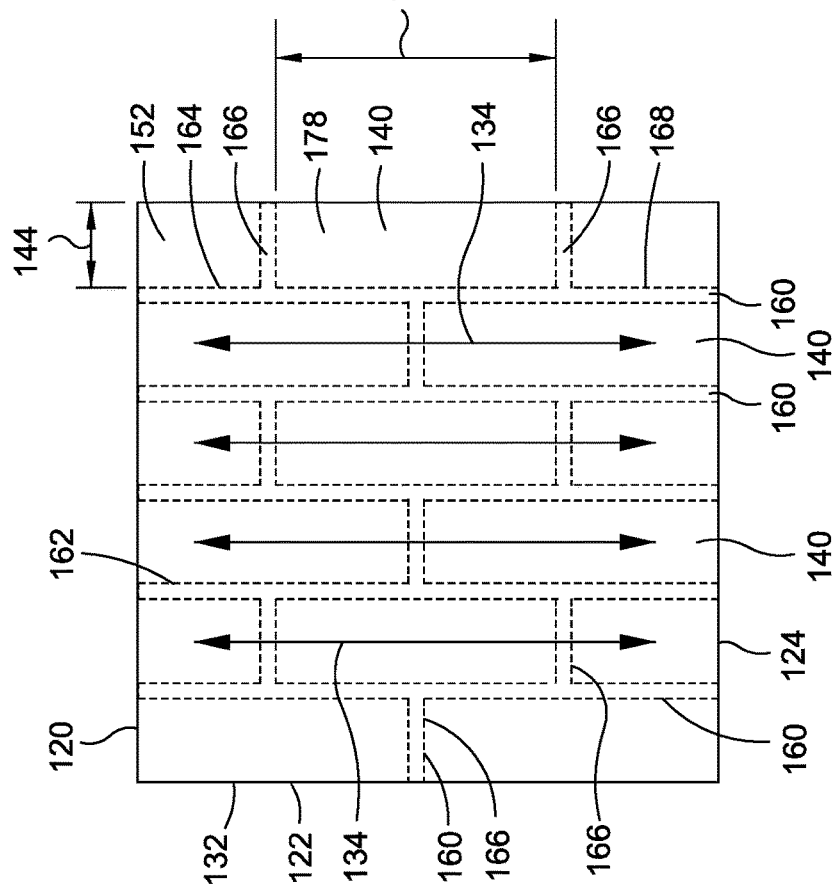

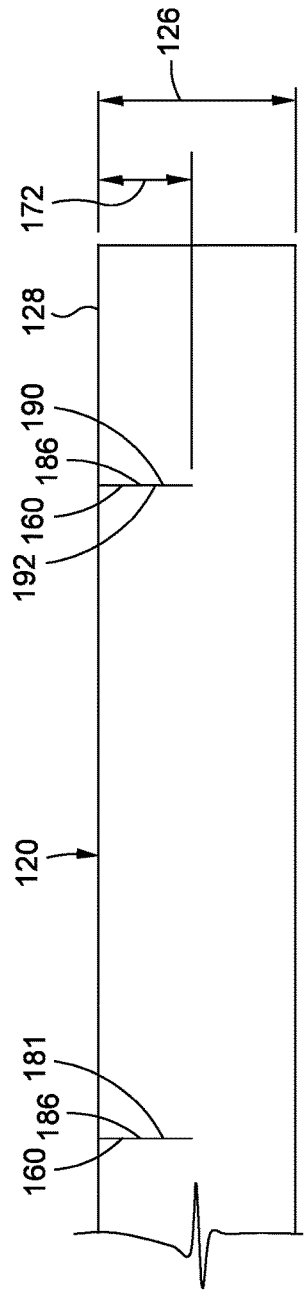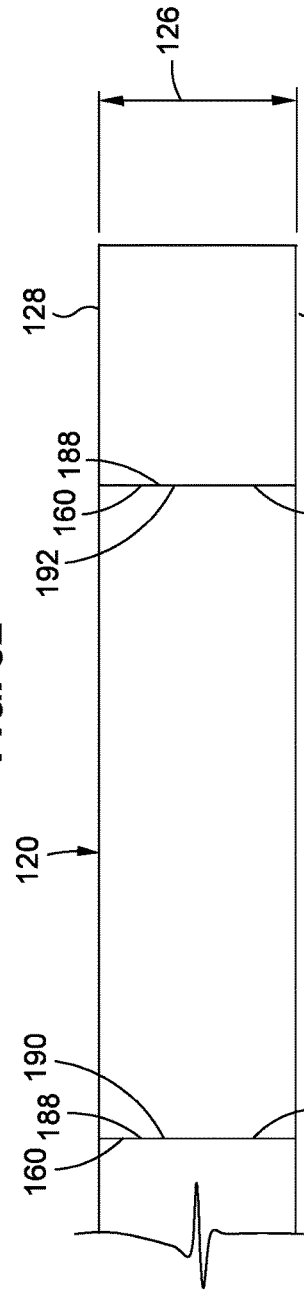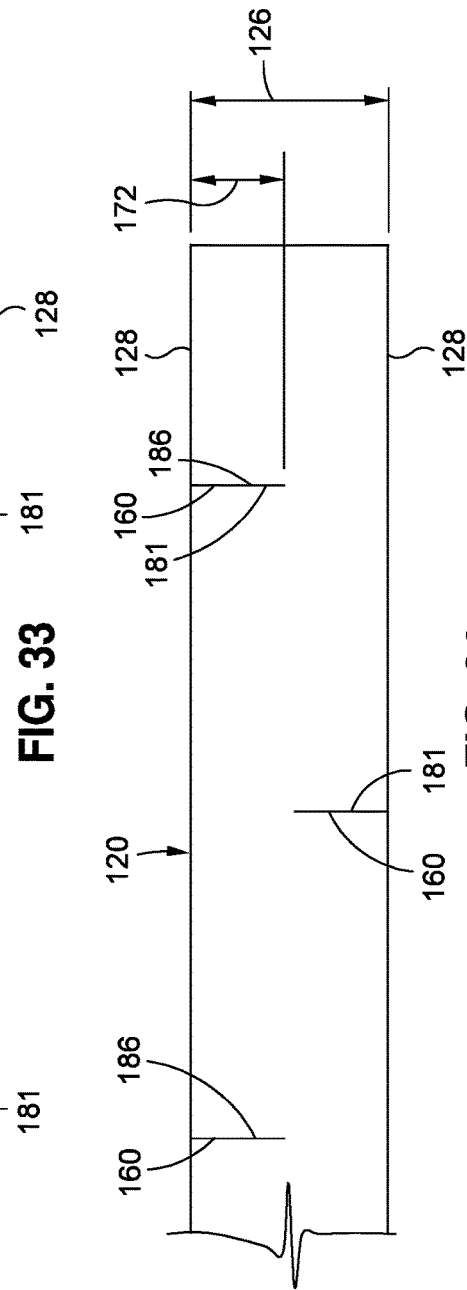

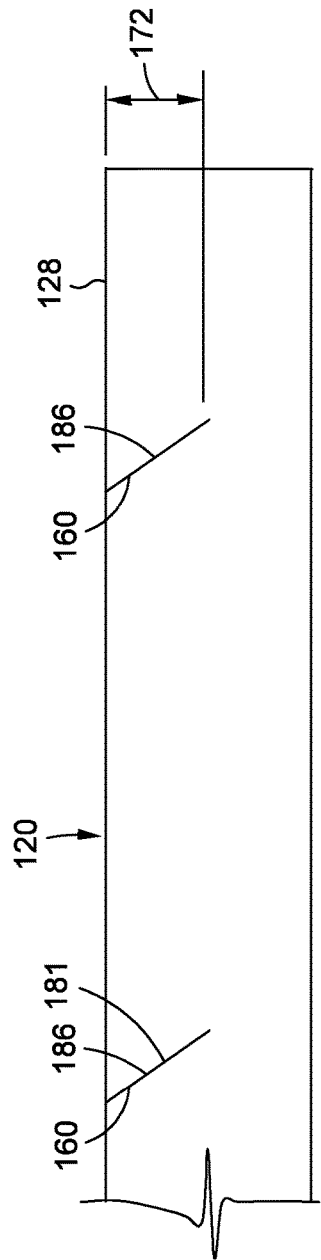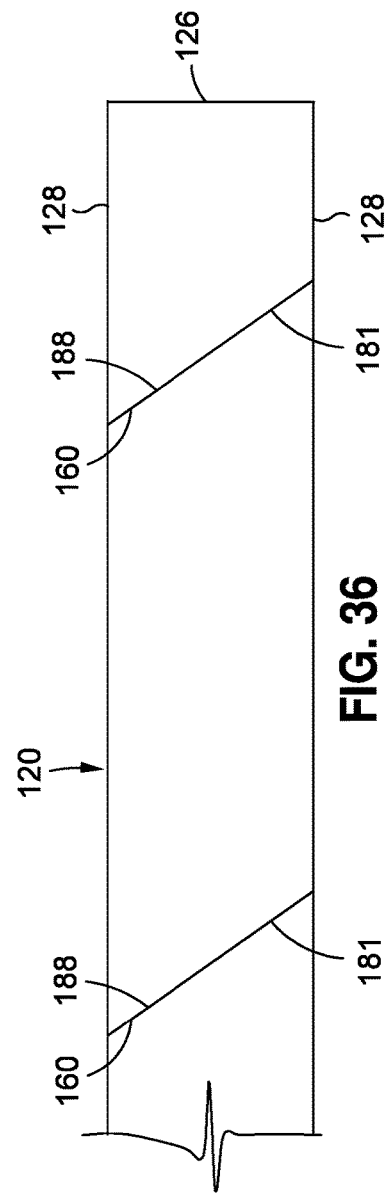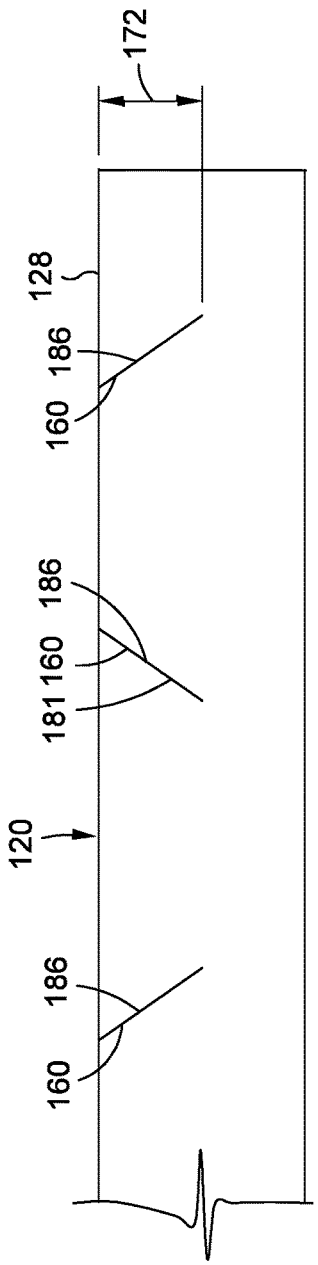

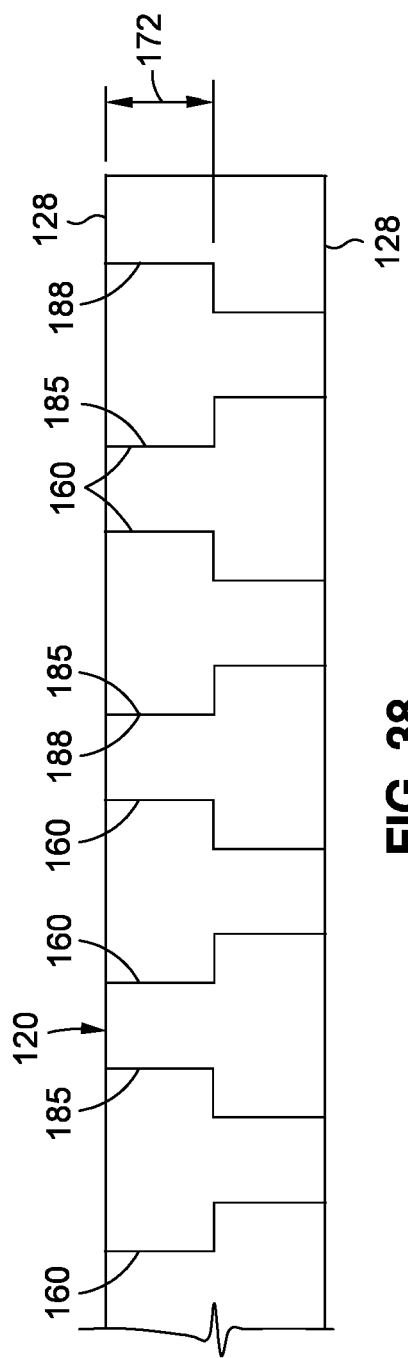
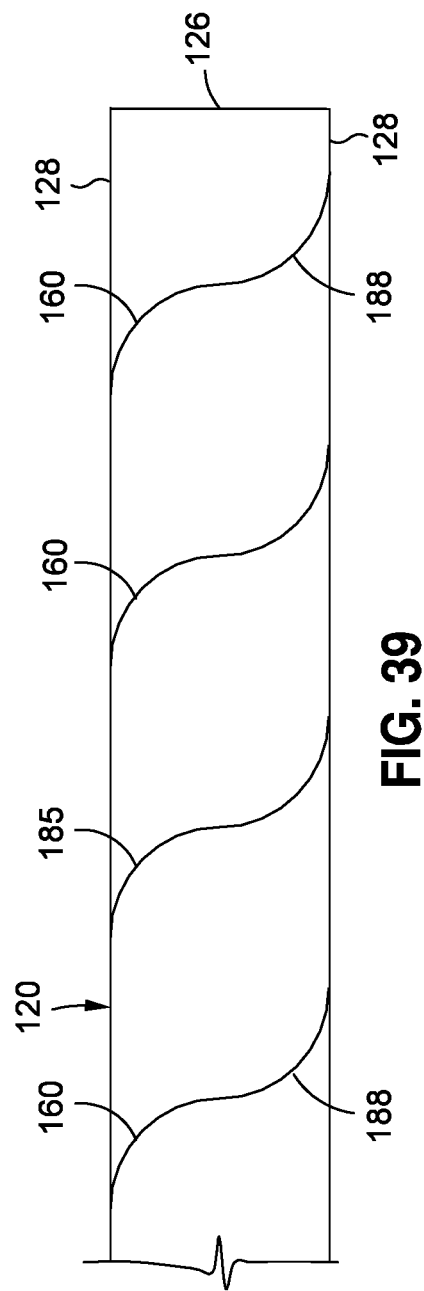
FIG. 38
FIG. 39

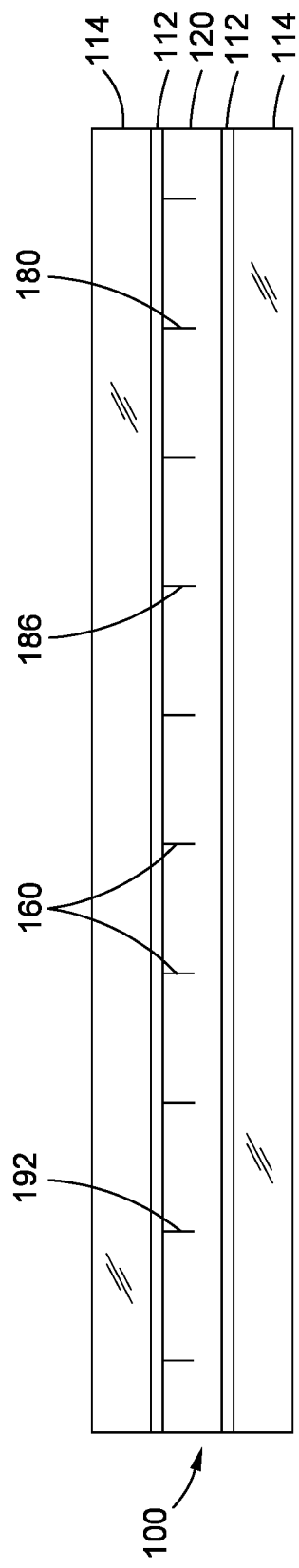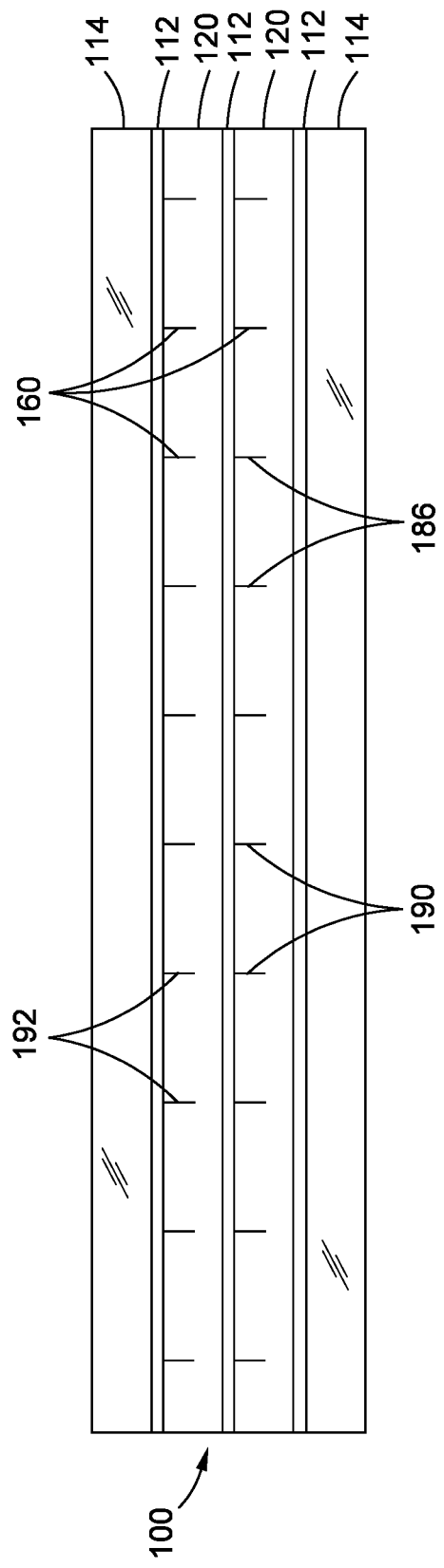

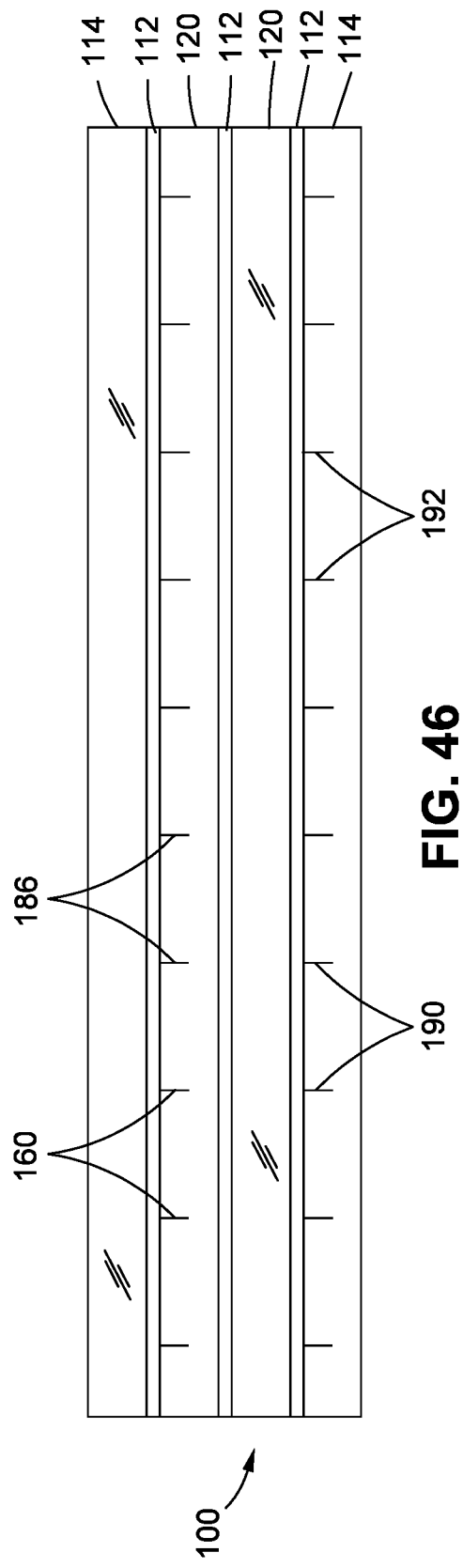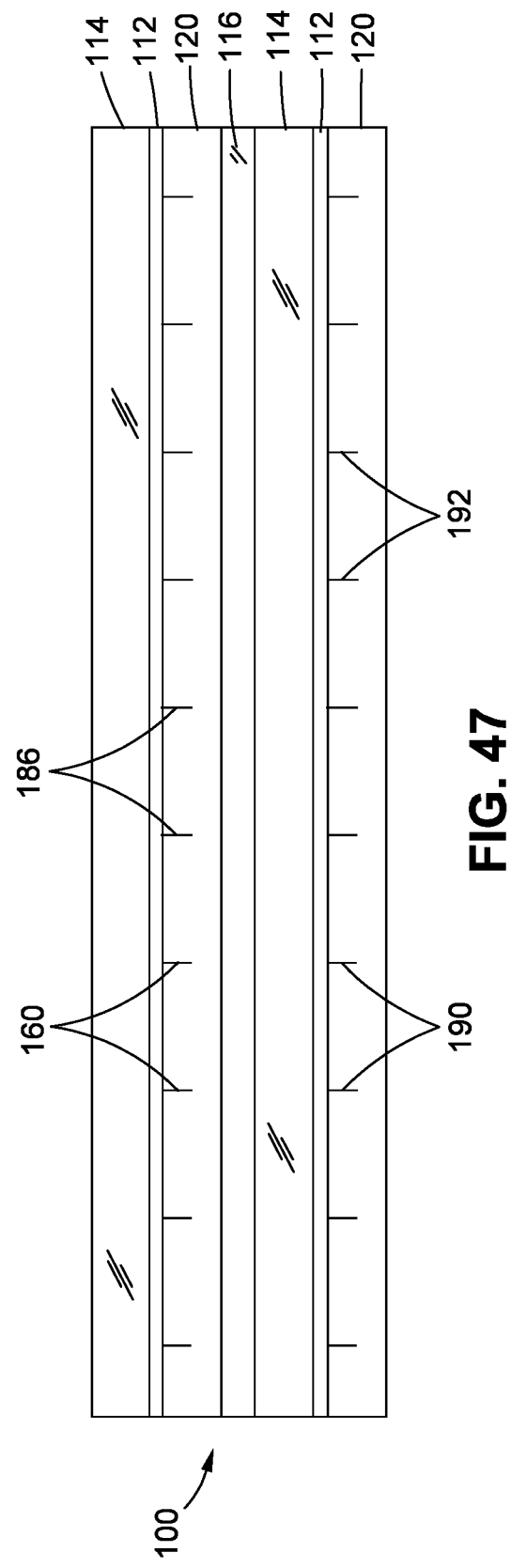

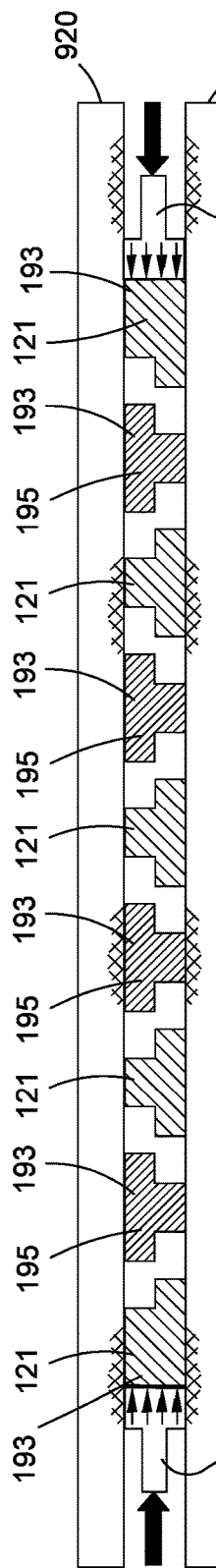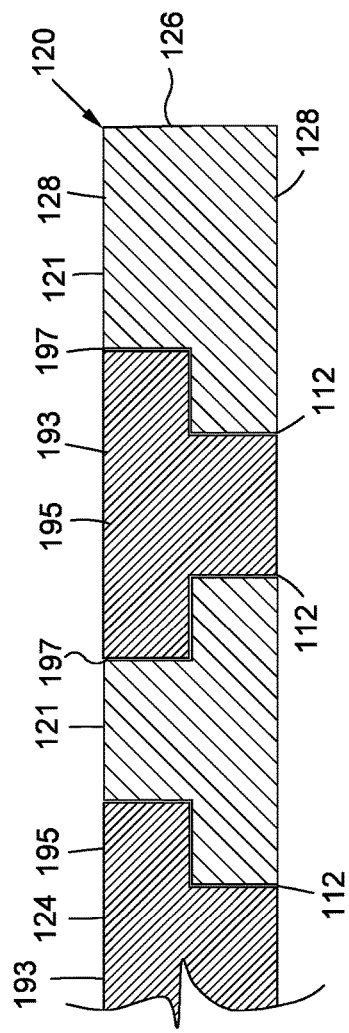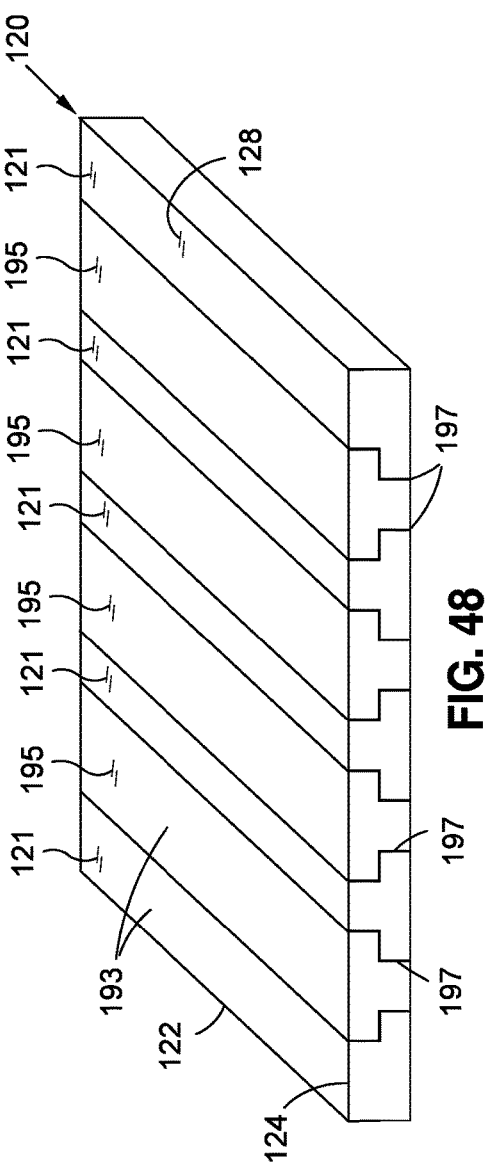
FIG. 50
FIG. 49
FIG. 48

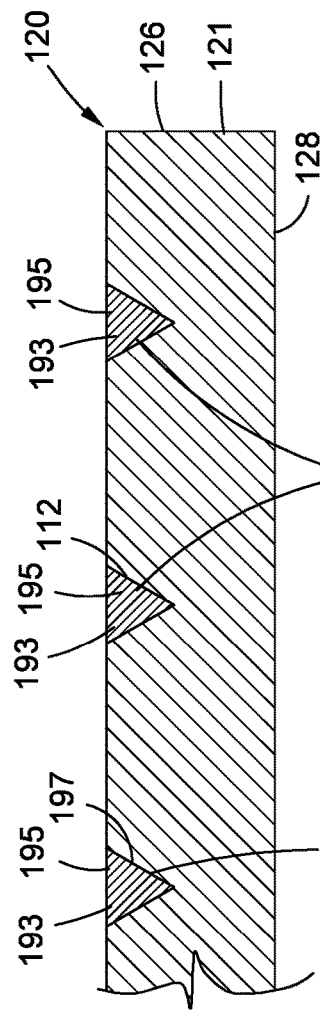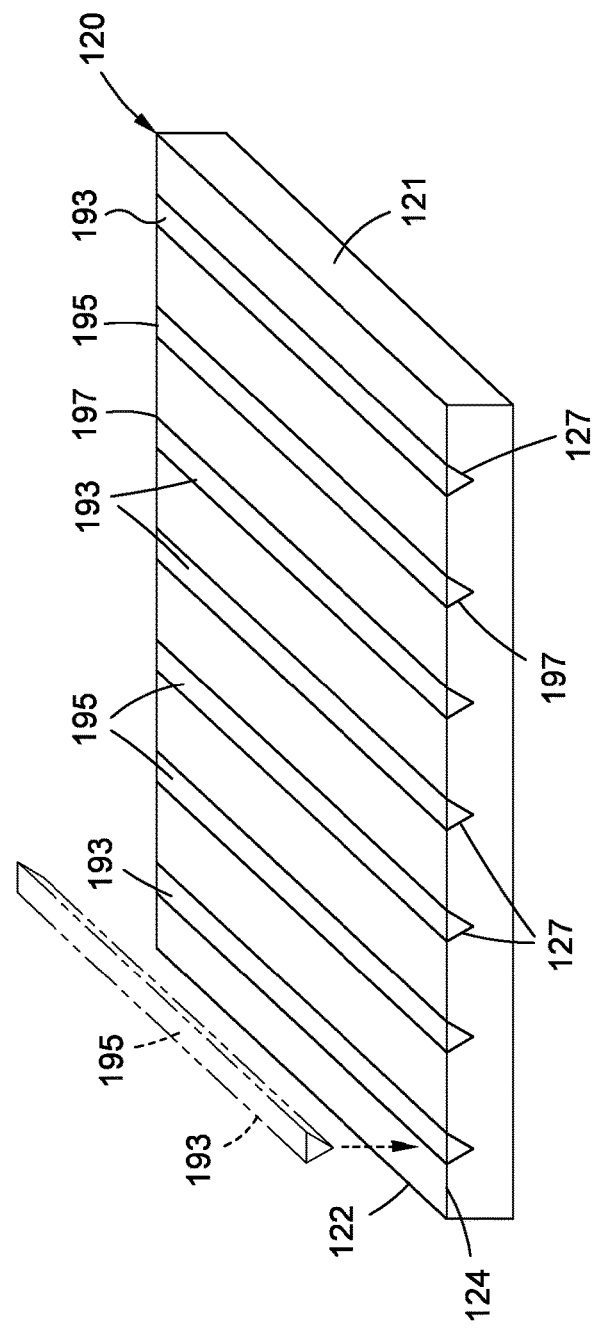
FIG. 55
FIG. 54

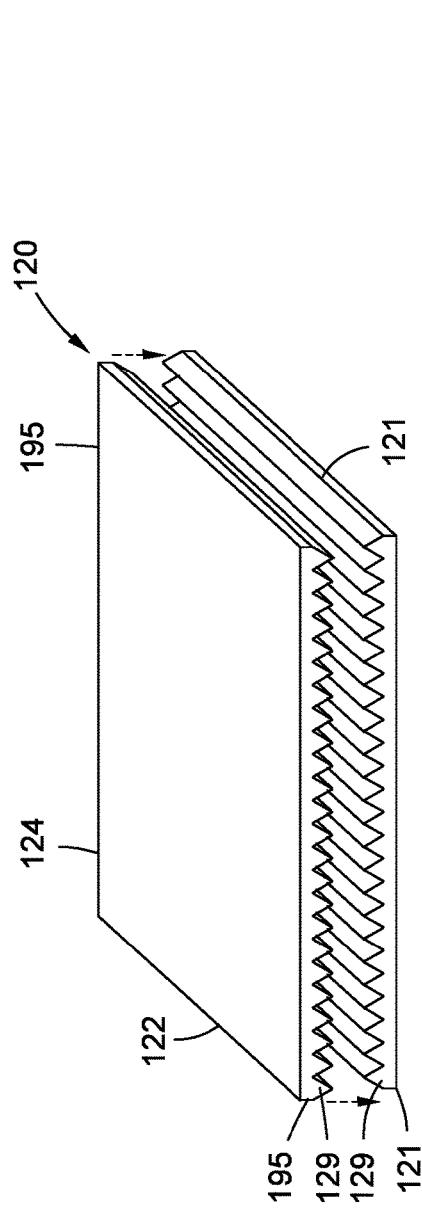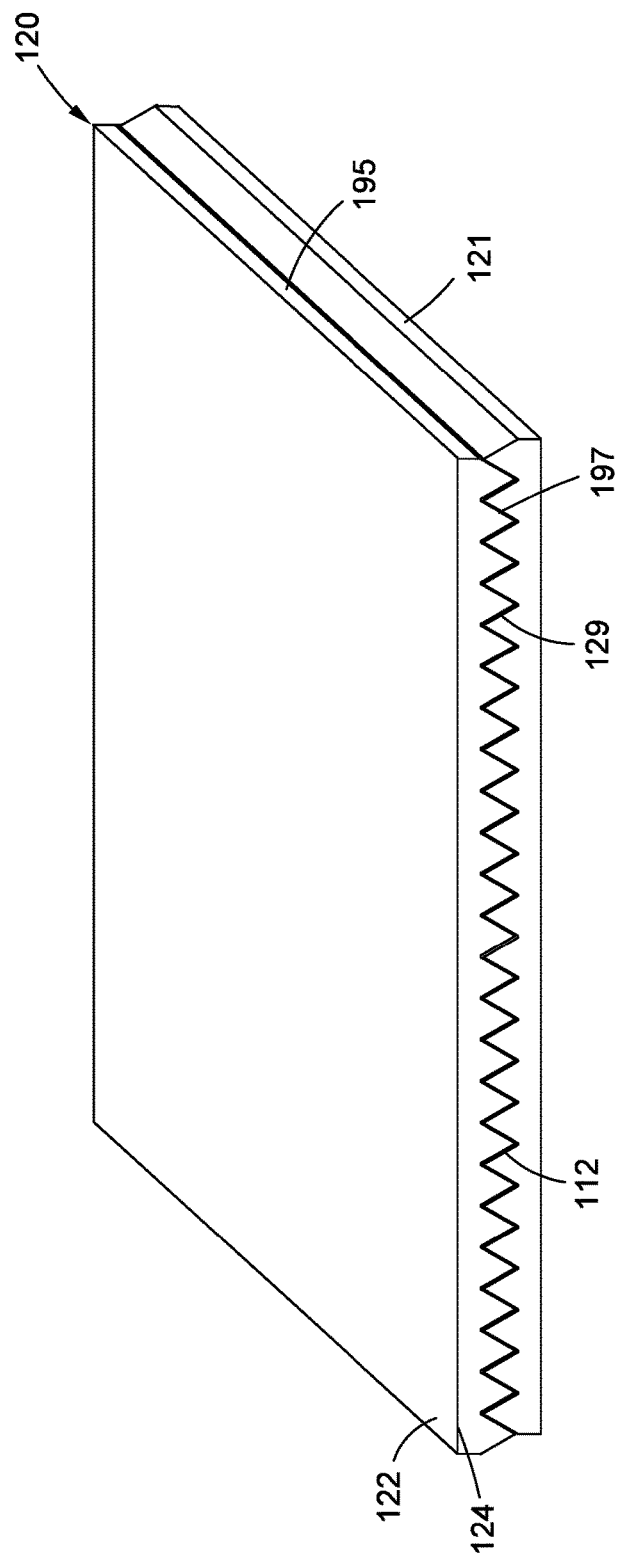

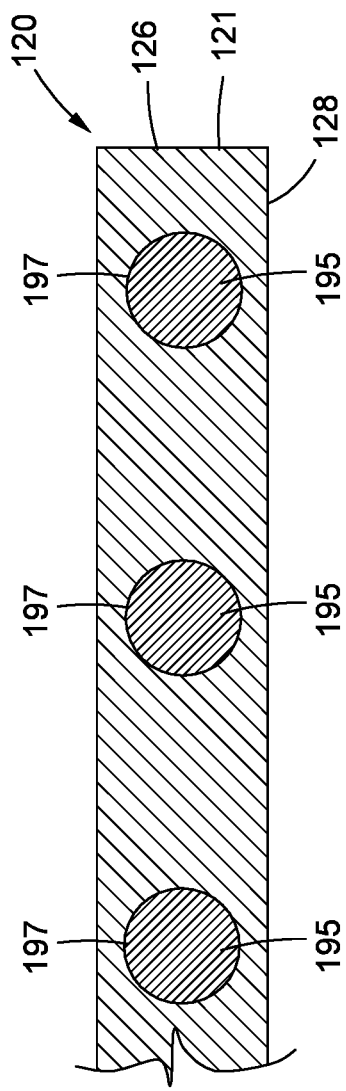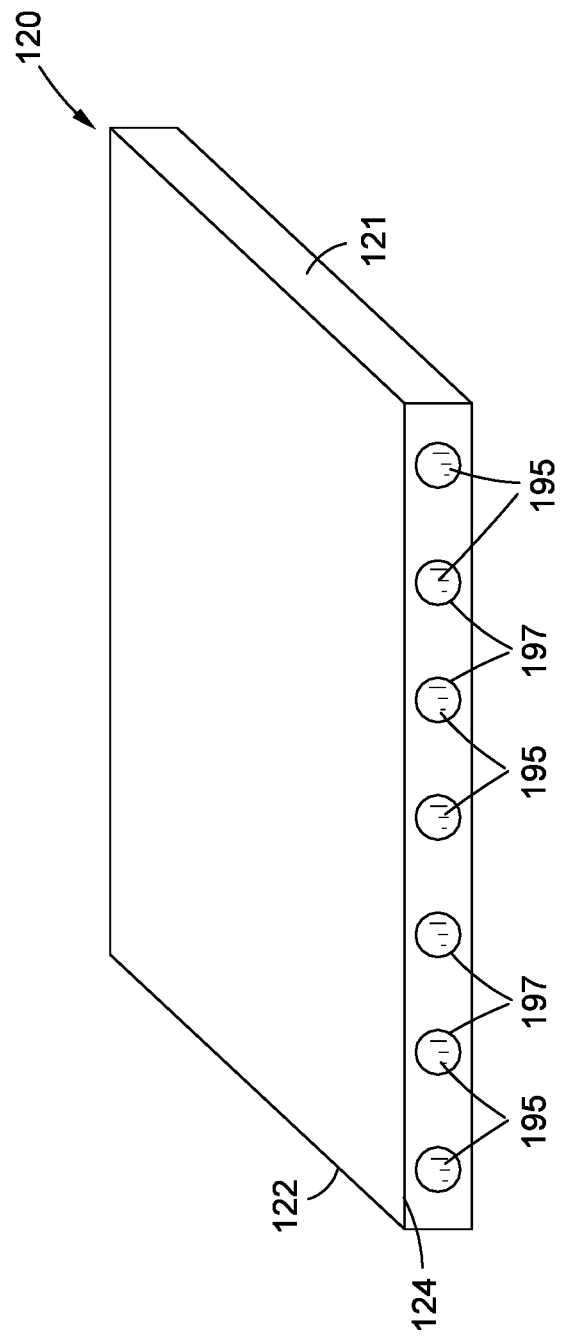

950 ⟶

952 ⟶ COUPLING AT LEAST ONE FILM ELEMENT TO AT LEAST ONE FILM BODY AT AN INTERFACE THAT IS NON-CONTINUOUS ACROSS A WIDTH OF THE FILM BODY, THE NON-FIBROUS FILM HAVING AT LEAST ONE OF THE FOLLOWING CHARACTERISTICS:
- THE INTERFACE HAS AT LEAST ONE MECHANICAL PROPERTY HAVING A VALUE THAT IS DIFFERENT THAN THE VALUE OF THE MECHANICAL PROPERTY OF AT LEAST ONE OF THE FILM ELEMENT AND THE FILM BODY;
- THE FILM ELEMENT HAS AT LEAST ONE MECHANICAL PROPERTY HAVING A VALUE THAT IS DIFFERENT THAN THE VALUE OF THE MECHANICAL PROPERTY OF THE FILM BODY

FIG. 62

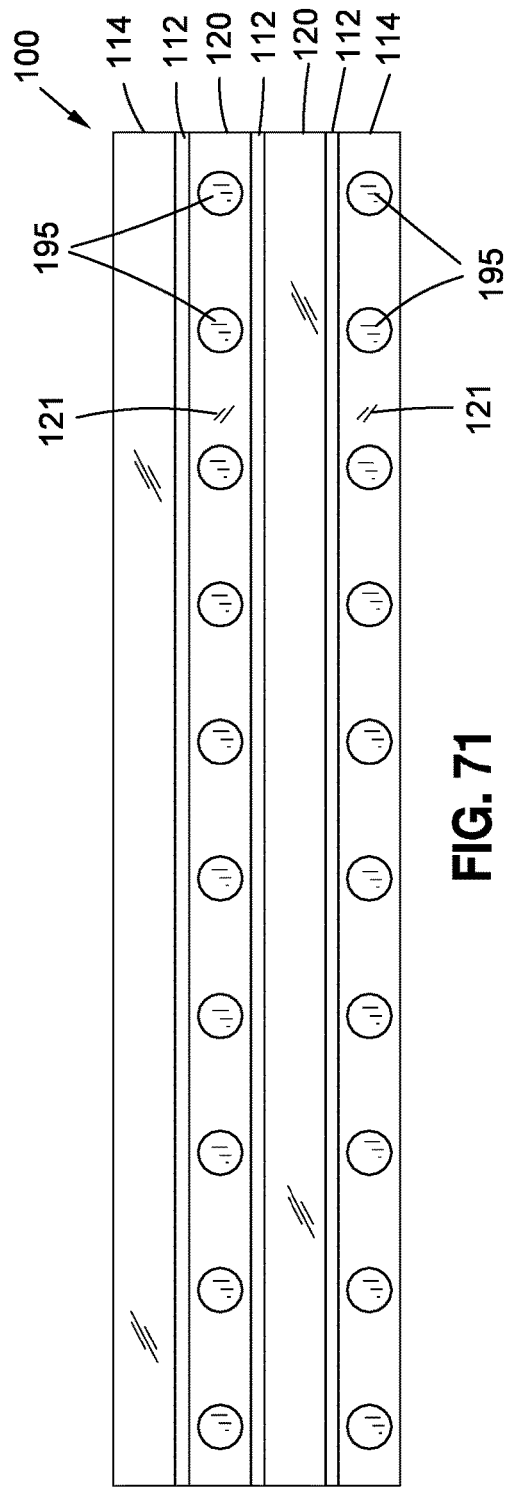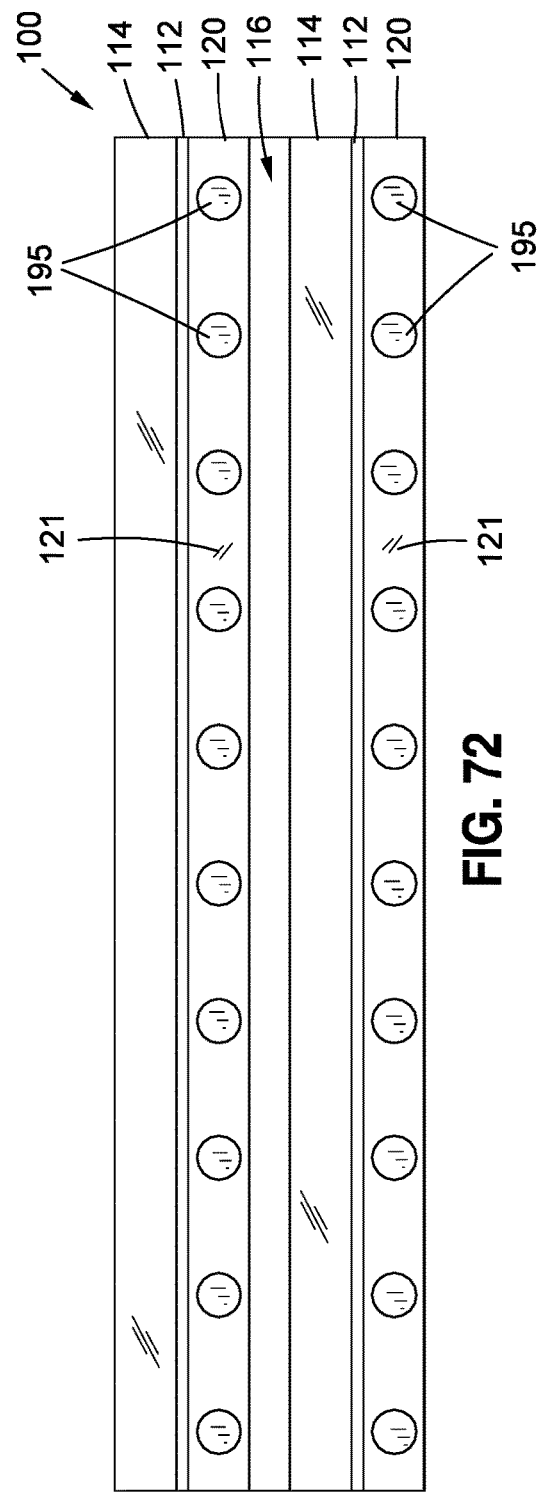

MULTI-COMPONENT FILMS

CROSS-REFERENCE TO RELATED APPLICATIONS

This application is a continuation-in-part application of and claims priority to pending U.S. application Ser. No. 13/523,141 filed on Jun. 14, 2012, and entitled SELECTIVELY WEAKENED STRETCHED FILMS, the entire contents of which is expressly incorporated by reference herein.

FIELD

The present disclosure relates generally to composites and, more particularly, to composite articles comprised of films providing improved ballistic performance and optical performance.

BACKGROUND

Conventional composite structures are typically comprised of reinforcing fibers embedded in a matrix. Fiber-reinforced composite structures are typically designed to transmit loads along the length of the fibers. Loads from one fiber may be transferred to another fiber in the same layer or to fibers in an adjacent layer by passing through the matrix material. However, the matrix is typically weaker than the fibers such that when a sufficiently high load is transmitted from one fiber to another fiber across the matrix, the matrix will fail. The failure of the matrix allows the fibers to move within the composite structure.

During a ballistic event wherein a composite panel is impacted by a projectile, the ability of the fibers to move within the matrix may affect the ballistic performance of the composite panel. For example, the ability of the fibers in the matrix to move may affect the resistance of the composite panel to penetration by the projectile. For transparent composite panels, movement of the fibers relative to the matrix may also affect the optical performance of the composite panel. For example, movement of the fibers relative to the matrix during a ballistic event may affect the size of an optically-degraded area of the composite panel as a result of impact by the projectile.

As can be seen, there exists a need in the art for a composite structure wherein movement of the fibers within the matrix can be controlled in a manner such that the ballistic performance of the composite structure may be improved. The composite structure is also preferably configurable for use as a transparency.

BRIEF SUMMARY

The above-described needs associated with composite articles are specifically addressed and alleviated by the present disclosure which, in an embodiment, provides a non-fibrous film that has at least one film body that is non-fibrous, and at least one film element that is non-fibrous. The film element is coupled to the film body at an interface that is non-continuous across a film width of the non-fibrous film. The non-fibrous film has at least one of the following characteristics: the interface has at least one mechanical property having a value that is different than the value of at least one of the film element and the film body, and/or the film element has at least one mechanical property having a value that is different than the value of the mechanical property of the film body.

Also disclosed is a method of manufacturing a non-fibrous film. The method includes coupling at least one film element to at least one film body at an interface that is non-continuous across a width of the non-fibrous film. The non-fibrous film has at least one of the following characteristics: the interface has at least one mechanical property having a value that is different than the value of the mechanical property of at least one of the film element and the film body, and/or the film element has at least one mechanical property having a value that is different than the value of the mechanical property of the film body.

In addition, disclosed is a composite article having a plurality of films arranged in a stacked formation. At least one of the films is a non-fibrous film having at least one film body that is non-fibrous, and at least one film element that is non-fibrous. The film element is coupled to the film body at an interface that is non-continuous across a film width of the non-fibrous film. The non-fibrous film has at least one of the following characteristics: the interface has at least one mechanical property having a value that is different than the value of the mechanical property of at least one of the film element and the film body, and/or the film element has at least one mechanical property having a value that is different than the value of the mechanical property of the film body.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective view of a composite article in an embodiment comprising a plurality of films having weakened portions formed in the film;

FIG. 2 is an exploded perspective view of the composite article of FIG. 1;

FIG. 3 is a side view of the composite article of FIG. 1 and illustrating the films arranged in a stacked formation;

FIG. 4 is a top view of one of the films of FIG. 3 illustrating an arrangement of weakened portions and non-weakened portions in a film;

FIG. 5 is a cross-sectional view of a portion of a film illustrating an embodiment of the weakened portions formed by chemical modification to reduce a strength in the weakened portion;

FIG. 6 is a cross-sectional view of a portion of a film illustrating an embodiment of the weakened portions formed by geometric modification to reduce a strength in the weakened portion;

FIG. 7 is a top view of a portion of a film illustrating weakened portions formed as continuous lengthwise weakened segments;

FIG. 8 is a top view of a portion of the film illustrating weakened portions formed as a series of indentations;

FIG. 9 is a top view of an embodiment of a film having weakened portions arranged as a plurality of lengthwise weakened segments interconnected by transverse weakened segments;

FIG. 10 is a top view of an embodiment of a film having weakened portions comprised of a plurality of lengthwise weakened segments and transverse weakened segments arranged in a stepped shape;

FIG. 32 is a sectional view taken along line 32 of FIG. 31 and illustrating an example of a non-fibrous film having weakened portions configured as partial-thickness slices each oriented in the same direction;

FIG. 33 is a sectional view of a further embodiment of a non-fibrous film having weakened portions in which the slices are full-thickness slices;

FIG. 34 is a sectional view of a further embodiment of a non-fibrous film in which the weakened portions are configured as partial-thickness slices extending from opposite film surfaces of the film;

FIG. 35 is a sectional view of a further embodiment of a non-fibrous film in which the partial-thickness slices are locally non-perpendicular to the film surface;

FIG. 36 is a sectional view of a further embodiment of a non-fibrous film having full-thickness slices each oriented locally non-perpendicular to the film surface;

FIG. 37 is a sectional view of a further embodiment of a non-fibrous film having partial-thickness slices oriented in different directions;

FIG. 38 is a sectional view of a further embodiment of a non-fibrous film having slices each having a Z-shaped cross-section;

FIG. 39 is a sectional view of a further embodiment of a non-fibrous film having slices each having an S-shaped cross-section;

FIG. 44 is a side view of a composite article having a non-fibrous film interposed between a pair of non-weakened layers;

FIG. 45 is a side view of a composite article having an adjacent pair of non-fibrous films interposed between a pair of non-weakened layers;

FIG. 46 is a side view of a composite article having alternating non-weakened layers and non-fibrous films;

FIG. 47 is a side view of a composite article having alternating non-weakened layers and non-fibrous films and further including a gap between the innermost non-weakened layer and non-fibrous film;

FIG. 48 is a perspective view of an example of a non-fibrous film comprised of a plurality of filament bodies arranged in side-by-side parallel relation to a plurality of film elements;

FIG. 49 is a sectional view of a portion of the non-fibrous film of FIG. 48 illustrating the alternating film bodies and film elements coupled to each other in side-by-side relation;

FIG. 50 is a side view of an example of the assembly of a plurality of film bodies and film elements captured between upper and lower plates and forced together using opposing mechanical presses;

FIG. 54 is a perspective view of a further example of a non-fibrous film wherein the strips of film elements are wedge-shaped or insertion into V-shaped cavities of the film body;

FIG. 55 is a sectional view of a portion of the non-fibrous film of FIG. 54 illustrating the wedge-shaped film elements installed within the corresponding V-shaped cavities of the film body;

FIG. 56 is a perspective view of a further example of a non-fibrous film wherein the film element and the film body are configured as meshing parts interlocked with each other at the interface;

FIG. 57 is an exploded perspective view of the film element and film body illustrating the meshing surfaces;

FIG. 60 is a perspective view of a further example of a non-fibrous film comprised of a plurality of film elements embedded within a film body;

FIG. 61 is a sectional view of a portion of the non-fibrous film of FIG. 60 illustrating the film elements embedded within the film body;

FIG. 62 is a flow chart of a method of manufacturing a non-fibrous film comprising at least one film element coupled to at least one film body at an interface;

FIG. 71 is a side view of a composite article having alternating non-weakened layers and non-fibrous films;

FIG. 72 is a side view of a composite article having alternating non-weakened layers and non-fibrous films and further including a gap between the innermost non-weakened layer and non-fibrous film.

DETAILED DESCRIPTION

Figure 11:
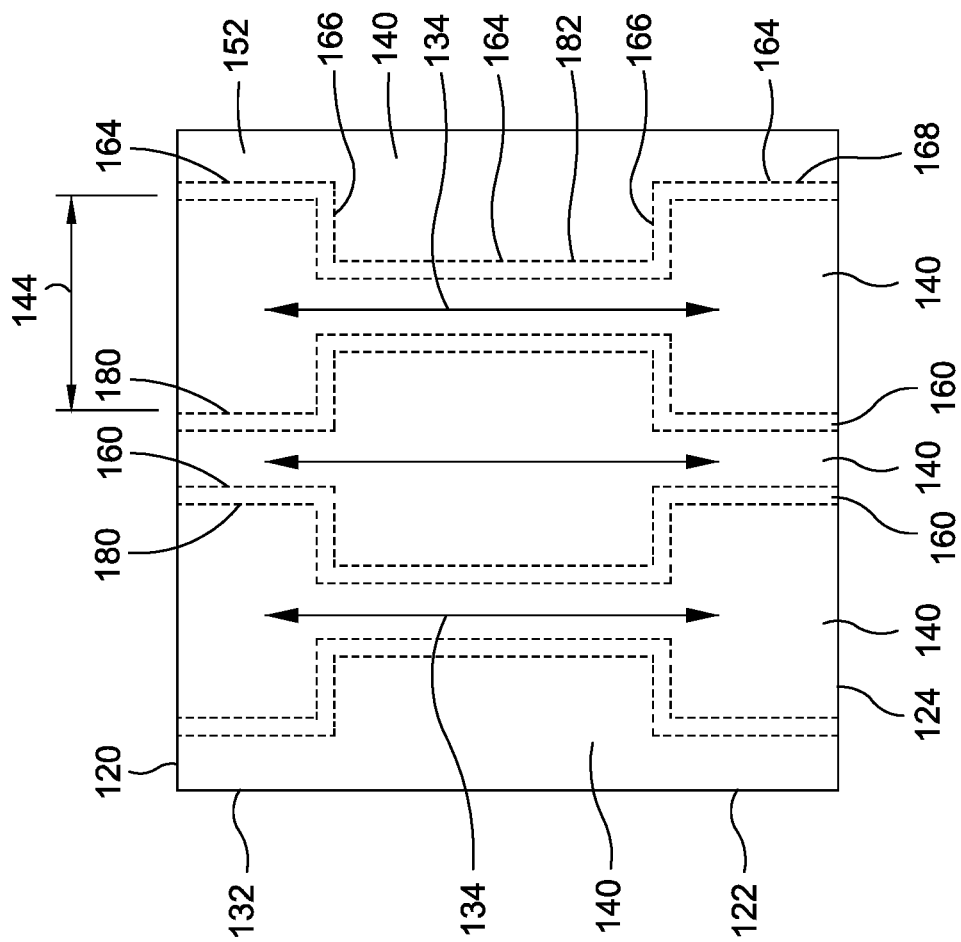
FIG. 11 is a top view of an embodiment of a film having weakened portions wherein the stepped shapes face in opposite directions.

Referring now to the drawings wherein the showings are for purposes of illustrating preferred and various embodiments of the disclosure, shown in FIG. 1 is a composite article 100. The composite article 100 may be configured as a composite panel 104 having article surfaces 102 on upper and lower sides 106, 108 of the composite panel 104. The composite article 100 may be fabricated from a plurality of films 120 and arranged in a stacked formation 130. The films 120 may be laminated or bonded together using one or more adhesive layers 112 or using adhesive matrix material 110. In an embodiment, the adhesive layer 112 may be optically-matched to the film 120. For example, the adhesive layers 112 and the films 120 may have refractive indices that are complementary to one another or that are substantially equivalent for a predetermined wavelength band such as within the visible spectrum and/or the infrared spectrum.

Referring to FIG. 2, shown is an exploded perspective view of the composite article 100 of FIG. 1 showing a plurality of polymeric films 120 in the stacked formation 130. One or more of the films 120 in the composite article 100 may advantageously be stretched along at least one stretched direction 134. The strength of the film 120 along a stretched direction 134 may be higher than the strength of the film 120 along a non-stretched direction or transverse direction 136 (FIG. 6). The transverse direction 136 may be oriented generally perpendicular to the stretched direction 134. One or more adjacent pairs of the films 120 may be bonded together using a relatively thin adhesive layer 112. Each adhesive layer 112 may form a thin bondline between the faying surfaces of the films 120. The adhesive layer 112 may be formed of matrix material, resin, or other material that may be installed between the adjacent films 120 for adhesively bonding the films 120 together.

In FIG. 2, each one of the films 120 may include a plurality of weakened portions 160 which may be formed as relatively narrow strips or paths arranged in a predetermined pattern in a film 120. For example, the weakened portions 160 may be formed in the shape of a line 176 (FIG. 4) along a lengthwise path 162 (FIG. 4) in the films 120. As indicated above, one or more of the films 120 may comprise a stretched film 132. The weakened portions 160 in a stretched film 132 may be generally aligned or parallel with the stretched direction 134 of the stretched film 132. However, one or more of the weakened portions 160 of a stretched film 132 may be oriented along one or more directions that are generally non-parallel to the stretched direction 134 of the stretched film 132.

In each film 120, the weakened portions 160 may define a plurality of relatively larger non-weakened portions 140 of the film. The non-weakened portions 140 of each film 120 may comprise a substantial portion of each film 120. FIG. 2 illustrates a plurality of non-weakened portions 140, each having a general ribbon-shaped configuration 152 bounded by the lengthwise paths 162 of the weakened portions 160. The weakened portions 160 of a film 120 may have at least one property that may be lower than the property of the non-weakened portions 140 of the film 120. For example, the weakened portions 160 of a film 120 may be modified to have a reduced strength relative to the strength of a non-weakened portion of the film 120. In an embodiment, one or more of the weakened portions 160 of a film 120 may be chemically modified relative to a non-weakened portion 140 of the film 120 and wherein the chemical modification may cause the weakened portion 160 to have a tensile strength, a tensile modulus, an ultimate strain, a toughness, and/or other property that is lower than the tensile strength, the tensile modulus, the ultimate strain, the toughness, and/or other property of a non-weakened portion 140 of the film 120. In a further embodiment, one or more of the weakened portions 160 of a film 120 may be geometrically modified causing the film 120 to have a reduced tensile strength and/or a reduced transverse (e.g., out-of-plane) shear strength relative to the tensile strength and/or transverse shear strength of the film 120 in a non-weakened portion 140.

Advantageously, by providing each film 120 with one or more weakened portions 160 arranged in a desired pattern, the film 120 may fail in a desired manner when subjected to an external load. For example, during a ballistic event wherein a composite panel 104 may be impacted by a projectile (not shown), one or more films 120 in the composite panel 104 may absorb kinetic energy of the projectile by elongating or stretching. One or more of the films 120 in the composite panel 104 may initially fail (e.g., locally fracture) along one or more of the weakened portions 160. Advantageously, the non-weakened portions 140 of the films 120 may remain intact after failure of the weakened portions 160. The intact non-weakened portions 140 may continue to absorb the kinetic energy of the projectile by deflecting, elongating, or stretching as the projectile continues along a path into or through the composite panel 104. The deflection, elongation, or stretching of the non-weakened portions 140 may decelerate the projectile until the non-weakened portions 140 fail upon reaching an ultimate strain of the film material.

Advantageously, by forcing the film 120 to initially fail at the weakened portions 160, the non-weakened portions 140 may continue to undergo a relatively large amount of deflection and elongation (e.g., stretching) prior to failure of the non-weakened portions 140. In addition, for stretched films 132, by orienting the non-weakened portions 140 of the stretched film 132 generally parallel to the stretched direction 134 of the stretched film 132, the higher strength of the stretched film 132 in the stretched direction 134 may provide improved capability for absorbing the energy of an impact relative to the lower energy-absorbing capability along the transverse direction 136 of the stretched film 132. Furthermore, by forcing the stretched film 132 to initially fail at the weakened portions 160, an increased amount of film material may be involved in a ballistic event.

For example, referring to FIG. 2, by forcing the films 120 to initially fail at the weakened portions 160, the non-weakened portions 140 may continue to deflect and elongate resulting in the engagement of additional films 120 in the stacked formation 130 of the composite panel 104. The increased deflection and elongation may increase the amount of non-weakened portions 140 that become involved in a ballistic event. The increased involvement of non-weakened portions 140 in a ballistic event may increase the amount of time during which the films 120 may absorb kinetic energy of the projectile which may reduce or prevent penetration of the composite panel 104 by the projectile. In this regard, by providing films 120 with selectively weakened portions 160, ballistic performance of the composite article 100 may be significantly improved relative to the ballistic performance of conventional composite articles (not shown).

A further advantage provided by the present disclosure is an improvement in the optical performance of a transparent composite article 100 fabricated with stretched films 132 relative to the optical performance of a conventional transparent composite article (not shown) fabricated with fibers (not shown). For example, in a conventional composite article, the fibers may have a generally cylindrical configuration causing each fiber to act as a small lens to light passing through the conventional composite article. The conventional composite article may include a plurality of layers of fibers oriented in different directions. The cumulative effect of the plurality of fibers is a scattering of light as the light passes through the conventional composite article such that objects viewed through the conventional composite article may appear blurred.

Advantageously, in the present disclosure, the weakened portions 160 of the films 120 may have substantially the same optical properties or characteristics as the non-weakened portions 140 of the film 120 despite the weakened portions 160 having reduced mechanical properties (e.g., reduced strength) relative to the mechanical properties of the non-weakened portions 140. By providing the film 120 with substantially uniform optical properties throughout the film 120, the selectively weakened films 120 in the present disclosure avoid the undesirable optical effects associated with conventional fiber-reinforced composites.

In FIG. 2, each one of the films 120 may comprise a stretched film 132 having a stretched direction 134 and a transverse direction 136 oriented generally perpendicular to the stretched direction 134. The stretched films 132 may be substantially non-stretched in the transverse direction 136. The stretched films 132 shown in FIG. 2 may be unidirectionally stretched wherein the non-weakened portions 140 may have a tensile strength and/or a tensile modulus in the stretched direction 134 that may be higher than the tensile strength and/or the tensile modulus of the non-weakened portion 140 in the transverse direction 136. However, the composite article 100 may be constructed from stretched films 132 that are bi-directionally stretched (not shown). For example, one or more stretched films 132 in a composite article 100 may be stretched along a lengthwise direction and along a transverse direction 136. Alternatively, it is contemplated that a composite article 100 may be constructed with one or more films 120 that are non-stretched (not shown).

In FIG. 2, the stretched films 132 are arranged such that the stretched direction 134 of each stretched film 132 is oriented generally perpendicular to the stretched direction 134 of the adjacent stretched film 132. However, the stretched films 132 may be arranged in any manner and are not limited to alternating perpendicular orientations of the stretched directions 134. For example, a composite article 100 may be constructed wherein the stretched directions 134 of the stretched films 132 are oriented in substantially the same direction. Alternatively, a composite article 100 may be constructed wherein the stretched directions 134 of the stretched films 132 are oriented at non-perpendicular angles relative to one another. For example, the composite article 100 may be configured such that the stretched directions 134 of one or more stretched films 132 may be oriented at predetermined angles (e.g., 15°, 22.5°, 45°, 60°, 75°, etc.) relative to one another.

Figure 21:
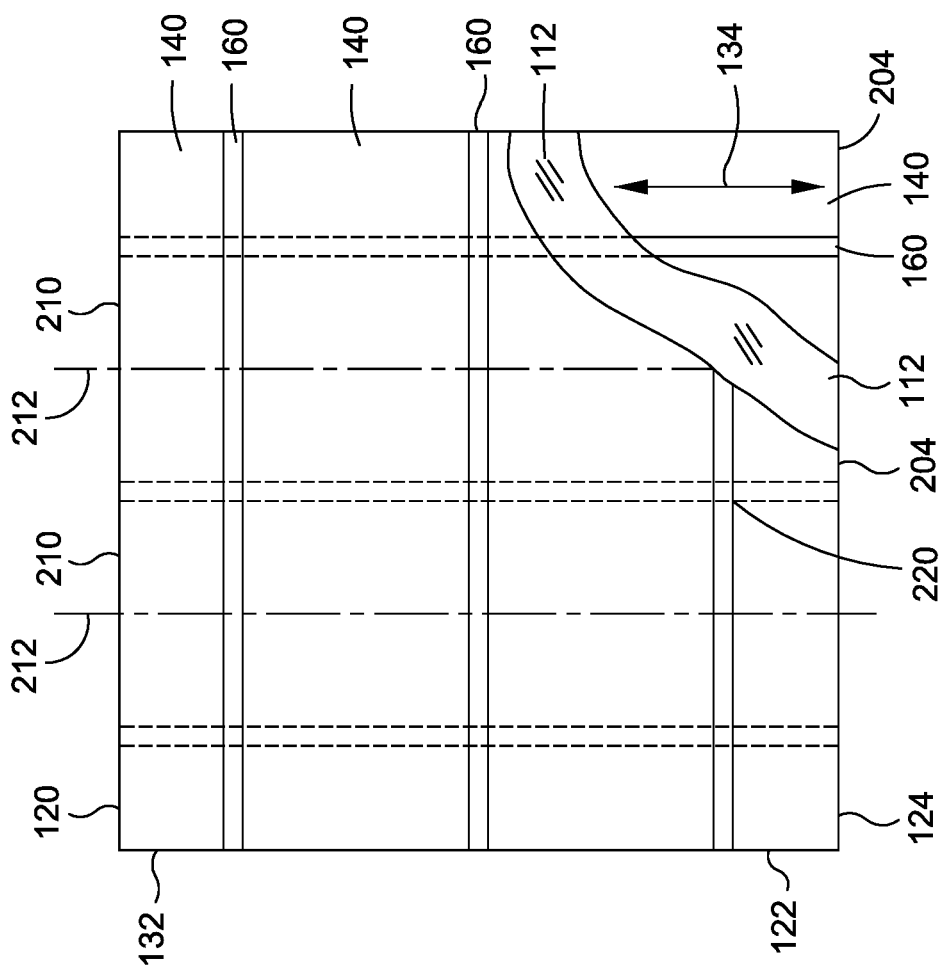
FIG. 21 is a top view of the corrugated films of FIG. 20 illustrating the arrangement of the weakened portions and stretched directions of the corrugated films.

In this same regard, a composite article 100 may be configured having a cross-pattern of weakened portions 220 as shown in FIG. 21 wherein the weakened portions 160 of each one of the stretched film 132 are oriented at generally perpendicular angles relative to the weakened portions 160 of adjacent stretched films 132. However, a composite article 100 may be configured having stretched films 132 with weakened portions 160 generally oriented in the same direction (not shown). Alternatively, a composite article 100 may be configured having stretched films 132 with weakened portions 160 oriented at non-perpendicular angles (e.g., 15°, 22.5°, 45°, 60°, 75°, etc.) relative to weakened portions 160 of adjacent stretched films 132. In addition, a composite article 100 may be configured wherein the orientation of the weakened portions 160 relative to the stretched direction 134 of one of the stretched films 132 is different than the orientation of the weakened portions 160 relative to the stretched direction 134 of one or more of the other stretched films 132 in the composite article 100.

Referring to FIG. 3, shown is the composite article 100 of FIG. 1 illustrating the stretched films 132 in the stacked formation 130. One or more of the stretched films 132 may include one or more non-weakened portions 140. The non-weakened portions 140 may be bounded by weakened portions 160. Each one of the stretched films 132 may include upper and lower film surfaces 128. An adhesive layer 112 may be installed between the upper and lower film surfaces 128 of adjacent stretched films 132 for adhesively bonding the stretched films 132. As indicated above, the adhesive layer 112 may comprise a film 120 of adhesive that may be optically matched to the film 120 such as by substantially matching the refractive indices of the adhesive layer 112 and the film 120 within a wavelength band (e.g., the visible spectrum and/or the infrared spectrum) and/or or by substantially matching the temperature coefficients of refractive index of the adhesive layer 112 and the film 120 within a temperature range (e.g., −65 F to +200 F). A plurality of the adhesive layers 112 may be laid up with the stretched films 132. Alternatively, the adhesive layer 112 may comprise an adhesive matrix material or an adhesive resin that may be applied between the stretched films 132.

FIG. 4 is a top view of one of the stretched films 132 having a film length 122 and a film width 124. In the embodiment shown, the weakened portions 160 are formed in the stretched film 132. Each one of the weakened portions 160 is configured in the shape of a line 176. The weakened portions 160 extend along a lengthwise path 162 that may be oriented generally parallel to the stretched direction 134 of the stretched film 132. Each one of the weakened portions 160 has a weakened portion length 168 that extends along the film length 122. The weakened portions 160 are shown as being generally uniformly spaced across the film width 124 and defining a plurality of non-weakened portions 140 having substantially uniform non-weakened portion widths 144. However, the non-weakened portion widths 144 may be non-uniform in a film 120.

FIG. 5 is cross-sectional view of a film 120 having weakened portions 160 that may be formed in a film 120. In an embodiment, the film thickness 126 may be in the range of from approximately 5 microns to approximately 5,000 microns (0.0002 to 0.20 inch). However, the film 120 may be provided in any film thickness 126, without limitation. The weakened portions 160 may have a weakened portion width 170. The weakened portions 160 may be spaced apart from one another and may define a non-weakened portion width 144. The non-weakened portions 140 may be formed in a generally elongated cross-sectional shape 154 or in a ribbon-shaped configuration 152 which may have a relatively high aspect ratio. In an embodiment, the non-weakened portion 140 may have an aspect ratio of a non-weakened portion 140 width to film thickness 126 of from approximately 3 to approximately 500 although the non-weakened portion 140 may have any aspect ratio of any value. However, the non-weakened portion width 144 may have an upper limit of 10 inches.

The weakened portions 160 may be formed in a film 120 such as a stretched film 132 by any one of a variety of different means for achieving a reduction in a property of the film 120 within the weakened portion 160 relative to the property in a non-weakened portion 140. For example, weakened portions 160 may be formed in a film 120 by chemical modification 190 of the film 120 and/or by geometric modification 192 (FIG. 6) of the film 120.

In FIG. 5, chemical modification 190 of a film 120 to form the weakened portions 160 may include localized exposure of the film 120 to ultraviolet radiation or to other forms of radiation such as electron beam radiation. Radiation may be applied to the film 120 in the desired location of a weakened portion 160 to alter, modify and/or weaken the molecular bonds of the film 120. Exposure to radiation may induce chain scission which may result in a reduction in molecular bond strength. A byproduct of radiation exposure may include a localized change in color of the film 120. However, color changes may be reduced or minimized by thermal treatment or optical annealing. Chemical modification 190 may also include exposure of a film 120 to a laser which may result in localized heating of the film 120 and which may cause the polymeric film material to have different properties.

In FIG. 5, chemical modification 190 may additionally include selective doping of the film 120 to add a softening agent or hardening agent to localized areas of the film 120 where it is desired to form a weakened portion 160. Chemical modification 190 may also include applying a variety of materials that are known to locally degrade the performance of polymeric film 120 material. Chemical modification 190 may further include fabricating the film 120 with a slightly different material composition in the weakened portions 160 relative to the material composition in the non-weakened portions 140. For example, a film 120 may be formed having a reduced molecular weight of the polymer chains in the weakened portions 160 relative to the molecular weight of the polymer chains in the non-weakened portions 140 which would advantageously provide substantially identical optical properties in the weakened portion 160 and non-weakened portion 140 with a reduced material strength in the weakened portion 160. In an embodiment, chemical modification 190 may be provided with a weakened portion width 170 which may vary (not shown) along a length of a weakened portion 160. Likewise, chemical modification 190 may be provided at different weakened portion depths 172. The weakened portion depth 172 may be measured from a film surface 128 of a film 120 such as a stretched film 132.

FIG. 6 is cross-sectional view of the stretched film 132 illustrating an embodiment of a geometric modification 192 to form the weakened portions 160. The geometric modification 192 may include a localized reduction 194 in the film thickness 126. Such localized reduction 194 in the film thickness 126 may result in a reduction in the strength (e.g. reduced tensile strength) of the film 120 relative to the strength of the film 120 in non-weakened portions 140 of the film 120. The localized reduction 194 in the film thickness 126 may be provided by forming a groove, a notch, or a scratch along a length of the stretched film 132 at any weakened portion depth 172. The geometric modification 192 may locally reduce the film thickness 126 such that the weakened portion thickness 174 is less than approximately 90 percent of the film thickness 126. For example, the stretched film 132 may be geometrically modified such that the weakened portion thickness 174 is approximately 10 percent to 90 percent of the film thickness 126 although other relative thicknesses are contemplated outside of the 10 to 90 percent range.

Although a V-shaped groove is shown, the geometric modification 192 may be formed in any size, shape, and configuration without limitation. For example, geometric modification 192 of a film 120 may be provided by scoring a line into a constant thickness film 120 to remove material from the film 120. Geometric modification 192 of a film 120 may also be provided by forming or molding the geometric modification 192 into the film 120 during fabrication of the film 120. Although a groove, notch or scratch in the film 120 may result in undesirable optical effects, such optical effects may be mitigated by filling the groove, notch, scratch, or other geometric modification 192 with an optically-matched material such as matrix resin or adhesive layer 112 material. Such material may be applied during layup of the composite article 100. Undesirable optical effects may also be avoided or mitigated by forming the geometric modification 192 as an infinitely-thin cut (not shown) or an infinitely-thin slice (not shown) extending along a length of the stretched film 132 at any weakened portion depth 172 on one or both sides of the film 120. Advantageously, such an infinitely-thin cut or slice may locally weaken the stretched film 132 without removing material from the stretched film 132. Although the weakened portions 160 are shown as being generally parallel with the stretched direction 134, the weakened portions 160 may be formed in general alignment with the transverse direction 136 or in any other direction as was indicated above.

FIG. 7 is a top view of a portion of a film 120 illustrating an embodiment of a geometric modification 192 of a film 120 to form weakened portions 160. The weakened portions 160 are shown as a continuous scoring 196 of the film 120 in shape of a line 176. The weakened portions may extend in a lengthwise path 162 along the film 120. Although the weakened portions 160 are shown as being generally parallel with the stretched direction 134, the weakened portions 160 may be oriented in any direction relative to the stretched direction 134 and are not limited to being oriented generally parallel to the stretched direction 134.

FIG. 8 shows an embodiment of a film 120 wherein the weakened portions 160 may be formed as a series of discrete or localized geometric modifications 192 arranged in a predetermined pattern in the film 120. For example, the weakened portions 160 may be comprised of a series of indentations 198 or depressions that may be formed in one or both of the opposing film surfaces 128. Such indentations 198 may result in localized reductions 194 in the cross-sectional area of the film 120. Although FIG. 8 shows a series of indentations 198 formed in a generally straight line, the indentations 198 may be arranged in any pattern, orientation, or configuration, without limitation. Undesirable optical effects of the localized indentations 198 may be mitigated by applying an optically-matched material to the indentations 198 as indicated above.

FIG. 9 is a top view of an embodiment of a film 120 having weakened portions 160 formed in a pattern similar to the pattern illustrated in FIG. 4 and described above. However, the non-weakened portions 140 in the embodiment of FIG. 9 include transverse weakened segments 166 oriented generally perpendicularly relative to the weakened portions 160. Each one of the transverse weakened segments 166 may extend between at least two of the weakened portions 160 to define a plurality of non-weakened portions 140 each having a rectangle 178 shape. The transverse weakened segments 166 define a non-weakened portion length 142. The lengthwise weakened segments 164 define a non-weakened portion width 144. The interconnection of the lengthwise weakened portions 160 may result in further weakening of the film 120 and provide an additional means for controlling the failure of the film 120.

FIG. 10 is top view of an embodiment of a film 120 having a plurality of weakened portions 160 each forming a tortuous path 180. Each one of the tortuous paths 180 may include lengthwise weakened segments 164 that are offset from one another and which are interconnected by transverse weakened segments 166 to form a stepped shape 182. The lengthwise weakened segments 164 may be oriented generally parallel to the stretched direction 134 of the film 120. The stepped shape 182 shown in FIG. 10 results in non-weakened portions 140 having a ribbon-shaped configuration 152 with a substantially constant cross sectional area along a direction of the film length 122. The stepped shape 182 arrangement shown in FIG. 10 results in relatively sharp corners which may increase the capability of the film 120 in absorbing energy from an impact such as from a projectile.

FIG. 11 is a top view of a further embodiment of the stepped shape 182 arrangement of weakened portions 160. The stepped shape 182 arrangement may result in non-weakened portions 140 having a ribbon-shaped configuration 152 with a varying cross sectional area along a direction of the film length 122. In this regard, the varying cross sectional area may include variations in the non-weakened portion width 144 of the non-weakened portions 140. The step arranged in FIG. 11 may result in the in-plane movement (e.g., shape change) of the non-weakened portions 140 during an impact event.

Figure 13:
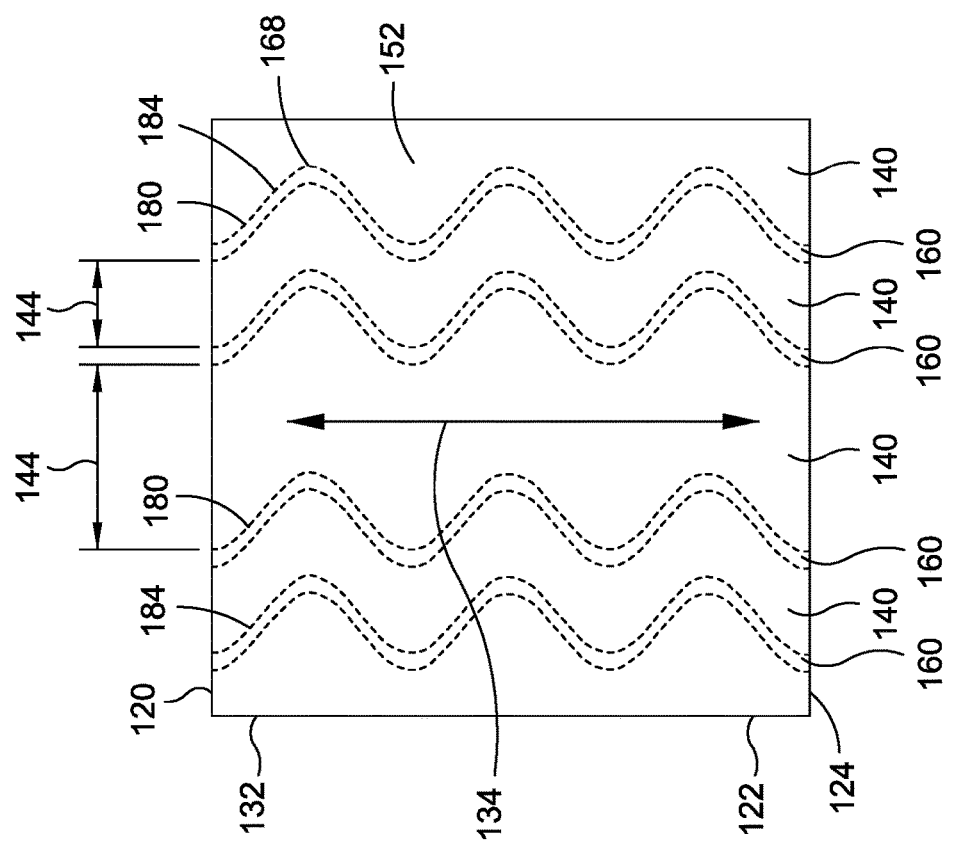
FIG. 13 is a top view of an embodiment of a film having weakened portions arranged in a sinusoidal shape with different width spacings between the weakened portions.
Figure 12:
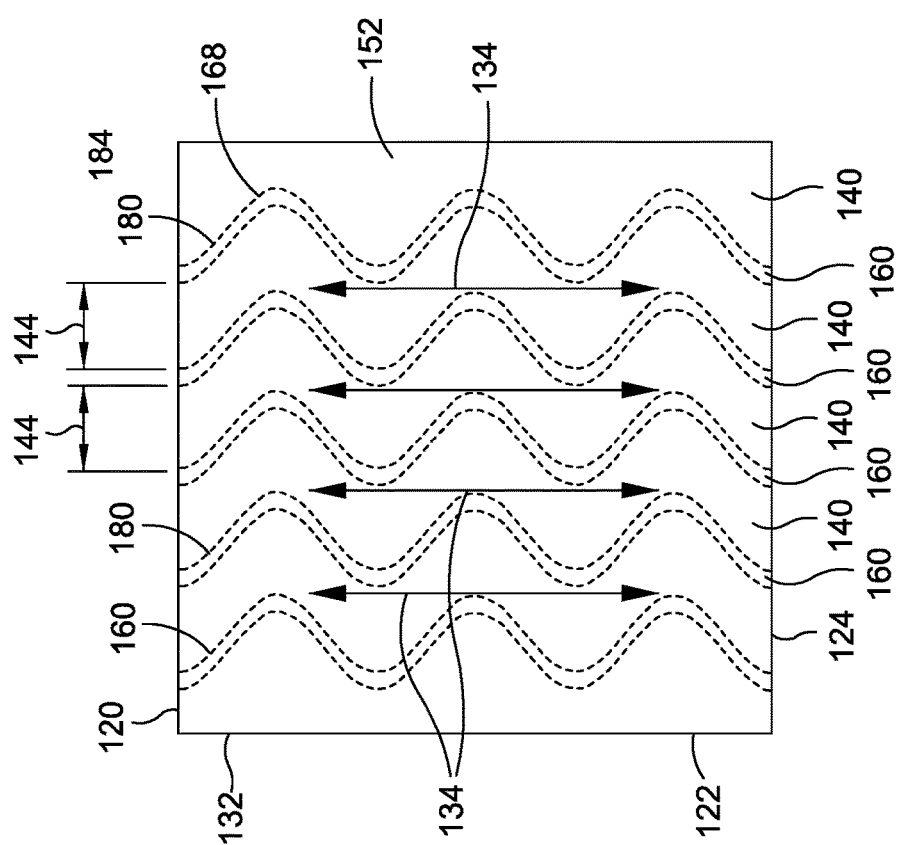
FIG. 12 is a top view of an embodiment of a film having weakened portions arranged in a sinusoidal shape with substantially uniform spacings between the weakened portions.

FIGS. 12-13 are top views of a tortuous path 180 embodiment wherein the weakened portions 160 are arranged in a sinusoidal shape 184. The sinusoidal shape 184 may reduce stress concentrations that may otherwise occur in the stepped shape 182 embodiments shown in FIGS. 10 and 11. The tortuous path 180 embodiment of FIG. 12 has substantially uniform spacings between the weakened portions 160. The ribbon-shaped configuration 152 of the non-weakened portion 140 results in a substantially uniform non-weakened portion widths 144. FIG. 13 illustrates a tortuous path 180 embodiment having different spacings between the weakened portions 160 which may alter the energy-absorbing capability of the film 120 relative to the embodiment of FIG. 12. In any of the tortuous path 180 embodiments, the periodicity and the amplitude of the sinusoidal shape 184 may be altered to achieve a desired failure mode and/or a desired energy-absorbing capability of the film 120.

Figure 15:
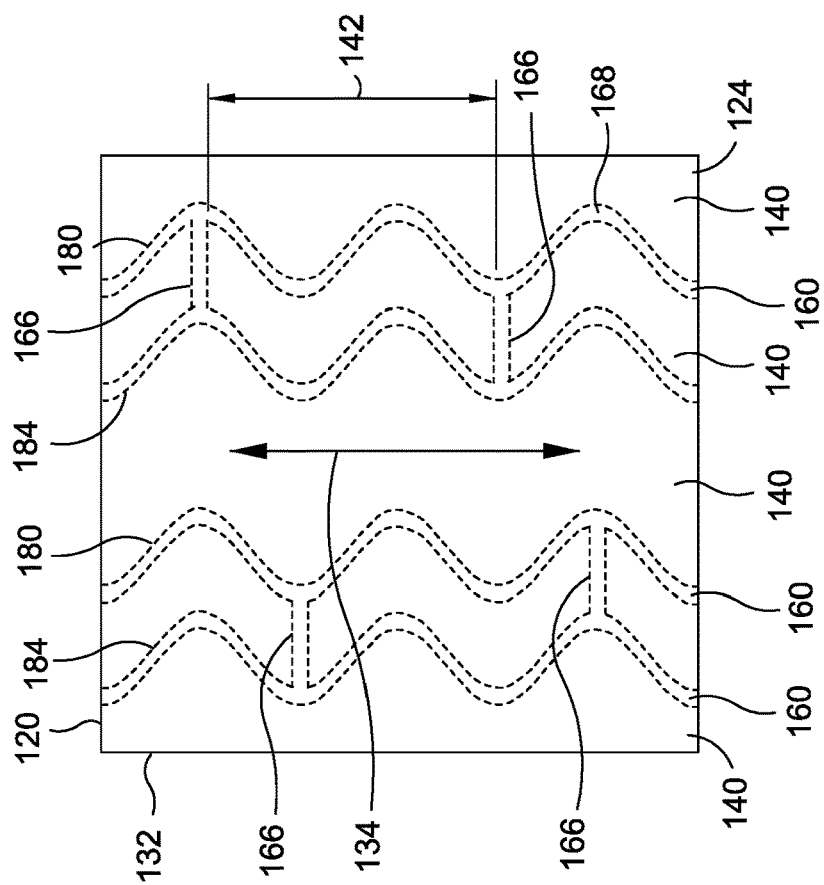
FIG. 15 is a top view of an embodiment of a film having transverse weakened segments interconnecting adjacent pairs of sinusoidally shaped weakened portions.
Figure 14:
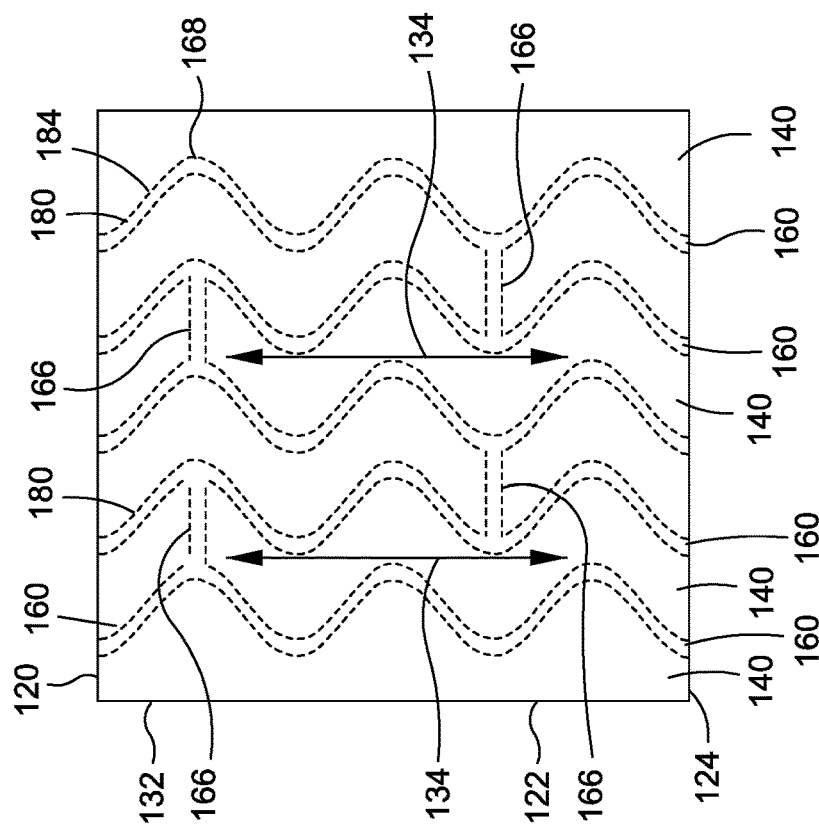
FIG. 14 is a top view of an embodiment of a film having transverse weakened segments interconnecting the sinusoidally shaped weakened portions.

FIGS. 14-15 are top views of the tortuous path 180 embodiments similar to FIGS. 12-13, respectively, and further including transverse weakened segments 166 interconnecting the sinusoidal shapes 184 of the weakened portions 160. The transverse weakened segments 166 may be positioned at different locations for achieving a desired degree of weakening of the films 120. In FIG. 15, the spacing between a pair of the transverse weakened segments 166 may define a non-weakened portion length 142 of a non-weakened portion 140. As may be appreciated, the arrangement, pattern, orientation, and interconnection of the weakened portions 160 using the transverse weakened segments 166 may be arranged to achieve the desired degree of weakening of the film 120.

Figure 17:
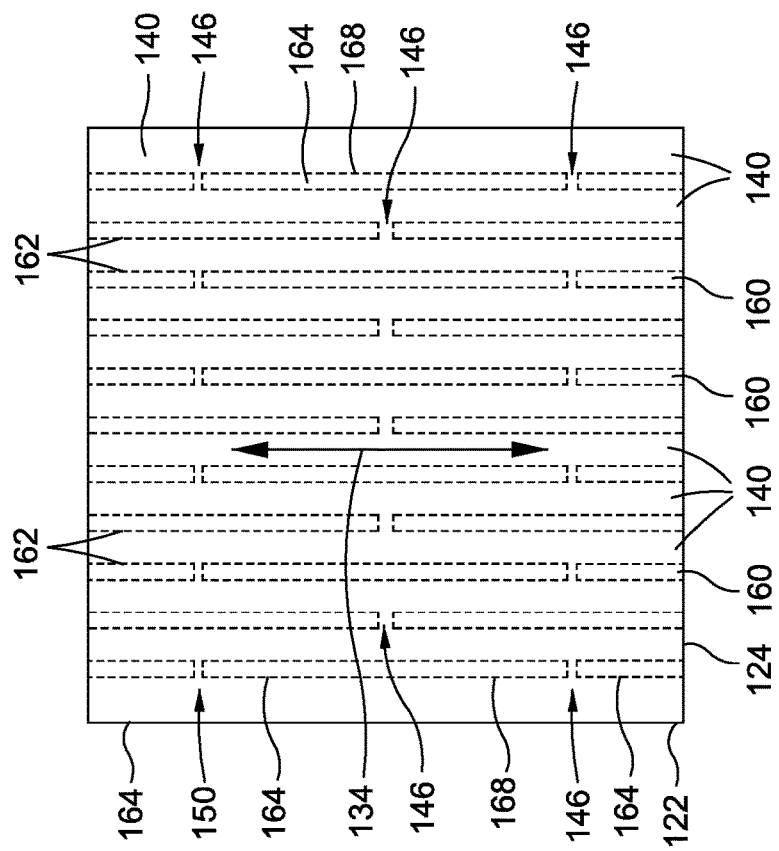
FIG. 17 is a top view of an embodiment of a film having a series of lengthwise weakened segments forming a plurality of staggered non-weakened connections between the non-weakened portions of the film.
Figure 16:
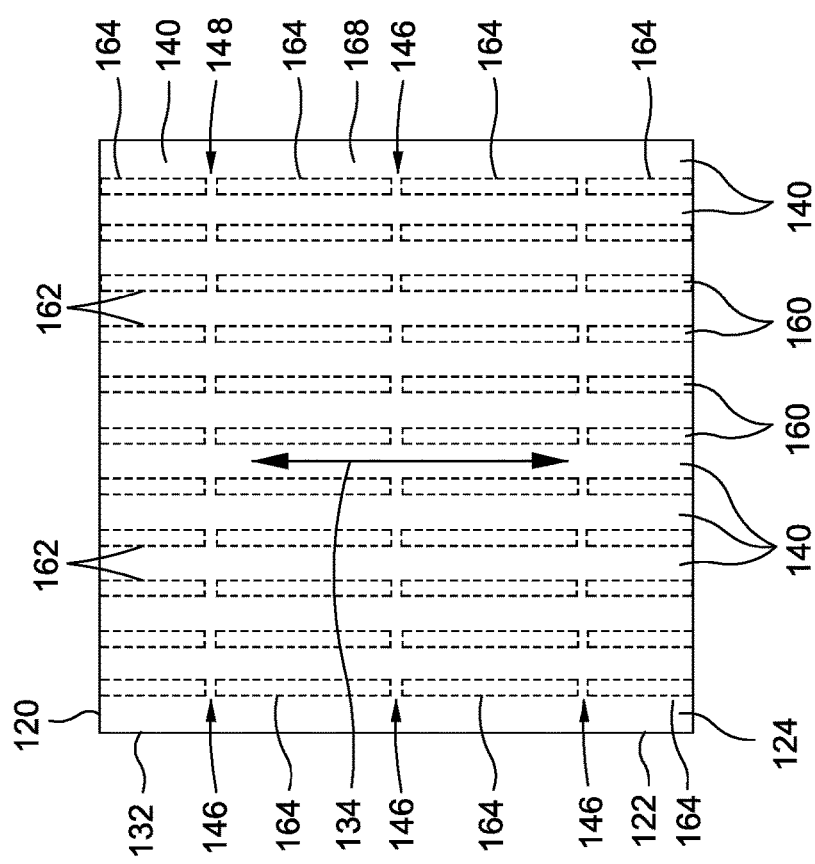
FIG. 16 is a top view of an embodiment of a film having a series of lengthwise weakened segments forming a plurality of aligned non-weakened connections between the non-weakened portions of the film.

FIGS. 16-17 are top views of an embodiment of the film 120 having weakened portions 160 arranged in an end-to-end series of lengthwise weakened segments 164. Each gap between the ends of adjacent lengthwise weakened segments 164 comprises a non-weakened connection 146. FIG. 16 illustrates the non-weakened connections 146 in an aligned arrangement 148 with one another in the film 120. FIG. 17 illustrates the non-weakened connections 146 in a staggered arrangement 150. The non-weakened connections 146 may mechanically couple an adjacent pair of non-weakened portions 140 of the film 120. In this regard, the non-weakened connections 146 may limit the degree of relative movement of the interconnected non-weakened portions 140 which may provide an additional means for controlling the failure mode and/or the energy-absorbing capability of the film 120. The non-weakened connections 146 may be spaced at any desired interval or in any pattern of intervals to achieve a desired failure response of the film 120 and/or a desired failure response of the composite article 100.

Figure 18:
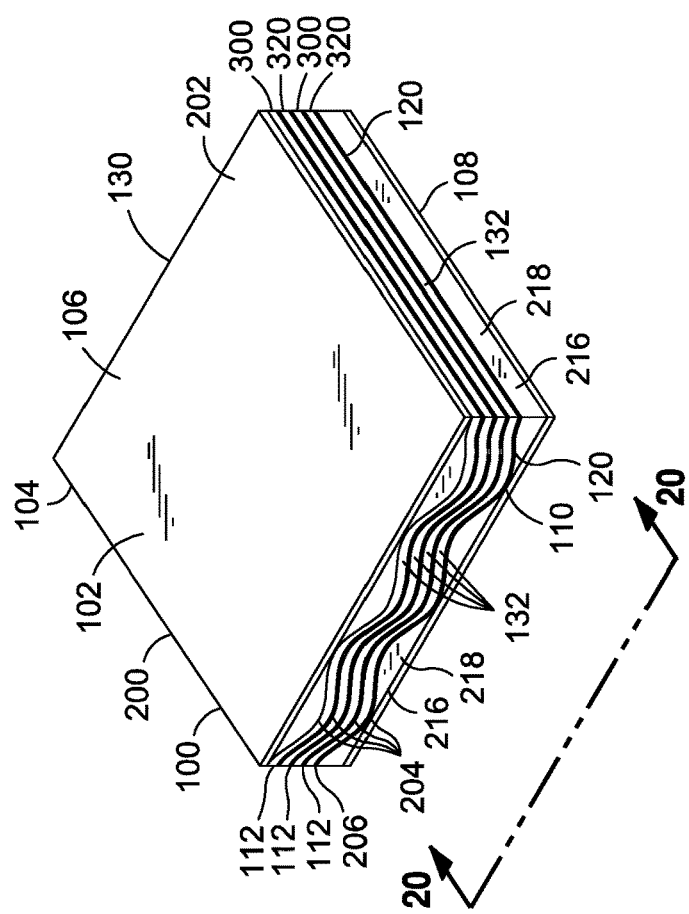
FIG. 18 is a perspective view of a corrugated composite article.

FIG. 18 is a perspective illustration of a corrugated composite article 200. The corrugated composite article 200 includes a plurality of corrugated films 204 arranged in a stacked formation 130. Each corrugated film 204 may have a corrugated configuration in the sense that the corrugated films 204 may form a sinusoidal cross-sectional shape 206. However, the corrugated films 204 may be provided in a cross sectional shape such as a square wave cross-sectional shape, a sawtooth cross-sectional shape, or cross-sectional shapes other than a sinusoidal cross-sectional shape 206.

Figure 19:
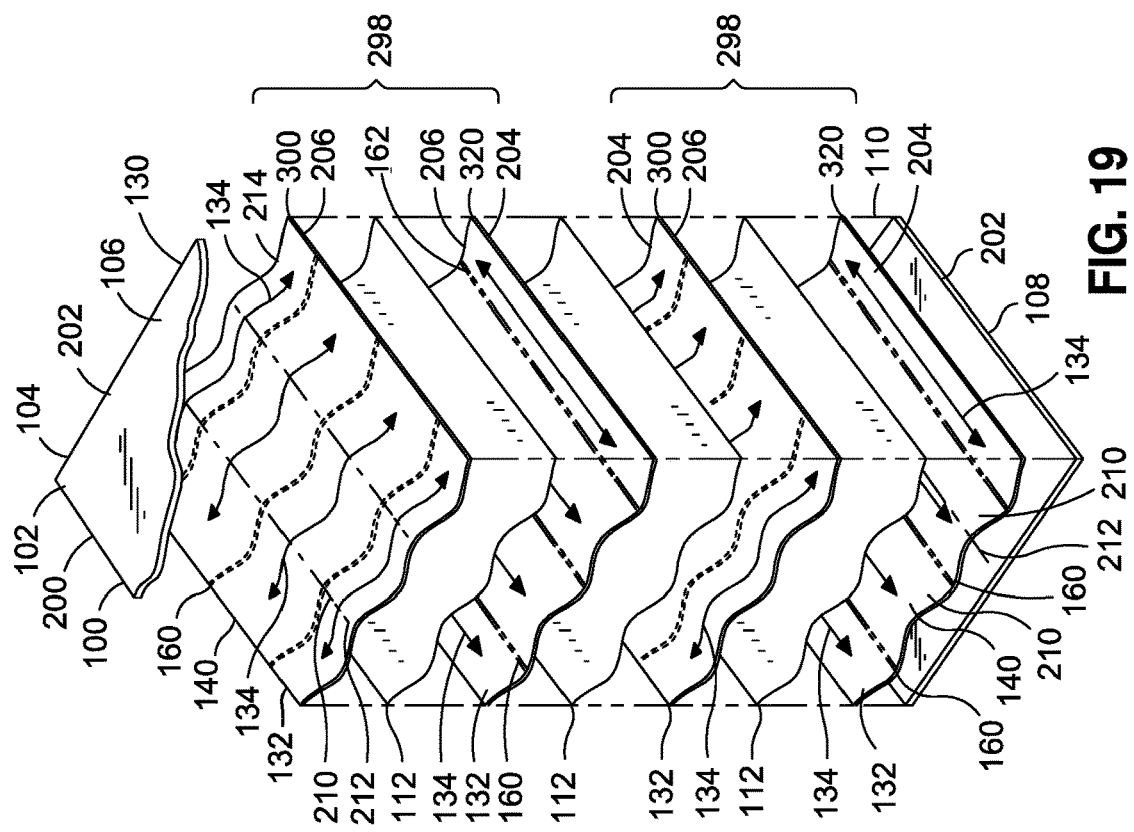
FIG. 19 is an exploded perspective view of the corrugated composite article of FIG. 18 and illustrating a plurality of corrugated films having selectively weakened portions.

FIG. 19 is an exploded perspective illustration of the corrugated composite article 200. The corrugated films 204 are arranged in a stacked formation 130. One or more of the corrugated films 204 may include an adhesive layer 112 interposed between the corrugated films 204 for adhesively bonding the corrugated films 204 together. Each one of the corrugated films 204 may include a series of generally parallel ridges 210 and troughs 214. Each one of the ridges 210 may have a ridge orientation 212. The composite article 100 may include a pair of face sheets 202 mounted on opposite sides of the stacked formation 130 of the corrugated films 204. The face sheets 202 may be formed of composite material such as polymeric film material and may have a generally planar shape. However, the face sheets 202 may be provided in non-planar shapes such as in a shape that may match the cross-sectional shape of a corrugated film 204.

In FIG. 19, each one of corrugated films 204 may comprise a stretched film 132 having a stretched direction 134. In addition, each one of the corrugated films 204 may include a plurality of weakened portions 160 which may be oriented in a lengthwise path 162 along the corrugated film 204. In the embodiment shown, a portion of the corrugated films 204 may be configured such that the weakened portions 160 in a stretched film 132 are oriented generally perpendicular to the ridge orientation 212 of the stretched film 132 and generally perpendicular to the stretched direction 134 of the corrugated film 204. In addition, a portion of the corrugated films 204 may be configured such that the weakened portions 160 in a stretched film 132 are oriented generally parallel to the ridge orientation 212 of the stretched film 132 and generally parallel to the stretched direction 134 of the corrugated film 204. As mentioned above, in a composite article 100, the weakened portions 160 and the stretched directions 134 may be oriented in any direction relative to one another.

Figure 20:
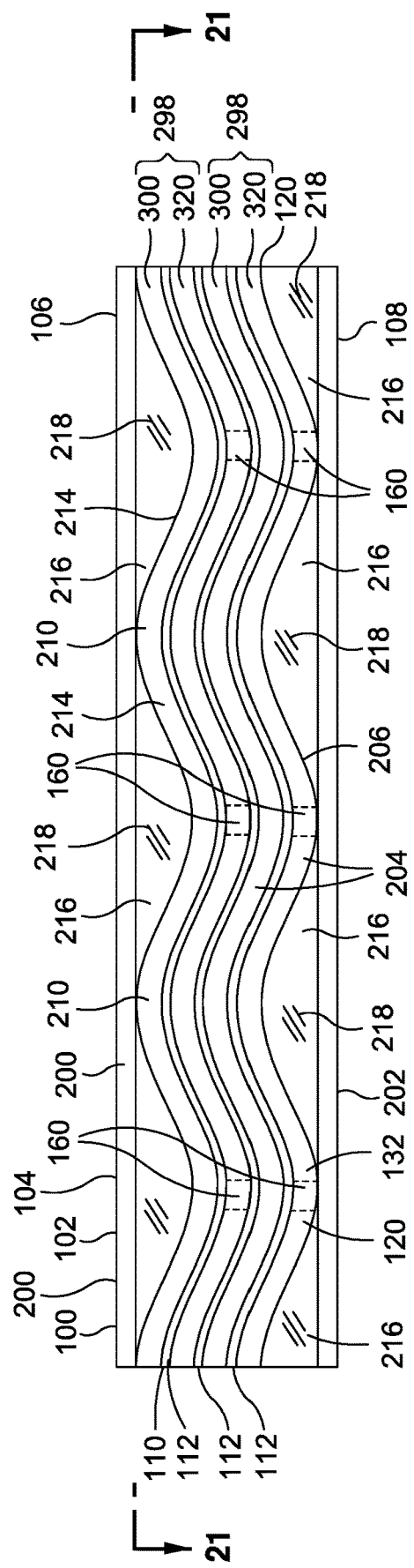
FIG. 20 is a side view of the composite article of FIG. 18 illustrating the corrugated films arranged in a stacked formation between a pair of face sheets.

In FIG. 20, shown is a side view of the corrugated composite article 200 of FIGS. 18-19. The corrugated films 204 may be bonded by the adhesive layers 112. As was indicated above, corrugated films 204 may include ridges 210. The ridges 210 of the outermost corrugated films 204 may define gaps 216 between the corrugated film 204 and the adjacent face sheet 202. The gaps 216 may be substantially filled with a filler matrix 218 (e.g., an adhesive filler) to bond each face sheet 202 to the immediately adjacent corrugated film 204.

Advantageously, the corrugated composite article 200 may provide an increased capability for absorbing energy from an impact such as from a projectile (not shown). In this regard, the corrugated cross-sectional shape of the corrugated films 204 may act as springs wherein the corrugated films 204 may absorb kinetic energy from an impact. For example, during an impact event, the weakened portions 160 of the corrugated film 204 may initially fail. The non-weakened portions 140 (FIG. 12) of the corrugated film 204 may continue to deflect and elongate while absorbing energy from an impact event. The elongation of the corrugated films 204 may urge the corrugations toward a more flattened or planar shape. The urging of the corrugated films 204 toward a more flattened shape may result in an increased amount of kinetic energy absorption during the impact event. As may be appreciated, the failure mode and the energy-absorbing capability of the corrugated composite article 200 may be controlled by controlling the amplitude and periodicity of the corrugated films 204.

In FIG. 21, shown is a top cutaway view of the corrugated films 204 of the corrugated composite article 200. The corrugated films 204 are arranged such that a cross-pattern of weakened portions 220 is formed. The cross-pattern of weakened portions 220 may provide a desired energy-absorbing capability of the composite article 100 (FIG. 20). In this regard, the energy-absorbing capability of the corrugated composite article 200 (FIG. 20) may be controlled by controlling the size, shape, configuration, and orientation of the weakened portions 160 relative to the stretched direction 134 and relative to the ridge orientations 212 of the corrugated films 204. Embodiments may be provided wherein the corrugated films 204 may be unidirectionally stretched, bi-directionally stretched, or combinations thereof, as described above.

In any the embodiments disclosed herein, the arrangement of the weakened portions 160 of the films 120 or stretched film 132 of a composite article 100 may be substantially similar from film 120 to film 120. However, the arrangement of the weakened portions 160 may vary from film 120 to film 120 within a composite article 100. Even further, a film 120 may have different arrangements of weakened portions 160 at different locations of the film 120. In addition, it is contemplated that a composite article 100 may be fabricated having some films 120 that include weakened portions 160 and other films 120 that do not include weakened portions 160.

In any of the embodiments disclosed herein, the quantity, location, pattern, size, (depth, width, length), and type (e.g., chemical modification 190, geometric modification 192) of the weakened portions 160 may be provided based on a variety of factors. Such factors may include the desired amount of weakening provided by each film 120, the failure mechanism of each film 120 or stack of films 120, and on other factors such as ballistic event factors and environmental factors. Ballistic event factors may include projectile velocity, projectile mass, projectile hardness, geometric size and cross-sectional area of the projectile, and other factors related to the projectile. Environmental factors may include temperature, humidity, and other factors.

In any of the embodiments disclosed herein, the film 120 may be formed of any suitable thermoplastic material, thermosetting material, and/or glass material, without limitation. The adhesive layer 112, and/or the matrix material 110 may be formed of a thermoplastic material and/or a thermosetting material. In an embodiment, the film 120 may be formed of a thermoplastic material comprising at least one of the following materials: acrylics, nylon, fluorocarbons, polyamides, polyethylenes, polyesters, polypropylenes, polycarbonates, polyurethanes, polyetheretherketone, polyetherketoneketone, polyetherimides, stretched polymers and any other suitable thermoplastic material. Alternatively, the film 120, the adhesive layer 112, and/or the matrix material 110 may be formed of a thermoset which may include any one of the following: polyurethanes, phenolics, polyimides, bismaleimides, polyesters, epoxies, silsesquioxanes and any other suitable thermoset material. For cases where the film 120 comprises a stretched film 132, the stretched film 132 may be formed of a thermoplastic material including, but not limited to, one of the above-mentioned thermoplastic materials.

In an embodiment, the films 120, the adhesive layers 112, and/or the matrix material 110 may be formed of a substantially optically transparent material that is at least partially transmissive of incoming light rays (not shown) directed toward the composite article 100 and/or that are incident upon the composite article 100 (FIG. 20). For example, at least a portion of the films 120, the adhesive layers 112, and/or the matrix material 110 may be substantially optically transparent in the visible spectrum, the near ultraviolet spectrum, and/or the near infrared spectrum.

Although the composite articles 100 (FIG. 1) such as the corrugated composite articles 200 (FIG. 20) are shown and described in the context of a composite panel 104 (FIGS. 1 and 20), the composite article 100 may be configured in any one of a variety of different shapes, sizes and configurations. In this regard, the composite article 100 may be configured for use in any vehicular or non-vehicular application. For example, the composite article 100 may be configured as a transparency of a vehicle such as an aircraft. The composite article 100 may also comprise a windshield or a canopy of an aircraft. The composite article 100 may additionally be configured for use as a window in any vehicular or non-vehicular application. Even further, the composite article 100 may be implemented as a membrane, a structural panel, an architectural panel, a non-structural panel or article, or as any other type of panel or in any other implementation of the composite article 100, without limitation.

In an embodiment, a composite article 100 may be fabricated using a plurality of couplets 298 comprising a first stretched film 300 and a second stretched film 320 wherein the stretched directions 306, 326 may be oriented in any angle relative to one another. For example, in the embodiment shown in FIG. 2, the composite article 100 is arranged such that the stretched directions 306, 326 of the first and second stretched film 300, 320 in each couplet 298 are oriented generally perpendicular to one another. However, the composite article 100 may be fabricated using a plurality of stretched films having stretched directions oriented in non-perpendicular relation to one another including in parallel relation to one another.

Figure 22:
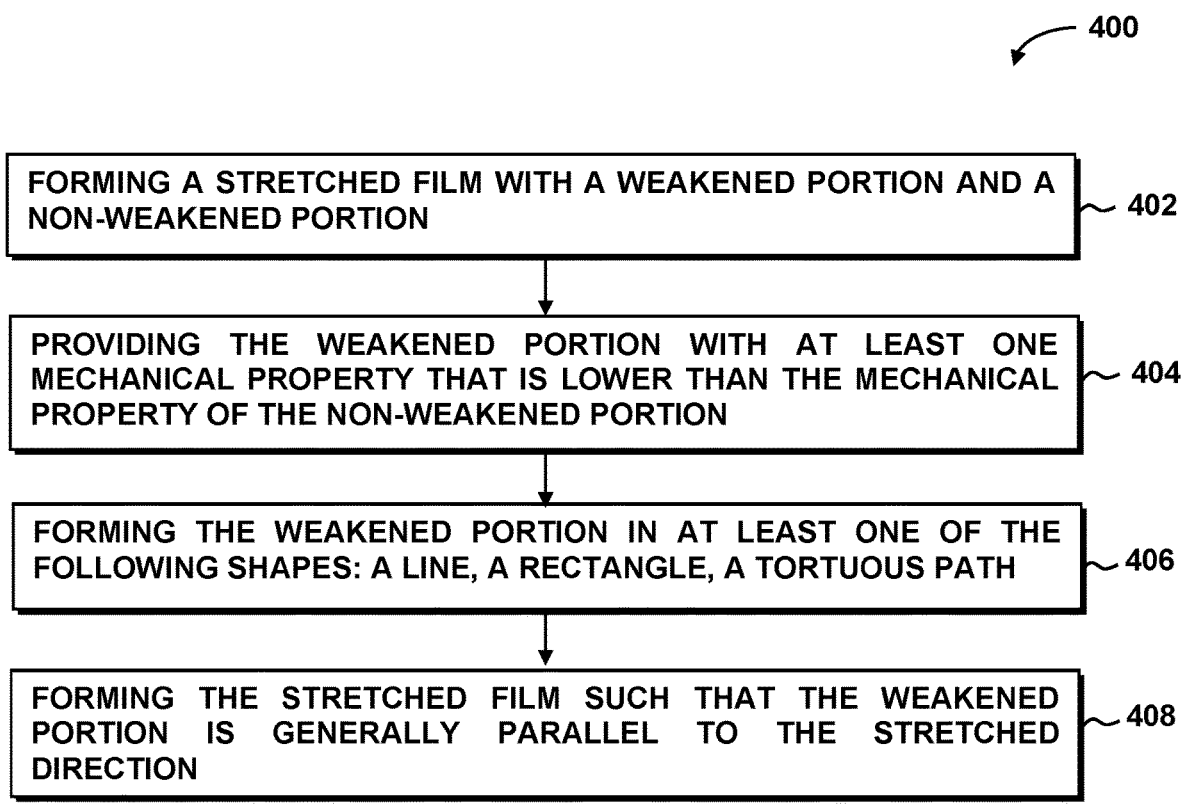
FIG. 22 is a flow chart illustrating one or more operations that may be included in a method of manufacturing a film having weakened portions.

FIG. 22 is a flow chart of a method 400 of manufacturing a film 120 having weakened portions 160 (FIG. 2). The film 120 (FIG. 2) may comprise a stretched film 132 (FIG. 2) as indicated above. Step 402 of the method 400 may include forming the stretched film 132 having at least one weakened portion 160 and a non-weakened portion 140 (FIG. 2). One or more weakened portions 160 may be formed in an existing stretched film 132 by chemical modification 190 (FIG. 5) and/or geometric modification 192 (FIG. 5) of the stretched film 132 as described above. Alternatively, weakened portions 160 may be formed in the stretched film 132 during manufacturing of the stretched film 132. The weakened portions 160 may be formed in any one of a wide variety of patterns, shapes, and orientations as described above.

Step 404 of the method 400 of FIG. 22 may include configuring the stretched film 132 (FIG. 6) such that a weakened portion 160 of the stretched film 132 has at least one property that is lower than a property of a non-weakened portion 140. For example, the weakened portions 160 of a stretched film 132 may be chemically modified relative to the non-weakened portion 140 of the stretched film 132 such that the chemical modification causes the weakened portion 160 to have a tensile strength, a tensile modulus, an ultimate strain, a toughness, and/or other property that is lower than the tensile strength, the tensile modulus, the ultimate strain, the toughness, and/or other property of the non-weakened portions 140 of the stretched film 132. Alternatively, the weakened portions 160 of a film 120 may be geometrically modified causing the film 120 to have a reduced strength such as a reduced tensile strength and/or a reduced transverse shear strength relative to the tensile strength and/or transverse shear strength of the film 120 in a non-weakened portion 140.

Step 406 of the method 400 of FIG. 22 may comprise forming a weakened portion 160 (FIG. 9) in a predetermined pattern or shape in a film 120 (FIG. 9). For example, the method may include forming weakened portions 160 in a film 120 wherein the weakened portions 160 form the shape of a line 176 (FIG. 7) and/or a rectangle 178 (FIG. 9). Weakened portions 160 may also be formed in a tortuous path 180 such as the stepped shapes 182 shown in FIGS. 10-11 or the sinusoidal shapes 184 shown in FIGS. 12-15. However, the weakened portions 160 may be formed in a variety of alternative configurations of a tortuous path 180.

Step 408 of the method 400 of FIG. 22 may comprise forming the stretched film 132 such that the weakened portions 160 are generally parallel to the stretched direction 134 of the stretched film 132. For example, FIG. 2 illustrates an embodiment of a composite article 100 wherein the weakened portions 160 form a lengthwise path 162 that is parallel to the stretched direction 134 of the film 120. Alternatively, FIG. 19 illustrates a corrugated composite article 200 wherein a portion of the corrugated films 204 include weakened portions 160 oriented parallel to the stretched direction 134 of the corrugated film 204 and a portion of the corrugated films 204 include weakened portions 160 oriented perpendicular to the stretched direction 134 of the corrugated film 204. As indicated above, the corrugated films 204 are not limited to having weakened portions 160 that are oriented either parallel or perpendicular to the stretched direction 134 and may include weakened portions 160 oriented at any angle relative to the stretched direction 134 of the corrugated films 204.

Figure 23:
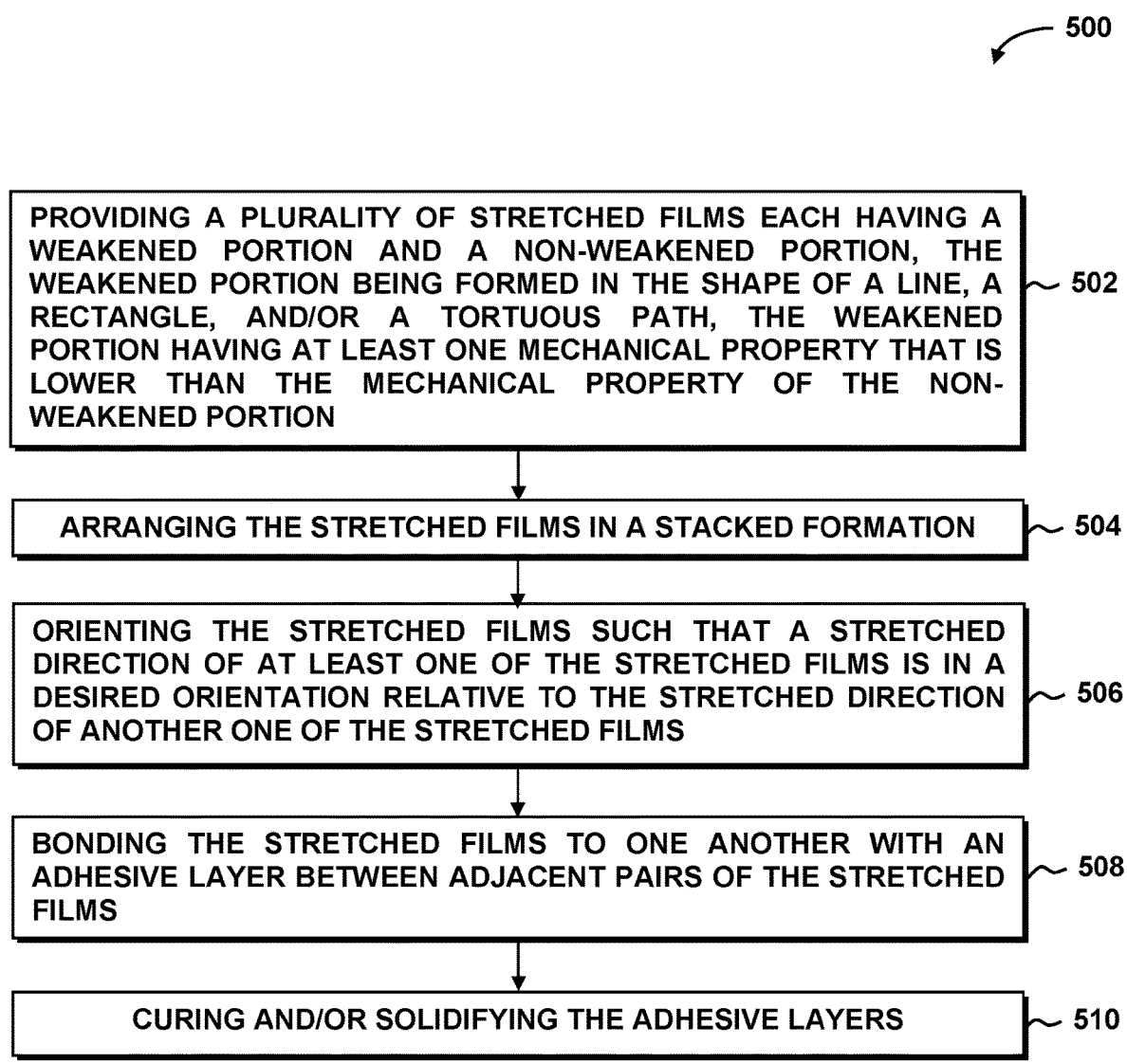
FIG. 23 is a flow chart illustrating one or more operations that may be included in a method of manufacturing a composite article.

FIG. 23 is a flow chart of a method 500 of manufacturing a composite article 100 (FIG. 1). Step 502 of the method 500 may include providing a plurality of stretched films 132 (FIG. 2) each having at least one non-weakened portion 140 (FIG. 2) and at least one weakened portion 160 (FIG. 2). The weakened portions 160 of the stretched films 132 may have the shape of a line 176 (FIG. 7), a rectangle 178 (FIG. 9), and/or the weakened portions 160 may be oriented along a tortuous path 180 (FIG. 10). As indicated above, the weakened portions 160 may have at least one property that is lower than the property of the non-weakened portion 140.

Step 504 of the method 500 of FIG. 23 may include arranging the plurality of the stretched films 132 (FIG. 18) in a stacked formation 130 (FIG. 18). The stretched films 132 may be formed at substantially the same size and/or shape although the stretched films 132 may be provided in different sizes and shapes. The stretched films 132 may be aligned in general registration with one another in the stacked formation 130.

Step 506 of the method 500 of FIG. 23 may include orienting the stretched films 132 such that the stretched direction 134 (FIG. 19) of one the stretched films 132 (FIG. 19) is oriented in a desired orientation relative to the stretched direction 134 of another one of the stretched films 132. For example, in the embodiment shown in FIG. 2, the stretched direction 134 of the first stretched film may be oriented generally perpendicularly relative to the stretched direction 134 of the second stretched film 320. By orienting the stretched directions 134 at non-parallel orientations relative to one another, the composite article 100 (FIG. 19) may provide improved capability for absorbing kinetic energy of a projectile due to the initial failure of the films in the weakened portions 160 (FIG. 19). As described above, the initial failure of the weakened portions 160 of a film 120 (FIG. 18) may be followed by increased deflection and elongation of the non-weakened portions 140 (FIG. 19) of the film 120. Deflection and elongation of the non-weakened portions 140 of the film 120 may result in the involvement of a relatively large portion of films 120 which may increase the overall energy-absorbing capability of a composite article 100.

Step 508 of the method 500 of FIG. 23 may include bonding the stretched films 132 to one another with adhesive layers 112 that may be located between the stretched films 132. As shown in FIGS. 2 and 19, one or more adjacent pairs of films 120 may include an adhesive layer 112 for bonding the films 120 together along the faying surfaces of the stretched films 132.

Step 510 of the method 500 of FIG. 23 may include curing and/or solidifying the adhesive layers 112 (FIG. 19). For example, heat and/or pressure may be applied to a composite article 100 (FIG. 19). The heat may cause a reduction in the viscosity of the adhesive layers 112 which may promote the bonding of the stretched films 132 (FIG. 19). Pressure may be applied to consolidate the composite article 100.

Figure 24:
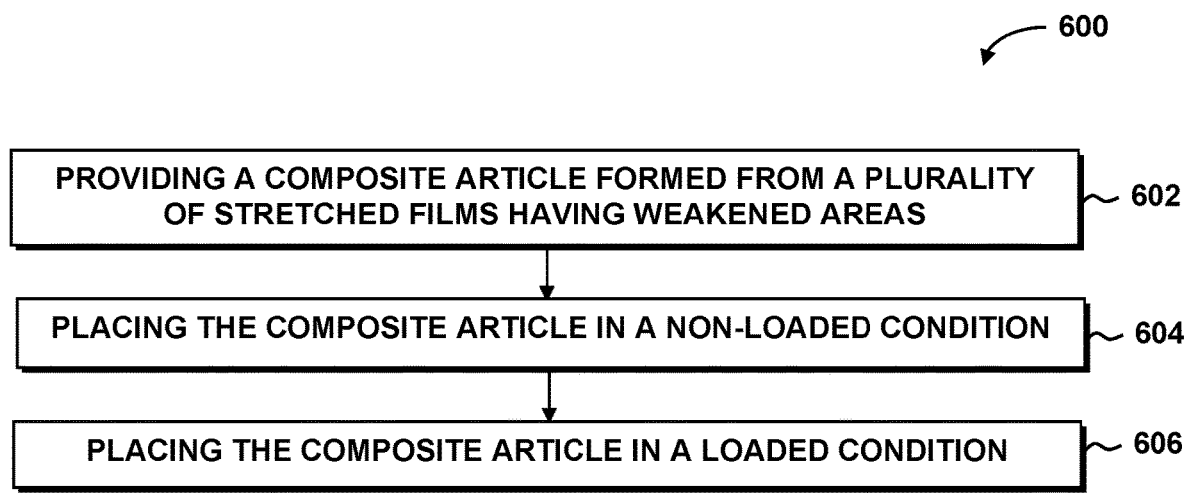
FIG. 24 is a flow chart illustrating one or more operations that may be included in a method of using a composite article.

FIG. 24 is a flowchart of a method 600 of using a composite article 100. Step 602 of the method 600 may include providing a composite article 100 (FIG. 1) having a plurality of films 120 wherein each one of the films 120 may have weakened portions 160 (FIG. 2) and non-weakened portions 140 (FIG. 2) as described above. The weakened portions 160 may have at least one property that may be lower than the property of the non-weakened portions 140.

Step 604 of the method 600 of FIG. 24 may include placing or maintaining the composite article 100 (FIG. 1) in a non-loaded condition. The non-loaded condition may comprise a static condition of the composite article 100. For example, the composite article 100 may comprise a portion of a vehicle 701 (FIG. 25) that is static or substantially non-moving. In an embodiment, the vehicle 701 may comprise an aircraft 700 (FIG. 25).

Figure 25:
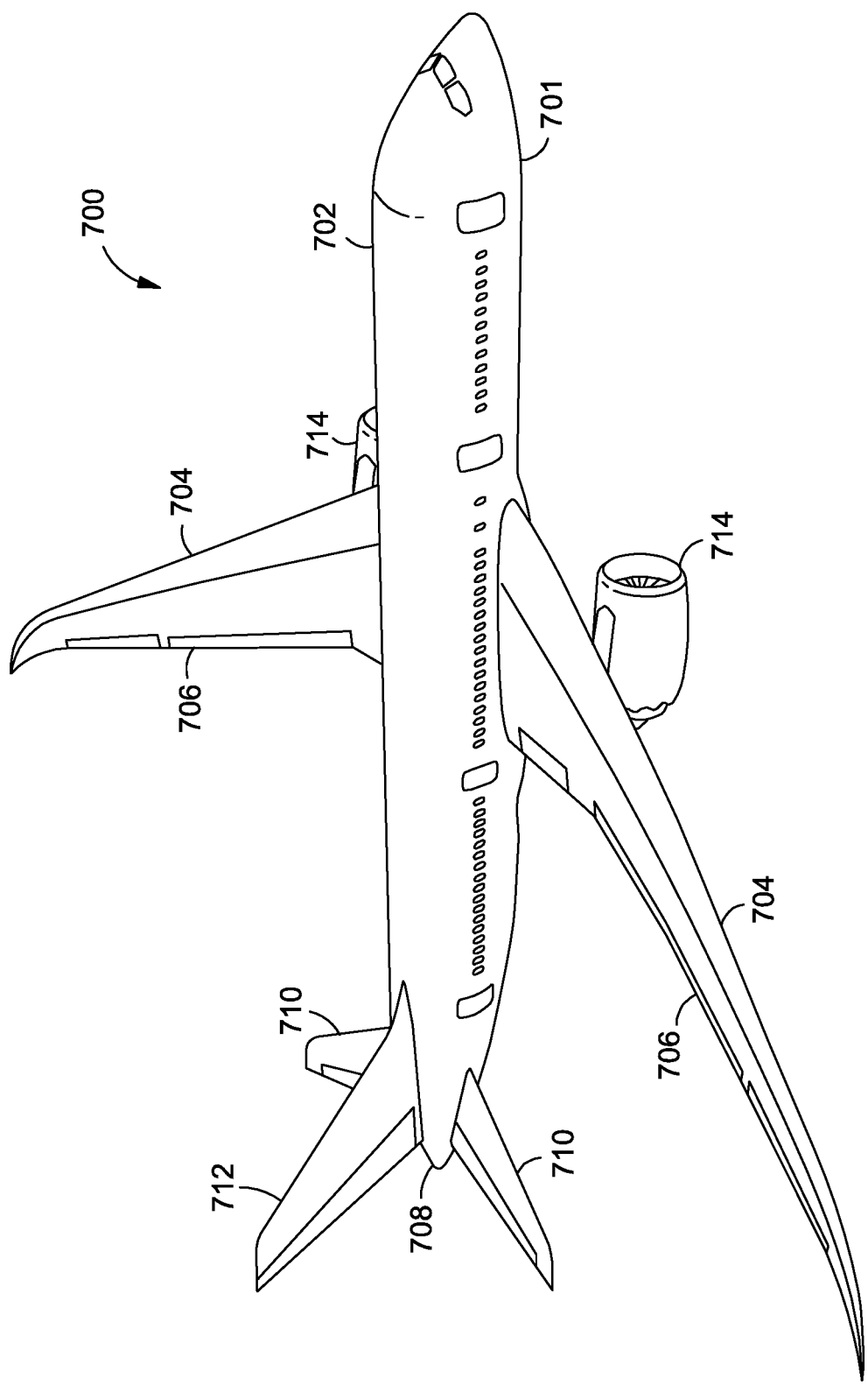
FIG. 25 is a perspective illustration of an aircraft which may incorporate the composite article in one or more embodiments.

Referring to FIG. 25, shown is a perspective illustration of an aircraft 700 which may incorporate one or more embodiments of the composite article 100 (FIG. 1) as disclosed herein. The aircraft 700 may include a fuselage 702 having a pair of wings 704 and a tail section 708 which may include a vertical stabilizer 712 and horizontal stabilizers 710. The aircraft 700 may further include control surfaces 706 and propulsion units 714. The aircraft 700 may be generally representative of one of a variety of vehicles that may incorporate one or more of the composite articles 100 as described herein.

In an embodiment, the composite article 100 (FIG. 1) may comprise a composite panel 104 (FIG. 1). In the non-loaded condition, loads on the composite panel 104 may be limited to static loads due to gravitational force acting on a mass of the composite panel 104 or other static loads acting on the aircraft 700 (FIG. 25). An example of a non-loaded condition may include the aircraft 700 fuselage 702 (FIG. 25) being un-pressurized such as when the aircraft 700 is parked on an airport tarmac.

Step 606 of the method 600 of FIG. 24 may include placing the composite article 100 (FIG. 1) in a loaded condition wherein the vehicle may be in motion and/or the composite panel 104 (FIG. 1) may be subjected to a dynamic load. For example, the vehicle may comprise the aircraft 700 (FIG. 25) in motion on a runway during takeoff. The loaded condition may also comprise the aircraft 700 fuselage 702 (FIG. 25) being pressurized. In the loaded condition, loads on the composite article 100 may include any one of compression loads, tension loads, shear loads, torsion loads, or any combination thereof.

Figure 26:
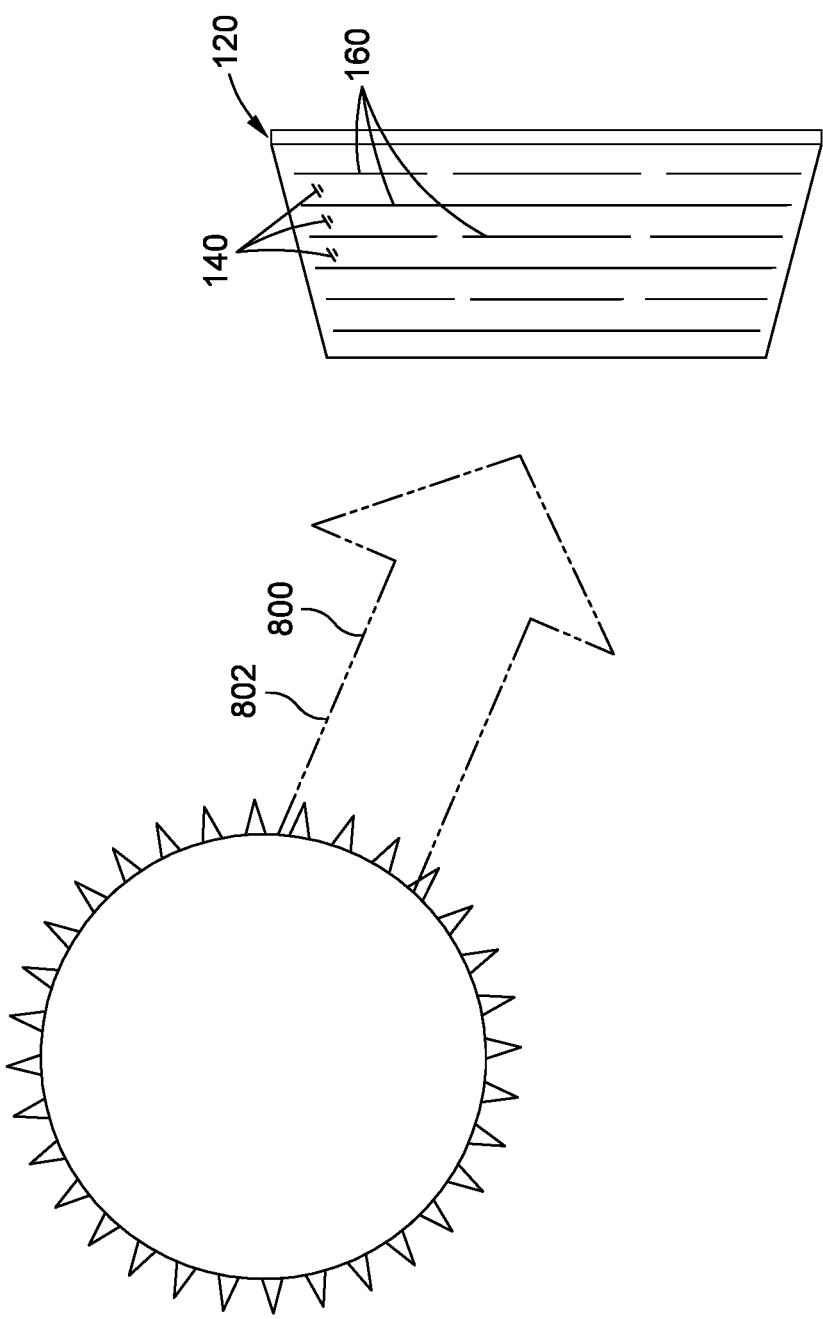
FIG. 26 is an illustration of a non-fibrous film having weakened portions and being subjected to incident light in the form of sunlight.

FIG. 26 shows an example of a film configured as a transparency containing a plurality of weakened portions 160 separating non-weakened portions 140. The film is a non-fibrous film 120 formed of non-fibrous material. In this regard, the film 120 is devoid of fibers such as reinforcing fibers. In the present disclosure, the terms "film" and "non-fibrous film" are used interchangeably. As described above and below, each weakened portion 160 has at least one mechanical property having a value that is lower than the value of the mechanical property of the non-weakened portion 140. For example, each weakened portion 160 may have a lower ultimate strain or failure strain than the ultimate strain or failure strain of the non-weakened portions 140. Alternatively or additionally, as mentioned above, each weakened portions 160 may have a lower tensile strength and/or tensile modulus and/or a lower toughness than the tensile strength or tensile modulus or toughness of the non-weakened portions 140. In the present disclosure, toughness may be described as interlaminar fracture toughness and may include mode I, mode II, and/or mode III interlaminar fracture toughness.

The film 120 of FIG. 26 is shown subjected to incident light 802 in the form of sunlight 800. As mentioned above, the film 120 is transparent and has optical characteristics (i.e., optical properties). In the present disclosure, the optical characteristics of a film 120 or a composite article 100 are for one or more wavelength bands of interest, as described in greater detail below. In the present disclosure, a film 120 or a composite article 100 (e.g., formed as a laminate of non-fibrous films 120 and optional non-weakened layer(s) 114—e.g., see FIGS. 41-47) has a clarity of at least 75 percent. In the present disclosure, the clarity of a film 120 or a composite article 100 may be generally described as the optical distinctiveness with which an object is seen when viewed through the film 120 or composite article 100. As described in greater detail below, the clarity of a film 120 or composite article 100 may be dependent upon the amount of narrow-angle scattering (FIG. 29) of light passing through the film 120 or composite article 100. Although the presently-disclosed film 120 or composite article 100 has a clarity of at least 75 percent, in a further example, the film 120 or composite article 100 more preferably exhibits a clarity of at least 90 percent. Even more preferably, the film 120 or composite article 100 may exhibit a clarity of at least 95 percent. For example, the film 120 or composite article 100 may exhibit a clarity of at least 97 percent. Most preferably, the film 120 or composite article 100 may exhibit a clarity at least 99 percent. The clarity of the film 120 or composite article 100 may also be defined in terms of a range. In one example, the film 120 or composite article 100 may exhibit a clarity within the range of 75-95 percent, or a clarity of 75-97 percent, or a clarity of 90-95 percent, or a clarity of 95-99 percent. In another example, a film 120 or a composite article 100 may exhibit a clarity of from 90-99.9 percent or, more preferably, a clarity of from 95-99.9 percent. Even more preferably, a film 120 or a composite article 100 may exhibit a clarity of from 99-99.9 percent or, most preferably, a clarity of from 97-99.9 percent.

The optical characteristic of the film 120 or a composite article 100 may additionally include haze and/or transmission. In the present disclosure, an increase in haze may be generally described as a loss in contrast with which an object is seen when viewed through a film 120 or a composite article 100 while the resolution or visual distinctiveness of the object is maintained. Conversely, a reduction in clarity may be described as a loss in resolution or distinctiveness of an object viewed through the film 120 or composite article 100 while the contrast of the object is maintained. As described in greater detail below, the haze of a film 120 or composite article 100 may be dependent upon the amount of wide-angle scattering (FIG. 30) of light passing through the film 120 or composite article 100.

In one example, the film 120 or composite article 100 preferably has a haze of less than 10 percent within one or more of the presently-disclosed wavelength bands or interest. More preferably, the haze of the film 120 or composite article 100 may be less than 5 percent. Even more preferably, the haze of the film 120 or composite article 100 may be less than 3 percent. Most preferably the haze of the film 120 or composite article 100 may be less than 1 percent. The haze of the film 120 or composite article 100 may also be defined in terms of a range. For example, the haze of the film 120 or composite article 100 may be within the range of 5-10 percent. More preferably, the haze of the film 120 or composite article 100 may be within the range of 1-10 percent or even more preferably, within 1-3 percent. Most preferably, the haze of the film 120 or composite article 100 may be within the range of 0-3 percent.

In the present disclosure, the transmission of a film 120 or a composite article 100 may be generally described as the amount of incident light 802 (e.g., within one or more of the presently-disclosed wavelength bands or interest) that passes through the film 120 or composite article 100 without being absorbed or scattered. The presently-disclosed film 120 or composite article 100 may have a transmission of greater than 25 percent. Preferably, a film 120 or composite article 100 may have a transmission of greater than 50 percent. More preferably, a film 120 or composite article 100 may have a transmission of greater than 70 percent. Even more preferably, a film 120 or composite article 100 may have a transmission of greater than 80 percent. Most preferably, a film 120 or composite article 100 may have a transmission of greater than 90 percent. In another example, a film 120 or composite article 100 may have a transmission of not less than 75 percent. In a further example, a film 120 or composite article 100 may have a transmission of not less than 60 percent. In a still further example, a film 120 or composite article 100 may have a transmission of not less than 50 percent. In another example, a film 120 or composite article 100 may have a transmission of not less than 20 percent. The transmission of a film 120 or composite article 100 may also be defined in terms of ranges. For example, a film 120 or composite article 100 preferably as a transmission within the range of 25-90 percent. Preferably, a film 120 or composite article 100 has a transmission within the range of 50-90 percent. More preferably, a film 120 or composite article 100 has a transmission within the range of 70-90 percent. Even more preferably, a film 120 or composite article 100 has a transmission within the range of 80-90 percent. Most preferably, a film 120 or composite article 100 has a transmission within the range of 85-94 percent.

Figure 27:
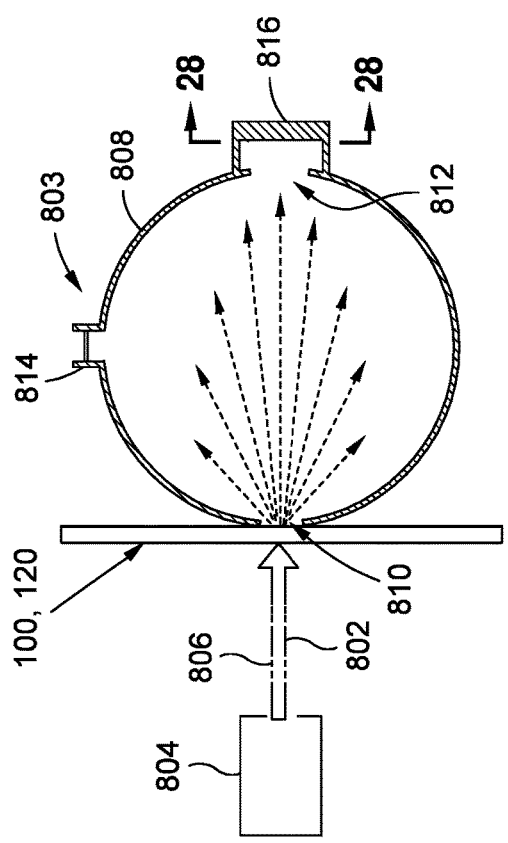
FIG. 27 is an illustration of an example of a hazemeter for measuring optical characteristics of clarity, haze and transmittance exhibited by a non-fibrous film or laminate within a wavelength band of interest.

Referring to FIGS. 27-30, one or more of the above-mentioned optical characteristics of a transparency (e.g., a film 120 or composite article 100) may be measured using a hazemeter 803 and/or a spectrophotometer. For example, FIG. 27 illustrates an example of a hazemeter 803 for measuring the clarity, haze and/or transmission of a transparency. Although described in the context of a film 120, the hazemeter 803 may also be implemented for measuring the optical characteristics of a composite article 100 such as a laminate containing a plurality of films 120. The hazemeter 803 includes a light source 804 and an integrating sphere 808 having a detector 814 and a sensor 816. The light source 804 emits a beam 806 of incident light 802 toward a film 120 (or composite article) positioned over a sphere entrance 810 to the integrating sphere 808. The light source 804 may emit the incident light 802 along a direction that is locally normal to the film 120. A portion of the incident light 802 may be reflected off the film 120, a portion of the incident light 802 may be absorbed by the film 120, and a portion of the incident light 802 may pass through the film 120. The portion of the incident light 802 that passes through the film 120 enters the sphere entrance 810. The integrating sphere 808 may be coated with a white matte finish to promote uniform diffusion of light within the integrating sphere 808.

Figure 28:
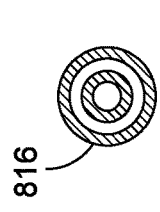
FIG. 28 is an illustration of an example of a sensor for measuring narrow-angle scattering of light passing through a non-fibrous film or laminate for determining the clarity exhibited by the film or laminate.
Figure 29:
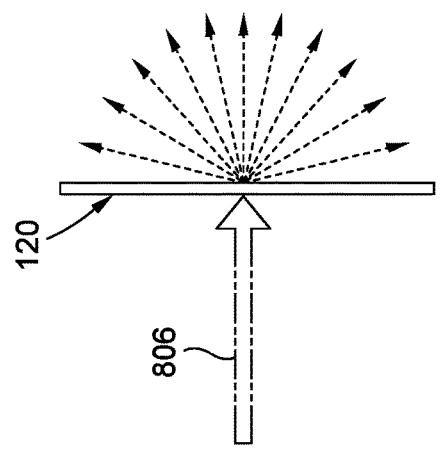
FIG. 29 is an illustration of narrow-angle scattering of light passing through the non-fibrous film or laminate of FIG. 27.

In FIG. 27, a portion of the light passing through the film 120 may undergo narrow-angle scattering which is shown in FIG. 29 and which may be defined as forward-scattered light that deviates by less than approximately 2.5 degrees relative to the incident beam 806 which is locally normal to the film 120. Narrow-angle scattering may occur as a result of relatively small inhomogeneities (e.g., dimensions that are less than the wavelength of the incident light 802) in the film 120 and which have refractive indices that are different than the refractive index of the film 120. Narrow-angle scattering may also occur as a result of particles or voids in the film 120 and/or as a result of imperfections on one or both of the film surfaces 128. The sensor 816 located at the sphere exit 812 is configured to measure the amount of light that is narrow-angle scattered. FIG. 28 shows an example of the sensor 816 for measuring narrow-angle scattering of light. The amount of narrow-angle scattering measured by the sensor 816 represents the clarity of the film 120 and is expressed as a percentage of the total amount of light transmitted through the film 120. In some examples, the weakened portions 160 of a film 120 (e.g., a non-fibrous film) may reduce the clarity of the film 120 (e.g., relative to a film lacking weakened portions) due to narrow-angle scattering of light passing through the weakened portions 160. The clarity of a film 120 is important for applications for which the ability to discern (e.g., via an imaging system or with the naked eye) crisp features of an object is of great importance. For example, clarity is of great importance in being able to read signs in the distance. Clarity is also of great importance for applications or systems that require an accurate determination of the location of a feature, such as positioning systems and/or object acquisition systems.

Figure 30:
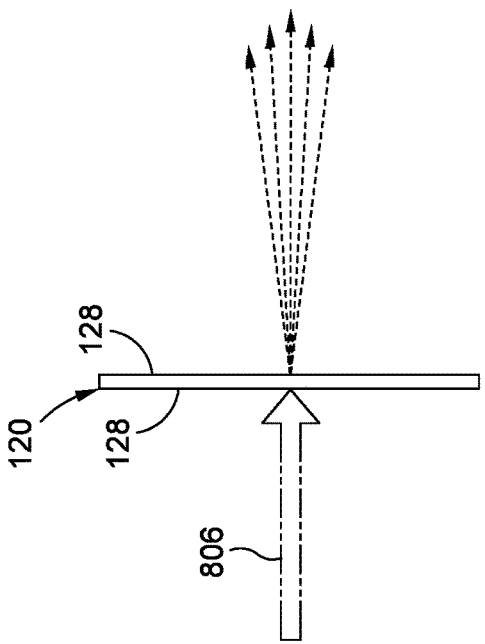
FIG. 30 is an illustration of wide-angle scattering of light passing through the non-fibrous film or laminate of FIG. 27.

FIG. 30 is an illustration of wide-angle scattering of light passing through a film 120 and which may be defined as forward-scattered light that deviates by more than approximately 2.5 degrees relative to the incident beam 806 which is locally normal to the film 120. Wide-angle scattering may occur as a result of relatively large inclusions in the film 120 such as particles and/or voids having dimensions (e.g., a particle width) that are equal to or greater than the wavelength of the incident light 802. The detector 814 mounted on the side of the integrating sphere 808 is configured to measure the amount of wide-angle scattering of light passing through the film 120. The amount of wide-angle scattering measured by the detector 814 represents the haze of the film 120 and is expressed as a percentage of the total amount of light that is transmitted through the film 120.

The transmission (i.e., the optical transmittance) of a film 120 may be described as the amount (e.g., percentage) of incident light 802 that passes through the film 120 without being absorbed or reflected. The film 120 may exhibit one or more of the above-described optical characteristics (e.g., clarity, haze, and/or transmission) within one or more environmental parameters. For example, as mentioned above, a film 120 may exhibit one or more optical characteristics within a predetermined wavelength band of interest of the incident light 802. In one example, the wavelength band of interest may include the visible spectrum (e.g., approximately 380-750 nm) and/or the wavelength band of interest may include at least a portion of the infrared spectrum (e.g., approximately 750 nm to 1 mm). Within the infrared spectrum, a film 120 may exhibit one or more of the presently-disclosed optical characteristics within a wavelength band of interest include the near-infrared spectrum (e.g., approximately 750 nm to 2500 nm). However, the above-noted wavelength bands of interest are non-limiting, and a film 120 may exhibit one or more optical characteristics at wavelengths that extend beyond or are outside of the visible spectrum and/or the infrared spectrum. For example, the wavelength band of interest may comprise or may include at least a portion of the ultraviolet spectrum (e.g., approximately 10 nm to 400 nm) and/or at least a portion of the microwave spectrum (e.g., approximately 1 mm to 1 m).

Alternatively or additionally, a film 120 may exhibit one or more optical characteristics (e.g., clarity, haze, and/or transmission) within a predetermined temperature range of the film 120. For example, a film 120 may exhibit one or more optical characteristics within a temperature range of between −65 F to +200 F. In aerospace applications such as for civilian, commercial and/or military aircraft, the temperature range may be between −40 F to +160 F. In other applications such as underwater applications, the temperature range within which a film 120 exhibits the optical characteristics may be within +40 F to +110 F. In still other applications, the temperature range within which a film 120 exhibits one or more optical characteristics may be near room temperature which may be within the range of +68 F to +72 F.

Figure 31:
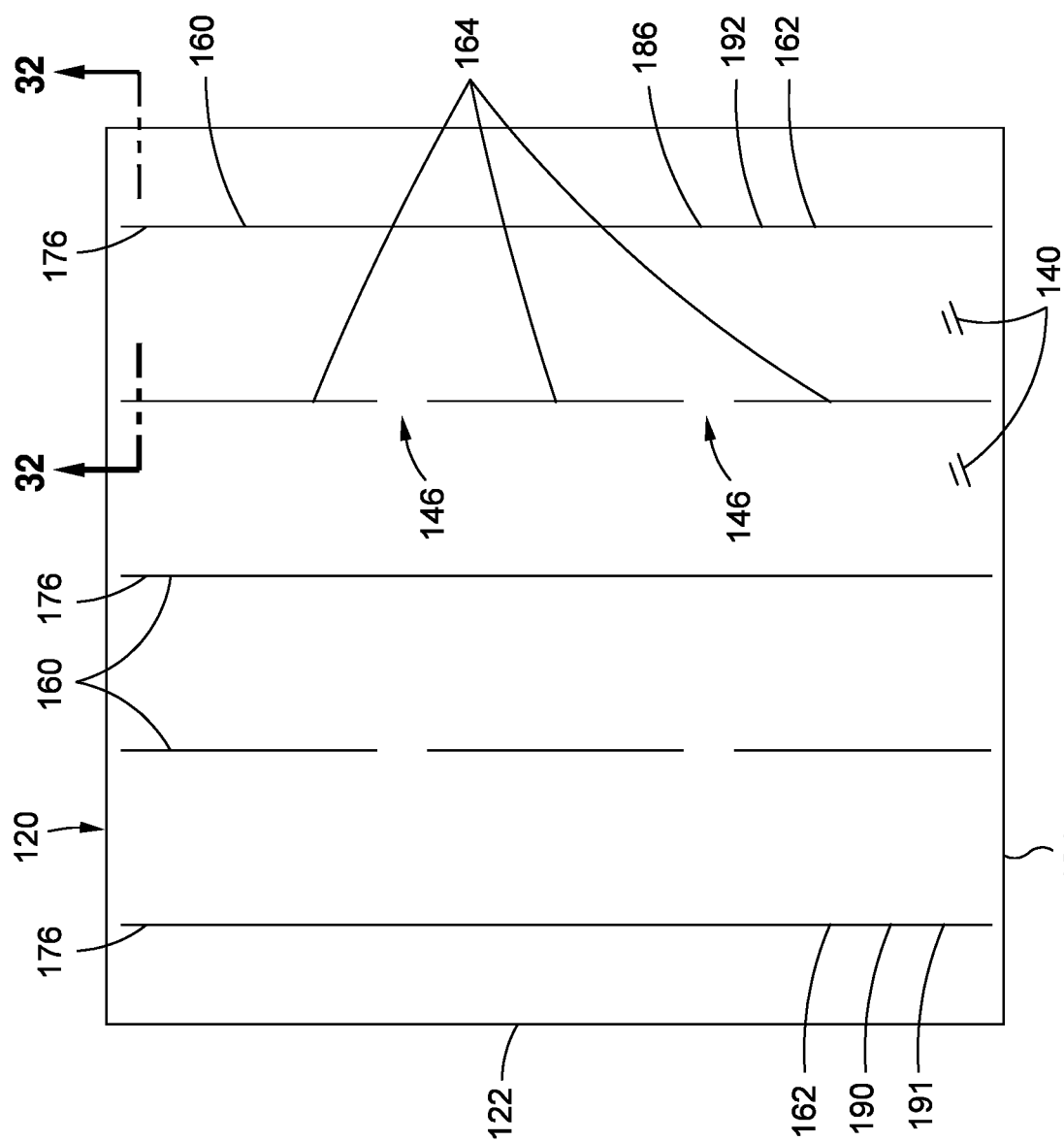
FIG. 31 is a top-down view of an example of a non-fibrous film having a plurality of parallel weakened portions arranged in the shape of line.

FIG. 31 is a top view of a non-fibrous film 120 having a plurality of parallel weakened portions 160 arranged in the shape of line. For example, the film 120 may include one or more continuous weakened portions 160 each in the shape of a line 176 extending substantially along the entire film length 122 as shown in FIGS. 4 and 31. Alternatively or additionally, the film 120 may include one or more of end-to-end series of lengthwise weakened segments 164. Each end-to-end pair of lengthwise weakened segments 164 may be separated by a non-weakened connection 146 similar to that which is shown in FIGS. 16-17 and described above. In an embodiment, one or more continuous weakened portions 160 and one or more end-to-end series of lengthwise weakened segments 164 may co-exist in the same non-fibrous film 120 and/or in different non-fibrous films 120 of the same composite article 100.

Although FIG. 31 shows the weakened portions 160 formed in the shape of a line 176 when the film 120 is viewed from a top-down direction, the weakened portions 160 may be formed in any one of a variety of shapes. For example, the film 120 may include a plurality of weakened portions 160 arranged in a tortuous path 180 as shown in FIGS. 9-11. As mentioned above, adjacent pairs of tortuous paths 180 may optionally include lengthwise weakened segments 164 offset from each another and interconnected by transverse weakened segments 166 to form a stepped shape 182. Alternatively or additionally, a tortuous path 180 may be arranged in a sinusoidal shape 184 which may avoid sharp corners that may otherwise occur in a stepped shape 182. In any one of the embodiments disclosed herein the spacings between adjacent weakened paths may be different at different locations within the film 120 as a means to vary the energy-absorbing capability of the film 120 at different locations within the film 120 in order to achieve a desired global failure mode of a film 120 or a composite article 100 containing one or more films 120. Additionally, for any one of the tortuous path 180 embodiments disclosed herein, the periodicity and/or the amplitude of the stepped shape 182 (FIGS. 10-11) and/or the sinusoidal shape 184 (FIGS. 12-15) may be varied at different locations within the film 120 as a means to achieve a desired global failure mode of the film 120.

Similar to the above-described film 120 example shown in FIG. 4, the weakened portions 160 of the film 120 in FIG. 31 extend along a lengthwise path 162 oriented parallel to the film length 122. The non-fibrous film 120 may optionally be a stretched film 132 (FIG. 4) as described above and the weakened portions 160 may be oriented parallel to the stretched direction 134 (FIG. 4) which may be parallel to the film length 122. In FIG. 31, the weakened portions 160 may be uniformly spaced apart from each other across the film width 124 to define a plurality of non-weakened portions 140 that have substantially uniform non-weakened portion widths 144. However, as mentioned above, the weakened portions 160 may be non-uniformly spaced across the film width 124 to achieve a desired failure mode of the film 120.

In one example of the film 120 of FIG. 31, the weakened portion 160 may be formed by geometric modification 192 of the film 120 such as by configuring each weakened portion 160 as a slice 186 extending at least partially into the film thickness 126 (e.g., FIG. 32). However, the weakened portions 160 of a non-fibrous film 120 may be formed by alternative geometric modification 192 methods described above such as by forming one or more of the weakened portions 160 as a notch or a groove (e.g., a V-shaped groove of FIG. 6), as a continuous score (not shown) in the film surface 128, as a series of indentations 198 (e.g., FIG. 8) extending partially into the film thickness 126, or as a series of perforations (not shown) extending through the full film thickness 126 from one film surface 128 to the opposite film surface 128.

Alternatively, one or more of the weakened portions 160 of a non-fibrous film 120 may be formed by chemical modification 190 of the film 120 as described above. For example, a weakened portion 160 may be formed by locally radiating a portion of a non-fibrous film 120 to form an irradiated portion 191 similar to that which is shown in FIG. 5 and described above. In one example, an irradiated portion 191 (e.g., a weakened portion 160) may be formed by subjecting a narrow band of the film 120 to ultraviolet radiation or to other forms of radiation such as electron beam radiation, as mentioned above. Subjecting the portion of the film 120 to radiation may alter and/or weaken the molecular bonds of the irradiated portion of the film 120, and may thereby locally reduce the mechanical properties (e.g., the ultimate strain or failure strain or toughness) of the film 120 within the weakened portion 160. Although FIG. 5 illustrates the weakened portion depth 172 of the irradiated portion 191 as extending through the full film thickness 126, the film 120 may be irradiated in a manner to limit the weakened portion depth 172 to less than the full film thickness 126. For example, a non-fibrous film 120 may be irradiated or lasered to form a partial-thickness weakened portion 160 extending from the film surface 128 into the non-fibrous film 120 to a weakened portion depth 172 that is less than the full thickness of the non-fibrous film 120. Alternatively, a non-fibrous film 120 may be irradiated or lasered to form a full-thickness weakened portion 160 (e.g., FIGS. 33 and 36) that extends the full thickness of the film 120 between the opposing film surfaces 128 as shown in FIG. 4.

In another example, one or more weakened portions may be formed in a stretched film by locally energizing one or more portions of the pre-stretched film, as described above. The stretched film may be a unidirectionally stretched film or a bi-directionally stretched film as described above. A bi-directionally stretched film may be stretched along a lengthwise direction and along a transverse direction 136. The weakened portions 160 may be generally aligned with or parallel to the stretched direction 134 (e.g., FIGS. 4-7) of the stretched film 132. However, in other examples, one or more of the weakened portions 160 of a stretched film 132 may be oriented along one or more directions that are non-parallel to the stretched direction 134 of the stretched film 132.

The pre-stretching of the film generally causes alignment and/or increased organization of the molecular chains resulting in an increase in the strength (e.g., ultimate tensile strength) of the film. One or more weakened portions may be formed in a pre-stretched film by heating portions of the stretched film via conductive or convective heating, by laser heating using a laser beam (not shown), by subjecting to radiation (e.g., ultraviolet radiation), and/or by ultrasonic heating using an ultrasonic device (not shown). The molecular chains in the locally heated portions of the stretched film may become less aligned and/or less organized an/or may be weakened which may result in a decrease in the strength of the locally heated portions (e.g., weakened portions). Advantageously, weakened portions formed in a pre-stretched film in the above-described manner may retain the same level of optical characteristics (e.g., clarity, haze and/or transmission) as the optical characteristics of the non-weakened portions of the stretched film.

Referring to FIGS. 32-39, shown are non-exclusive examples of various cross-sectional shapes and orientations of weakened portions 160. Although each one of the weakened portions 160 is illustrated as a geometric modification 192 in the form of a slice 186, 188 in the non-fibrous film 120, the weakened portions 160 in FIGS. 32-39 may be formed by other types of geometric modification 192 of the non-fibrous film 120 or by chemical modification 190 such as by radiation or lasering. A weakened portion 160 formed by radiation or lasering may have the same general shape, depth, and/or orientation of any one of the cross-sectional shapes of FIGS. 32-39, but may be wider than the cross-sectional shapes of FIGS. 32-39. Regarding geometric modification, any one of the weakened portions 160 in FIGS. 32-39 may be formed as a V-shaped groove (e.g., FIG. 6), as a groove or notch (e.g., not shown) having an orthogonal (e.g., square, rectangular) cross section, or in any other one of a variety of other shapes, and are not limited to a slice 186, 188. In some examples, a groove or a notch may be filled with matrix material 110 (e.g., FIG. 6) or adhesive that is preferably optically matched to the non-fibrous film 120, as mentioned above. For example, matrix material 110 or adhesive filling a geometric modification 192 preferably has a refractive index that substantially matches the refractive index of the non-fibrous film 120 within a wavelength band of interest such as within the visible spectrum and/or the infrared spectrum. Alternatively or additionally, matrix material 110 or adhesive filling a geometric modification 192 may have a temperature coefficient of refractive index that substantially matches the temperature coefficient of refractive index of the non-fibrous film 120 within at least a portion of one of the above-mentioned temperature ranges (e.g., between −65 F and +200 F).

Referring to FIG. 32, shown is a cross-section of a non-fibrous film 120 in which the weakened portions 160 are each formed as a partial-thickness slice 186 extending from the film surface 128 to a weakened portion depth 172 that is less than the full film thickness 126. As mentioned above, a slice 186, 188 may be formed as an infinitely-thin cut (not shown). The opposing side walls of an infinitely thin slice 186, 188 may be in contact with each other. The slice 186, 188 may locally weaken the non-fibrous film 120 without removing material from the non-fibrous film 120. A slice 186, 188 may be formed in a film 120 by using a relatively thin blade of a cutting instrument (not shown) drawn along the direction of a weakened path, although slices may be formed using alternative means. A slice 186, 188 with a straight cross-section 181 such as the slices illustrated in FIGS. 32-37 may be formed using a straight blade of a cutting instrument (not shown) drawn through the film 120 along the direction of the film length 122. Slices 186, 188 having a non-straight shape such as the shapes shown in FIGS. 38-39 and described below may be formed using a relatively thin non-straight blade (not shown) drawn along the direction of the film length 122.

In FIG. 32, the slices 186, 188 are each formed as a partial-thickness slice 186. Each one of the partial-thickness slices 186 has a straight cross-section 181 in which the plane of the cross-section is perpendicular or normal to a lengthwise direction of the weakened portion 160. Each one of the partial-thickness slices 186 extends from the same film surface 128. Each one of the partial-thickness slices 186 is shown oriented in the same direction such that the cross-section of the partial-thickness slices 186 are parallel to one another. In addition, each partial-thickness slice 186 is perpendicular to the film surface 128. In the example shown, the partial-thickness slices 186 extend to a weakened portion depth 172 of approximately 50 percent of the film thickness 126. However, a partial-thickness slice 186 may extend to a weakened portion depth 172 of up to 90 percent of the film thickness 126. In one example, a partial-thickness slice 186 may be formed at a depth of anywhere between 10-90 percent of the film thickness 126, although a slice may be formed at a depth outside of the 10-90 percent range.

FIG. 33 is a sectional view of a non-fibrous film 120 having weakened portions 160 in which the slices are full-thickness slices 188. Each full-thickness slice 188 extends between the opposing film surfaces 128 of the non-fibrous film 120. Each one of the full-thickness slices 188 has a straight cross-section 181. In addition, each one of the full-thickness slices 188 is oriented perpendicular to the film surfaces 128 such that all of the full-thickness slices 188 are parallel to each another. As mentioned above, although the weakened portions 160 are each shown as a full-thickness slice 188, the weakened portions 160 may be formed by geometric modification 192 into a shape other than a full-thickness slice 188. For example, each one of the weakened portions 160 may be formed as a full-thickness weakened portion 160 having a narrow V-shaped cross section similar to the configuration shown in FIG. 6. Alternatively, the weakened portions 160 may be formed by chemical modification 190 such as by locally irradiating or applying laser energy to a portion of the non-fibrous film 120 in order to form each full-thickness weakened portion 160.

FIG. 34 is a sectional view of a non-fibrous film 120 in which the weakened portions 160 are configured as partial-thickness slices 186 extending from opposite film surfaces 128 of the film 120. In the example shown, each one of the partial-thickness slices 186 is oriented perpendicular to the film surface 128 from which it extends. In this regard, the partial-thickness slices 186 are parallel to each other. Although the partial-thickness slices 186 in FIG. 34 are shown as extending from alternating film surfaces 128, a non-fibrous film 120 may include any number of partial-thickness slices 186 extending from one of the film surfaces 128 for every partial thickness slice that extends from the opposite film surface 128 in order to achieve a desired global failure mode of the non-fibrous film 120.

FIG. 35 is a sectional view of a non-fibrous film 120 in which the partial-thickness slices 186 are locally non-perpendicular to the film surface 128. In addition, the partial-thickness slices 186 are oriented in the same direction. In this regard, any one of the film 120 embodiments disclosed may include at least one adjacent pair of weakened portions 160 (e.g., slices 186, 188; irradiated portions 191, etc.) having cross-sectional shapes that are oriented in approximately the same direction. Orienting partial-thickness slices 186 or full-thickness slices 188 in the same direction may simplify manufacturing. Orienting partial-thickness slices 186 or full-thickness slices 188 non-perpendicular to the film surfaces 128 may improve the optics of the non-fibrous film 120. In the example shown, each partial-thickness slice 186 is shown oriented at an angle of approximately 60 degrees relative to the film surface 128. However, the partial-thickness slices 186 may be oriented at any angle relative to a film surface 128. For example, each partial-thickness slice 186 may be oriented at an angle of up to approximately 85 degrees relative to the film surface 128. As mentioned above with regard to FIG. 32, the partial-thickness slices 186 of FIG. 35 may extend to a weakened portion depth 172 of up to 90 percent of the film thickness 126. However, in some embodiments, the weakened portion depth 172 of a partial-thickness slice 186 may extend up to 99 percent of the film thickness 126 in order to leave a thin web (not shown) of film material to connect laterally adjacent weakened portions 160 as a means to improve handling and processing of the non-fibrous film 120.

FIG. 36 is a sectional view of a non-fibrous film 120 having full-thickness slices 188 that are each oriented locally non-perpendicular to the film surface 128. In addition, the full-thickness slices 188 are oriented in the same direction such that the full-thickness slices 188 are parallel to each other. The full-thickness slices 188 of FIG. 36 may be configured in a manner similar to the full-thickness slices 188 described above with regard to FIG. 33. As mentioned above, the weakened portions 160 shown in FIG. 36 are not limited to being configured as full-thickness slices 188, but may be configured by chemical modification 190 such as by subjecting the non-fibrous film 120 to chemical modification 190 using radiation and or laser energy to form a weakened portion 160 having a cross-sectional shape and/or orientation similar to FIG. 36.

FIG. 37 is a sectional view of a non-fibrous film 120 having partial-thickness slices 186 oriented in different directions. The partial-thickness slices 186 may be configured similar to that described above in FIGS. 32 and 35, except for the orientation of the partial-thickness slices 186. In any one of the film 120 embodiments disclosed herein, a weakened portion 160 (e.g., a slice) may be oriented at an angle of between 10-89 degrees relative to film surface 128 and an adjacent one of the weakened portions 160 of the pair may be oriented at an angle of between 10-89 degrees in an opposite direction.

FIG. 38 is a sectional view of a non-fibrous film 120 having weakened portions 160 in the form of full-thickness slices 188 each having a non-straight cross-section 183 such as a tortuous cross-section 185. As mentioned above, the plane of the cross-section is perpendicular or normal to a lengthwise direction of the weakened portion 160. Each one of the weakened portions 160 in FIG. 38 is configured as a full-thickness slice 188 having a stepped or Z-shaped cross-section. The Z-shaped cross-section is shown having 90 degree bends connecting straight sections of the Z-shaped cross-section. However, the straight sections of a Z-shaped cross section may have non-90 degree bends. In addition, the bends connecting the straight sections may positioned at any depth within the non-fibrous film 120, and are not limited to the approximate 50 percent depth shown in FIG. 38. In addition, although the straight sections are shown as being perpendicular to the film surfaces 128, the straight sections may be oriented at non-perpendicular angles relative to the film surfaces 128. As mentioned above, slices having a non-straight shape such as the Z-shape cross-section of FIG. 38 may be formed using a relatively thin non-straight blade (not shown) having the desired cross-sectional shape of the weakened portion 160. To form the Z-shaped cross section, a non-straight blade may be drawn through the non-fibrous film 120 along the desired direction of the weakened path such as along the direction of the film length 122.

FIG. 39 is a sectional view of a non-fibrous film 120 having slices in a tortuous cross-section 185. The tortuous cross-section 185 of each full-thickness slice 188 is an S-shaped cross-section. The portion of the S-shaped cross sections located near the film surface 128 is locally non-perpendicular to the film surface 128. In the example shown, the portion of the S-shaped cross-section nearest each film surface 128 is tangent to the film surface 128. The S-shaped cross section shown in FIG. 39 is an example of a tortuous cross-section 185, and is not to be construed as limiting the shape of the weakened portions 160. Although FIGS. 38-39 illustrate tortuous cross-sections 185 as being full-thickness weakened portions 160, it is contemplated that a film 120 may include partial-thickness weakened portions 160 (not shown) formed in a tortuous cross-sectional shape.

Figure 40:
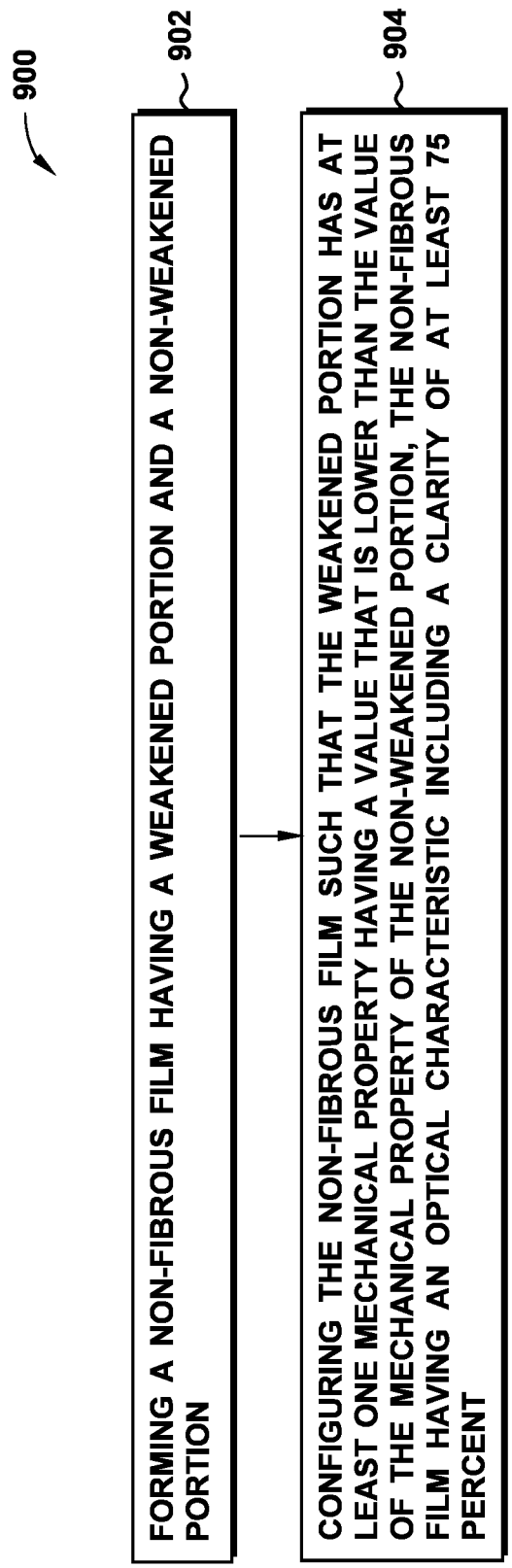
FIG. 40 is a flow chart of a method of manufacturing a film having weakened portions.

Referring to FIG. 40, a method 900 of manufacturing a film 120 includes step 902 of forming a non-fibrous film 120 having one or more weakened portions 160 and one or more non-weakened portions 140 (e.g., FIGS. 31-39) in a manner similar to the method 400 described above with regard to FIG. 22. The weakened portions 160 may be formed in a non-fibrous film 120 configured as a stretched film 132. Alternatively, the weakened portions 160 may be formed in a non-fibrous film 120 that is non-stretched, after which the non-fibrous film 120 may be stretched. Regardless of whether the non-fibrous film 120 is pre-stretched or non-stretched during formation of the weakened portions 160, step 904 of the method 900 includes configuring the non-fibrous film 120 such that the weakened portions 160 have at least one mechanical property (e.g., tensile strength, a tensile modulus, an ultimate strain, a failure strain, a toughness) having a value that is lower than the value of the mechanical property of the non-weakened portions 140.

The method 900 may include forming the weakened portions 160 by geometrically modifying the non-fibrous film 120 and/or by chemically modifying the non-fibrous film 120 to form the weakened portions 160. For example, chemically modifying the non-fibrous film 120 may include subjecting a localized portion of the non-fibrous film 120 to radiation as described above. A non-fibrous film 120 formed by the above-described method 900 has an optical characteristic including a clarity of at least 75 percent, or any one of the above-described values or range of values of clarity. The composite article 100 may additionally have a haze of less than 10 percent, or any one of the above-described alternative values or range of values of haze, and/or the composite article 100 may have a transmission of greater than 50 percent, or any one of the above-described alternative values or ranges of values of transmission.

Figure 41:
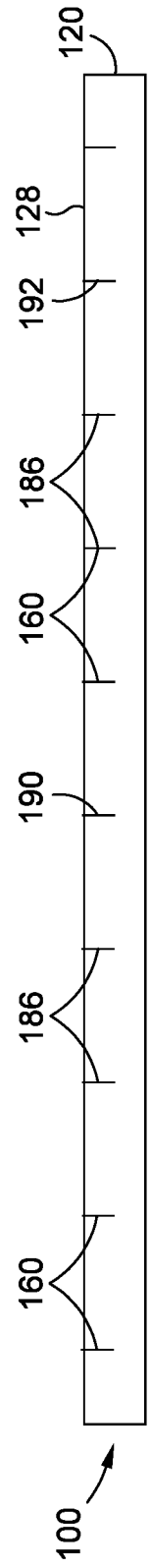
FIG. 41 is a side view of a composite article containing a single non-fibrous film.

Referring to FIG. 41, shown is a side view of an example of a composite article 100 containing a single non-fibrous film 120. The non-fibrous film 120 is shown having a plurality of weakened portions 160 in the form of partial-thickness slices 186 formed in one of the film surfaces 128. Although FIG. 41 illustrates the weakened portions 160 as partial-thickness slices 186, the composite article 100 may include weakened portions 160 configured and/or oriented in any one or more of the examples described and/or shown herein including any one of the examples shown in FIGS. 32-40.

Referring to FIGS. 42-47, shown are examples of a composite article 100 having a plurality of films 120 arranged in a stacked formation 130. The composite article 100 may include a relatively thin adhesive layer 112 of matrix material 110, resin, or other material located between at least one pair of the films 120 for adhesively bonding together the films 120. As described above, the adhesive layer 112 may be optically matched to the films 120. For example, the adhesive layer 112 and the films 120 may have refractive indices that are substantially equivalent within a wavelength band of interest such as within the visible spectrum and/or the infrared spectrum.

In FIGS. 42-47, at least one of the films 120 of the composite article 100 is a non-fibrous film 120 configured as any one of the examples described above and/or illustrated in the figures. In this regard, the non-fibrous film 120 has at least one non-weakened portion 140 and at least one weakened portion 160. As described above, the weakened portion 160 has at least one mechanical property having a value that is lower than the value of the mechanical property of the non-weakened portion 140. The composite article 100 has an optical characteristic including a clarity of at least 75 percent. Alternatively, the composite article 100 may have any one of the values or ranges of clarity defined above for a non-fibrous film 120. Additionally, the composite article 100 may have a haze of less than 10 percent or any one of the ranges or values of haze defined above for a non-fibrous film 120. Alternatively or additionally, the composite article 100 may have a transmission of greater than 50 percent or any one of the ranges or values defined above for a non-fibrous film 120.

Figure 42:
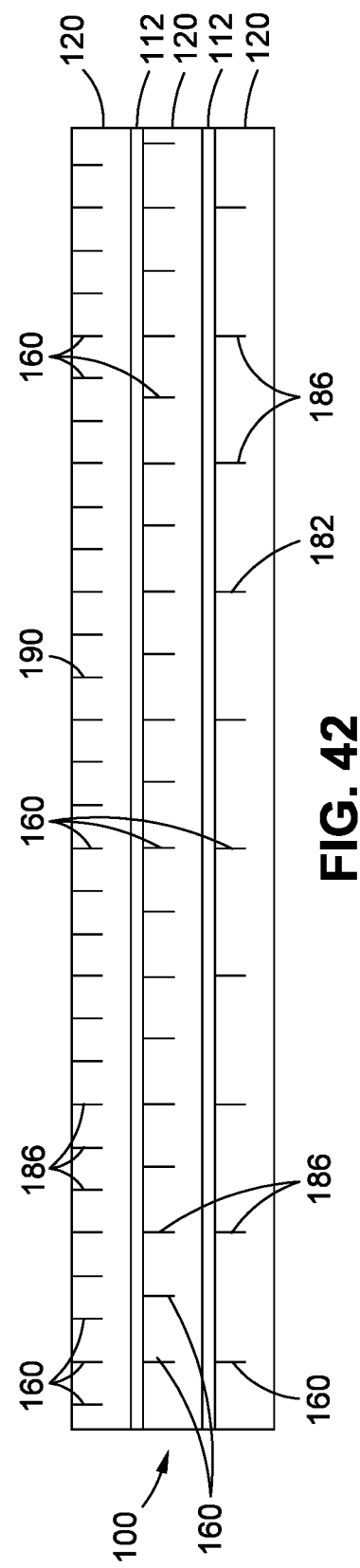
FIG. 42 is a side view of a composite article made up of a plurality of non-fibrous films arranged in a stacked formation and each having a different level of weakness relative to the other non-fibrous films in the composite article.

Referring to FIG. 42, shown is an example of a composite article 100 having three films 120 that are non-fibrous films 120 bonded to each other via an adhesive layer 112 between each adjacent pair of non-fibrous films 120. As described above, each one of the non-fibrous films 120 has one or more weakened portions 160. The non-fibrous films 120 may have the same level of weakness. Alternatively, at least one of the non-fibrous films 120 may have a different level of weakness than the remaining non-fibrous films 120. For example, the uppermost one of the non-fibrous films 120 may have a higher density or a decreased spacing of weakened portions 160 relative to the density or spacing of the weakened portions 160 in the middle non-fibrous film 120, which may have a higher density or decreased spacing of weakened portions 160 relative to the lowermost one of the non-fibrous films 120. Alternatively or additionally, the non-fibrous films 120 of a composite article 100 may have different configurations of the weakened portions 160. For example, one of the non-fibrous films 120 of a composite article 100 may have weakened portions 160 formed by geometric modification 192 (e.g., a partial-thickness slices 186 and/or full-thickness slices 188) and another one of the non-fibrous films 120 of the same composite article 100 may have weakened portions 160 formed by chemical modification 190 such as by irradiating or lasering. Although FIG. 42 illustrates a composite article 100 having three non-fibrous films 120, a composite article 100 may include any number of non-fibrous films 120.

Figure 43:
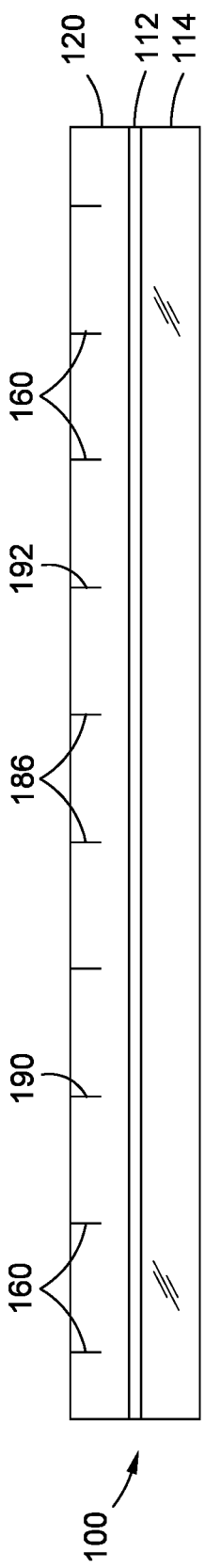
FIG. 43 is a side view of a composite article made up of a non-weakened layer (e.g., a non-weakened film) and a non-fibrous film having weakened portions.

FIG. 43 is a side view of a composite article 100 made up of a non-weakened layer 114 and a non-fibrous film 120 having weakened portions 160. The non-weakened layer 114 is devoid of weakened portions 160 and is bonded to the non-fibrous film 120. For example, the non-weakened layer 114 and the non-fibrous film 120 may be bonded together via an adhesive layer 112 as described above. Although the non-fibrous film 120 is illustrated as having a weakened portions 160 configured as partial-thickness slices 186 arranged at uniform spacing, the composite article 100 may alternatively include a non-fibrous film 120 having weakened portions 160 configured as a geometric modification 192 other than a slice and/or the weakened portions 160 may be formed via any one of the above-described chemical modification 190 techniques. In addition, geometric modification 192 and/or chemical modification 190 of a non-fibrous film 120 may be formed on one or both of the film surfaces 128.

FIG. 44 is a side view of a composite article 100 having a non-fibrous film 120 interposed between a pair of non-weakened layers 114. The non-fibrous film 120 may be bonded to each one of non-weakened layers 114 by an adhesive layer 112. In an alternative example, the composite article 100 may include a non-weakened layer 114 interposed between a pair of non-fibrous films 120. FIG. 45 is a side view of a composite article 100 having an adjacent pair of non-fibrous films 120 interposed between a pair of non-weakened layers 114. As may be appreciated, a composite article 100 may include any number of non-fibrous films 120 interposed between a pair of non-weakened layers 114. FIG. 46 is an example of a composite article 100 having alternating non-weakened layers 114 and non-fibrous films 120 adhesively bonded together by adhesive layers 112. As may be appreciated, the relative position and quantity of non-fibrous films 120 and non-weakened layers 114 may be configured to provide a desired global failure mode of the composite article 100.

FIG. 47 is an example of a composite article 100 in which at least two of the films 120 are disposed in spaced relation to each other forming a gap 116 between the films 120. More specifically, the composite article 100 has alternating non-weakened layers 114 and non-fibrous films 120 and further includes the gap 116 between the innermost non-weakened layer 114 and the non-fibrous film 120. The gap 116 may be formed by including spacers (not shown) around the perimeter of the composite article 100 and/or the gap 116 may be maintained via a frame (not shown) that may extend around the perimeter of the composite article 100. The gap 116 may be filled with air, inert gas, or a vacuum and may improve the acoustic, thermal, and/or strength characteristics of the composite article 100.

In an example not shown, a composite article 100 may have at least two non-fibrous films 120 each having weakened portions 160. The weakened portions 160 in one of the non-fibrous films 120 may be oriented at a different angle than the weakened portions 160 in another one of the non-fibrous films 120. For example, in an arrangement similar to FIG. 21, the weakened portions 160 in one of the non-fibrous films 120 of a composite article 100 may be oriented generally perpendicular to the weakened portions 160 in at least one other non-fibrous film 120 of the composite article 100. However, a composite article 100 may have non-fibrous films 120 for which the weakened portions 160 of at least one of the non-fibrous films 120 are oriented at a non-perpendicular angle (e.g., 15°, 22.5°, 45°, 60°, 75°, etc.) relative to the weakened portions 160 of at least one other non-fibrous film 120 in the composite article 100.

A method of manufacturing a composite article 100 such as one of the examples illustrated in FIGS. 42-47 may be performed in a manner similar to the method 500 described above with regard to FIG. 23. For example, the method of manufacturing a composite article includes providing a plurality of films 120, at least one of which is a non-fibrous film 120 having one or more non-weakened portions 140 and one or more weakened portions 160. The method may include forming one or more of the weakened portions 160 in the shape of a line 176. The method may additionally include adhesively bonding at least at least one pair of the films 120 using an adhesive layer 112. As described above, the weakened portions 160 have at least one mechanical property that is lower than the mechanical property of the non-weakened portions 140. In addition, the method includes arranging the plurality of films 120 in a stacked formation 130 to form a composite article 100 having an optical characteristic including a clarity of at least 75 percent or one of the above-described alternative values or range of values of clarity. The method may additionally include forming the composite article 100 with a haze of less than 20 percent or one of the above-describe alternative values or range of values of haze, and/or forming a composite article 100 with a transmission of greater than 50 percent or one of the above-described alternative values or range of values of transmission.

Referring now to FIGS. 48-61, shown are examples of a non-fibrous film 120 formed as a multi-component film having at least one film body 121 and at least one film element 195 coupled together. The film body 121 and the film element 195 are each non-fibrous. The film body 121 and the film element 195 are formed from any one of the above-described materials including a thermoplastic material, a thermosetting material, a ceramic material, a glass material, and/or a glass-ceramic material. The film element 195 is coupled to the film body 121 at an interface 197 that is non-continuous across a film width 124 of the non-fibrous film 120. In the present disclosure, an interface 197 that is non-continuous may be described as an interface 197 that includes changes, discontinuities, disruptions, steps, cavities, notches, grooves or other geometric features in the surface profile (excluding surface roughness) across the film width 124 of the non-fibrous film 120.

A film body 121 may be referred to as a non-modified portion of a non-fibrous film 120, and may be described as either a non-weakened portion or a non-strengthened portion. A film element 195 may be referred to as a modified portion of a non-fibrous film 120, and may be described as either a weakened portion or a strengthened portion. A weakened portion may differ from a strengthened portion at least in terms of mechanical properties in the sense that a weakened portion may have a lower value of at least one mechanical property relative to the same mechanical property of the film body 121, and a strengthened portion may have a higher value of at least one mechanical property relative to the same mechanical property of the film body 121. A modified portion (e.g., a weakened portion or a strengthened portion) may have the same relative size of any one of the above-described weakened portions.

A non-fibrous film 120 resulting from the coupling of the film element 195 to the film body 121 has at least one of the following characteristics: the interface 197 has at least one mechanical property having a value that is different than the value of the mechanical property of at least one of the film element 195 and the film body 121, and/or the film element 195 has at least one mechanical property having a value that is different than the value of the mechanical property of the film body 121. For example, an interface 197 may have at least one mechanical property having a value that is lower than the value of the mechanical property of both the film body 121 and the film element 195. As mentioned above, mechanical properties of a non-fibrous film 120 at least include tensile strength, tensile modulus, ultimate strain, failure strain, and toughness. The difference in mechanical properties at the interfaces 197 and/or the difference in mechanical properties of the film element 195 relative to the film body 121 may affect the quasi-static and dynamic failure modes of the non-fibrous film 120 as described above. Furthermore, the above-mentioned differences in mechanical properties may improve the toughness (e.g., interlaminar fracture toughness) of the non-fibrous film 120. In addition, the interfaces 197 may provide a means for controlling and/or limiting crack propagation within the non-fibrous film 120. For example, a crack (not shown) propagating through the film body 121 may be redirected or stopped when the crack intersects one of the interfaces 197.

As described in greater detail below, differences in the values of the mechanical properties of the interface 197 relative to the film element 195 and/or film body 121 may result from the film element 195 being formed of the same material composition as the film body 121 but assembled to or formed with the film body 121 in a different state or condition than the film body 121, and resulting in the interface 197 being weaker than a film body 121 that is devoid of film elements 195. Differences in the values of the mechanical properties of the film element 195 relative to the film body 121 may result from the film element 195 being formed of a different material configuration than the film body 121, or may result from the film element 195 being formed of the same material composition as the film body 121 but assembled to or formed with the film body 121 in a different state or condition than the film body 121. For example, a film element 195 formed of the same material as the film body 121 may be pre-stretched and may therefore have a higher value of at least one mechanical property relative to the same mechanical property of the film body 121. In some examples, assembling a film element 195 with a film body 121 of the same material but in a different state or condition may result in the interface 197 having substantially (e.g., within 10 percent) the same optical characteristics (e.g., clarity, haze, and/or transmission within a wavelength band of interest) as the film element 195 and film body 121. Below-described mechanisms for coupling a film element 195 to a film body 121 include, but are not limited to, pressing, melt-fusing, co-bonding, co-curing, adhesively bonding, co-extruding or joining in any manner that causes intermingling and/or diffusion of the molecules of the film element 195 with the molecules of the film body 121 at the interface 197.

FIGS. 48-49 show an example of a non-fibrous film 120 comprised of a plurality of film bodies 121 coupled in parallel side-by-side relation to a plurality of film elements 195. FIG. 49 is a sectional view of the non-fibrous film 120 of FIG. 48 showing the alternating film bodies 121 and film elements 195 coupled to each other at a plurality of interfaces 197. In the example shown, each film element 195 and film body 121 has a T-shaped cross section to facilitate interlocking of the strips 193. However, the film elements 195 and the film bodies 121 may be provided in any one of a variety of different cross-sectional shapes, and are not limited to the T-shaped cross section. In addition, although the cross-sectional shape of the film elements 195 and film bodies 121 are substantially similar to each other in FIG. 48, a non-fibrous film 120 may include strips 193 in which the cross-sectional shape of the film elements 195 are different than the cross-sectional shape of the film bodies 121. Regardless of the individual configuration of the film elements 195 and film bodies 121, when assembled the film elements 195 and the film bodies 121 form a non-fibrous film 120 preferably having a constant film thickness 126 across the film width 124 of the non-fibrous film 120.

FIG. 50 shows an example of the assembly of a plurality of film bodies 121 and film elements 195 captured between upper and lower plates 920, 922. For relatively thick versions of a non-fibrous film 120 (e.g., a film thickness of 0.25-0.50 inch or more), mechanical presses 924 may apply pressure to laterally force the strips 193 into contact with each other at the interfaces 197. For relatively thin versions of the non-fibrous film 120 (e.g., a film thickness of less than 0.25 inch), a mechanical press 924 (e.g., FIG. 53) may be positioned on top of a plurality of strips 193 of film elements 195 and film bodies 121 supported on a lower plate 922 and arranged in side-by-side contacting relation to each other at the interfaces 197. The mechanical press 924 may apply downward compaction pressure onto the strips 193 and resulting in the lateral sides of the strips 193 being pressured against each other.

Heat may optionally be added during the application of pressure to cause or increase intermingling and/or diffusion of the molecules of the film element 195 with the molecules of the film body 121 at the interface 197. In any one of the examples disclosed herein, an adhesive layer 112 may optionally be included at each interface 197 between a film element 195 end and film body 121 to facilitate adhesive bonding of the film element 195 to the film body 121. Although FIG. 50 illustrates a mechanical press 924 for coupling film elements 195 with film bodies 121, in any one of the examples disclosed herein, alternative or additional means may be implemented for coupling film elements 195 to film bodies 121. For example, film elements 195 and film bodies 121 may be coupled together using pressure applied by a vacuum bag (e.g., a double vacuum-bag debulking arrangement) installed over a pre-assembly of film elements 195 and one or more film bodies 121. The use of a vacuum bag (not shown) for coupling film elements with one or more film bodies may optionally performed within an autoclave (not shown) for applying pressure above atmospheric.

In some examples, a non-fibrous film 120 may include a film body 121 having a plurality of cavities 127. The non-fibrous film 120 may also include plurality of strips 193 or blocks 199 respectively installed within the plurality of cavities 127 of the film body 121. Each one of the film elements 195 may substantially fill the volume of the cavity 127 into which the film element 195 is installed. In some examples described below, each one of the film elements 195 may be pre-formed as a solid or a semi-solid. In other examples described below, each cavity 127 may be filled with a non-solid material such as a liquid, gel, or paste that solidifies or hardens to form a film element 195 within a cavity 127.

Figure 53:
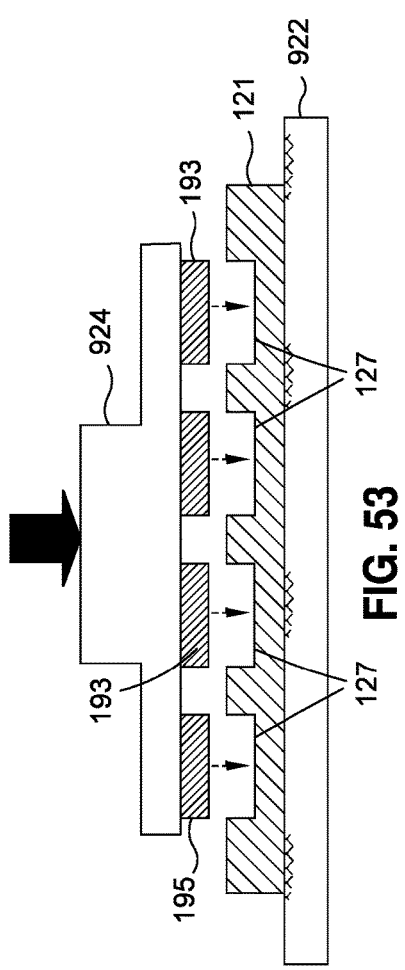
FIG. 53 is a side view of an example of the insertion of the strips of film elements into a corresponding cavities of the film body using a mechanical press.
Figure 52:
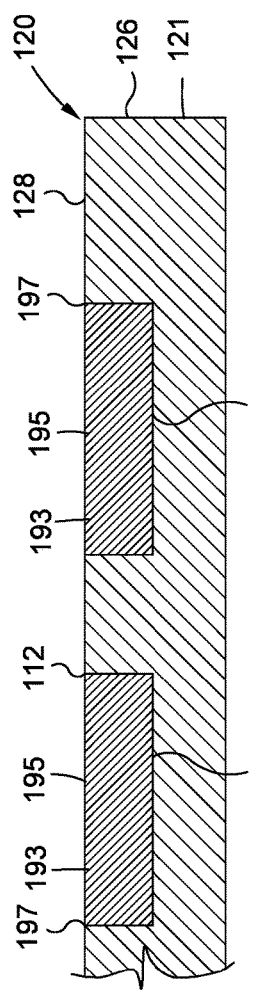
FIG. 52 is a sectional view of a portion of the non-fibrous film of FIG. 51 illustrating the strips of the film elements installed within the corresponding cavities of the film body.
Figure 51:
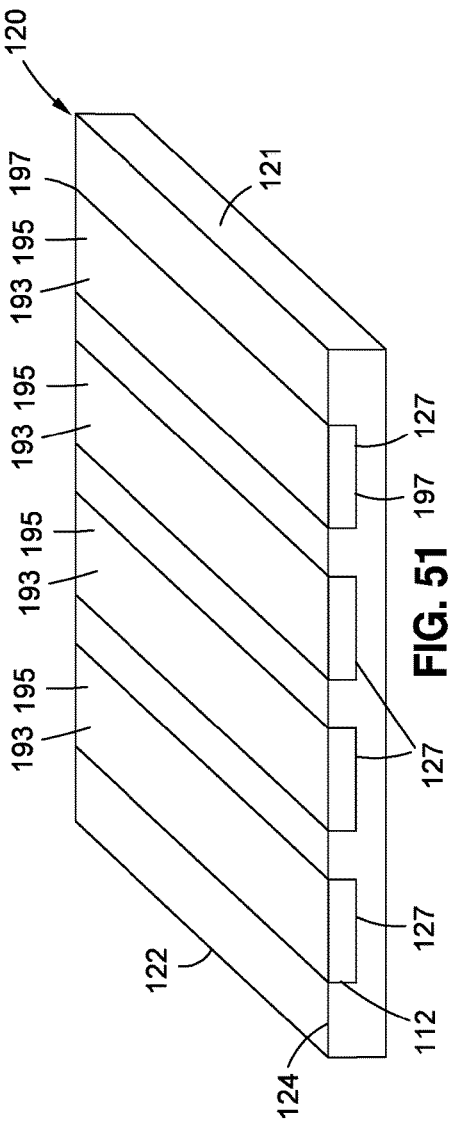
FIG. 51 is a perspective view of a further example of a non-fibrous film comprised of a plurality of film elements configured as strips inserted within a corresponding plurality of cavities of the film body.

FIGS. 51-52 show an example of a non-fibrous film 120 comprised of a plurality of film elements 195 configured as strips 193 installed within a corresponding plurality of cavities 127 formed in the film body 121. The cavities 127 are arranged in spaced parallel relation to each other and extend along a film length 122 of the film body 121. In some examples, each film element 195 may be pre-formed as a strip 193 prior to installation within a cavity 127. FIG. 53 shows an example of a system for installing a plurality of strips 193 into a corresponding cavities 127 of a film body 121. The plurality of strips 193 are supported on a lower plate 922. A mechanical press 924 located above the film elements 195 may force the strips 193 of film element 195 into the cavities 127 of the film body 121.

In some examples, the strips 193 and cavities 127 may extend continuously along a lengthwise direction of the non-fibrous films 120 such as along an entire length of the non-fibrous film 120. In other examples not shown, a non-fibrous film 120 may include a plurality of strips 193 formed as a series of end-to-end strip segments (not shown) installed within a corresponding series of end-to-end cavity segments (not shown) having a spacing between each end-to-end pair of strips 193 and cavities 127 similar to the arrangement shown in FIGS. 16, 17 and 31. Although the strips 193 and cavities 127 in FIGS. 51-52 are shown having a rectangular cross-sectional shape, the strips 193 and cavities 127 may be provided in any one of a variety of different cross-sectional shapes and sizes. For example, each cavity 127 and strip 193 may have an orthogonal cross-sectional shape or each cavity 127 and strip 193 may have a non-orthogonal cross-sectional shape including a partially curved shape such as a semi-circular cross-sectional shape.

FIGS. 54-55 shows an example of a non-fibrous film 120 wherein the strips 193 of film elements 195 are wedge-shaped for insertion into V-shaped cavities 127 of the film body 121. However, strips 193 or blocks 199 of film element 195 may be formed in any one a variety of cross-sectional shapes, sizes and configurations. For example, film elements 195 may be preformed as blocks 199 (e.g., FIG. 58) each having a cylindrical shape configured to be installed within a corresponding plurality of cavities 127 (e.g., FIG. 58) having also having a cylindrical shape. As mentioned above, the strips 193 or blocks 199 may be pre-formed prior to installation into a corresponding one of the cavities 127 in the film body 121. However, in other examples described below, film elements 195 may be potted or cast in place by filling a cavity 127 with a non-solid version of the material of the film element 195.

FIGS. 56-57 show an example of a non-fibrous film 120 in which the film element 195 and the film body 121 each have a meshing surface 129. The film element 195 and the film body 121 may each be configured as a plate which may be planar or each plate may be simply curved or complexly curved (not shown). The meshing surfaces 129 of the film element 195 and film body 121 are shown as having a sawtooth cross-sectional pattern configured to mesh with each other at the interface 197 which extends across the width of the non-fibrous film 120. In some examples, the meshing surfaces 129 of the film element 195 and film body 121 may be identically configured. The film body 121 and the film body 121 may be formed of the same material or different materials. The film element 195 and the film body 121 may be coupled to each other using any one or combination of the above mentioned coupling mechanisms including, but not limited to, pressing, melt-fusing, co-curing, co-bonding, adhesively bonding, or any other type of coupling mechanism or combination of coupling mechanisms.

Figure 59:
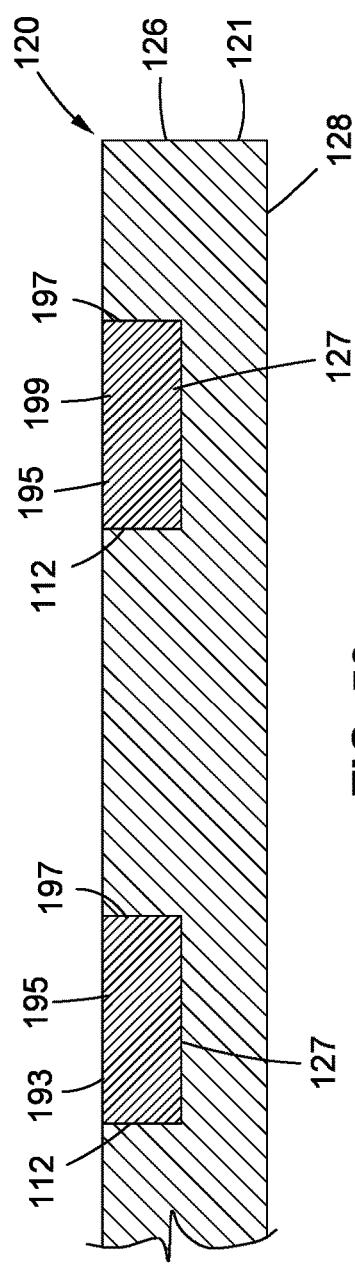
FIG. 59 is a sectional view of a portion of the non-fibrous film of FIG. 58 illustrating the box of the film elements installed within the corresponding cavities of the film body.
Figure 58:
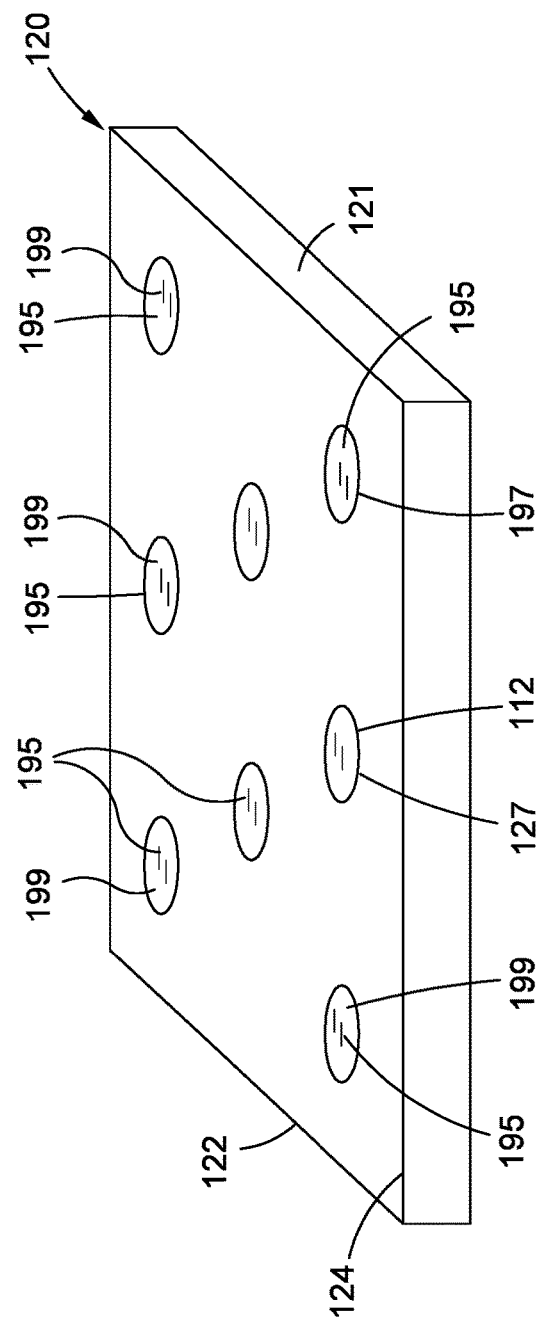
FIG. 58 is a perspective view of a further example of a non-fibrous film comprised of a plurality of film elements configured as blocks inserted within a corresponding plurality of cavities of the film body.

Referring to FIGS. 58-59, shown is an example of a non-fibrous film 120 comprised of a plurality of film elements 195 configured as blocks 199 contained within a corresponding plurality of cavities 127 formed in the film body 121. The blocks 199 may be preformed and installed in the cavities 127. Alternatively, as mentioned above, the film elements 195 may be formed by filling each cavity 127 with non-solid material of the film element 195 and allowing the non-solid material to harden or cure within the film body 121. The non-solid material of the film element 195 may be in the form of a paste, a gel, a liquid or other non-solid form that is cast or potted within the cavities 127 of the film body 121. In one example, a thermoplastic polymer (e.g., a polycarbonate) in non-solid form (e.g., a gel heated to a temperature above the glass transition temperature) may be placed in a cavity 127 of a film body 121 of the same or different thermoplastic polymer in solid form. The non-solid thermoplastic polymer may be allowed to solidify within the cavity 127 of the film body 121 to form the film element 195. In another example, a thermoset polymer in a partially cured state may be placed in a cavity 127 of film body 121 comprised of a fully cured version of the thermoset polymer for co-bonding the film element 195 (e.g., partially-cured thermoset) with the film body 121 (e.g., fully-cured thermoset) to form the non-fibrous film 120.

Although FIGS. 58-59 illustrate the cavities 127 formed as discrete circular bores uniformly distributed throughout a film surface 128 of the film body 121, the cavities 127 may be formed in any size, shape and configuration. For example, the bores may have a non-circular shape. In another example, a film body 121 may include a plurality of cavities 127 formed as parallel grooves or notches extending substantially continuously along a lengthwise direction of the film body 121, as shown in the examples of FIGS. 51-55, and/or optionally extending along a widthwise direction (not shown) of the film body 121. Although FIGS. 50-59 illustrate cavities 127 formed in only one of the film surfaces 128, a film body 121 may include cavities 127 formed in both of the film surfaces 128. Furthermore, a film body 121 may include cavities 127 that extend completely through the film body 121 between opposing film surfaces 128. In some examples of the non-fibrous film 120, the film body 121 may have an elongated cross-sectional shape with an aspect ratio of a width of the strip 193 or block 199 (interchangeably referred to herein as the non-modified portion width) to the film thickness 126 of approximately 3 to approximately 500 with an upper limit of 10 inches for the width of the film body 121. In any one of the examples disclosed herein, a non-fibrous film 120 may have a film thickness 126 in the range of approximately 0.0001 to 0.50 inch, and preferably within the range of approximately 0.25 to 0.38 inch. However, the non-fibrous film 120 may be provided in any film thickness 126, without limitation.

FIGS. 60-61 show an example of a non-fibrous film 120 having a plurality of film elements 195 embedded within a film body 121. The film elements 195 extend in parallel relation to each other along a lengthwise direction of the film body 121. Each one of the film elements 195 may be completely surrounded by the film body 121. An interface 197 is formed at the juncture of each film element 195 with the film body 121. Each one of the film elements 195 may have a rod-like shape and may be continuous along the length (e.g., the entire length) of the film body 121 similar to the arrangement shown in FIG. 4. Alternatively or additionally, in an example not shown, a non-fibrous film 120 may include one or more film element segments arranged in end-to-end relation and separated by non-weakened connections similar to the arrangement shown in FIG. 16-17.

FIGS. 60-61 show each film element 195 having a circular cross-sectional shape corresponding to a rod-like shape of each film element 195. However, the film elements 195 may be formed (e.g., co-extruded) in any one of a variety of cross-sectional shapes such as a square, a rectangular, a triangular, an oval, or other shapes. In addition, in non-fibrous film 120 may include film elements 195 of different sizes or having different cross-sectional shapes within the same film body 121. In one example, the film elements 195 and the film body 121 may be co-extruded from the same material (e.g., thermoplastic material such as polycarbonate) but at different temperatures resulting in the interface 197 between the film elements 195 and the film body 121 being weaker than a film body 121 devoid of film elements 195, as described in greater detail below. However, the film elements 195 and the film body 121 may be formed of different material compositions and resulting in the film elements 195 in the film body 121 having different values for one or more of the same mechanical properties.

In any one of the examples of the non-fibrous films 120 disclosed herein, the film elements 195 and the film body 121 may each be formed from transparent material which advantageously results in the interfaces 197 of the non-fibrous film 120 being invisible. In such example, a non-fibrous film 120 with one or more film bodies 121 and one or more film elements 195 may be configured to have any one of the above-described values or range of values of optical characteristics (e.g., clarity, haze and/or transmission) in any one of the above-described environmental parameters such as in any one the above-defined wavelength bands of interest and/or within one of the above-defined temperature ranges. For example, a non-fibrous film 120 with film elements 195 may have a clarity of at least 75 percent within a visible spectrum and/or infrared spectrum and/or within at least a portion of the temperature range of −65 F to +200 F. Additionally, a non-fibrous film 120 with film elements 195 may have one of the above-defined values or range of values of haze and/or transmission within one or more of the above-described environmental parameters. For example, a non-fibrous film 120 with one or more film bodies 121 and one or more film elements 195 may have a haze of less than 10 percent and/or a transmission of greater than 50 percent. In some examples, the film body 121 may have at least one optical characteristic that has the same value as the same optical characteristic of the film element 195. Alternatively or additionally, the film body 121 in the film element 195 of a non-fibrous film 120 may have at least one thermal property having the same value such as the same coefficient of thermal expansion.

In some examples of the non-fibrous film 120, the film elements 195 may be formed of a material (e.g., a film element material) having the same type of molecule as the material (e.g., a film body material) of the film body 121 and having a different molecular weight than the material of the film body 121. For example, a non-fibrous film 120 may include film elements 195 formed of a high-molecular weight polymer such as polypropylene, and the film body 121 may be formed of a low-molecular weight version of the same polypropylene material. Advantageously, forming the film elements 195 and film body 121 of the same material having different molecular weights results in the same optical characteristics but with slightly different mechanical properties and thermal properties. For example, the film elements 195 and the film body 121 may be formed of optically clear polymers having the same chemistry but different molecular weights.

In some examples of the non-fibrous film 120, the film element 195 or the film body 121 may be a stretched film 132 that is pre-stretched (e.g., unidirectionally stretched or bi-directionally stretched) prior to coupling the film element 195 to the film body 121 and resulting in the component (either the film element 195 or the film body 121) that is pre-stretched having at least one mechanical property (e.g., ultimate tensile strength, toughness, etc.) having at least one value that is higher than the value of the mechanical property of the film body 121. For examples where the film element 195 and film body 121 are formed of the same material but one of the components is pre-stretched, the optical characteristics of the film element 195 and film body 121 may be equivalent.

Referring to FIG. 62, shown is a flow chart of a method 950 of manufacturing a non-fibrous film 120. The method includes step 952 of coupling at least one film element 195 (e.g., non-fibrous) to at least one film body 121 (e.g., non-fibrous) at an interface 197 that is non-continuous across a width of the non-fibrous film 120. As mentioned above and described in greater detail below, one or more film elements 195 may be coupled to one or more film bodies 121 by fusing, co-bonding, co-curing, and/or adhesively bonding, or by co-extruding one or more film elements 195 within a film body 121. As described above, the interface 197 has at least one mechanical property having a value that is different than the value of the mechanical property of at least one of the film element 195 and the film body 121, and/or the film element 195 has at least one mechanical property having a value that is different than the value of the mechanical property of the film body 121.

In one example of manufacturing a non-fibrous film 120, the step of coupling a film element 195 to a film body 121 may include coupling a plurality of film bodies 121 formed as strips 193 in alternating relation to a plurality of film elements 195 also formed as strips 193 in a manner such that the film elements 195 and the film bodies 121 are arranged in side-by-side parallel relation to each other as shown in the example of FIGS. 48-50. The method may optionally include applying heat and/or pressure to the film element 195 and/or film body 121 to cause melt-fusing and/or diffusion and/or intermingling of the molecules of the film element 195 with the molecules of the film body 121. In some examples, the method may further include applying an adhesive layer 112 at the interface 197 between the film elements 195 and the film bodies 121 to adhesively couple the film elements 195 to the film bodies 121.

In another example, the step of coupling one or more film elements 195 to one or more film bodies 121 may include installing a plurality of at least one of strips 193 and blocks 199 into a respective plurality of cavities 127 of the film body 121. As mentioned above, the strips 193 and/or blocks 199 may be sized and shaped complementary to the cavities 127 of the film body 121. For example, the method may include installing a plurality of cylindrically-shaped blocks 199 (e.g., FIGS. 58-59) of the film element 195 respectively into a plurality of discrete, spaced-apart cylindrically-shaped cavities 127 distributed uniformly or non-uniformly throughout one or both sides (e.g., film surfaces 128) of the film body 121. Strips 193 or blocks 199 of film elements 195 may be installed within cavities 127 of a film body 121 by any one of a variety of means including, but not limited to, using a mechanical press 924 (e.g., FIG. 53) and/or by using a vacuum bag (not shown) positioned over a plurality of film elements 195 that are partially inserted within a corresponding plurality of cavities 127 of a film body 121. In any one of the examples disclosed herein, the method of coupling film elements 195 to film bodies 121 may optionally include the application of heat to facilitate intermingling and/or diffusion of the molecules of the film element 195 with the molecules of the film body 121 at the interfaces 197.

In some examples, the strips 193 and/or blocks 199 of the film element 195 may be sized to provide an interference fit with the cavities 127 of the film body 121. For example, a strip 193 or block 199 of film element 195 may have a width (e.g., a diameter) that is 0.001-0.002 inch larger than width or diameter of a cavity 127 of film body 121 to ensure a snug fit between the film element 195 and the film body 121. Alternatively or additionally, lateral sides of the strips 193 or blocks 199 of the film element 195 may be resiliently compressible to facilitate insertion into a corresponding cavity 127 of film body 121 after which heat may be applied to facilitate coupling of the film element 195 to the film body 121. Alternatively or additionally, the method may include adhesively bonding the film element 195 to the cavities 127 of a film body 121 using an adhesive layer 112. In such an example, the strips 193 or block 199 of the film elements 195 may be sized to provide a clearance fit with the cavities 127 of a film body 121 to accommodate an adhesive layer 112 between the film element 195 and the cavity 127. For example, a film element 195 may be provided in a width that is up to 0.010 inch smaller than the width of a cavity 127 of film body 121. An adhesion promoter or an adhesion stifler may be applied to the mating surfaces of the film element 195 and film body 121 to respectively increase or decrease the adhesion level between the film element 195 and the film body 121 to respectively increase and decrease the value of the mechanical property at the interface 197 relative to the film element 195 and/or the film body 121. Additionally or alternatively, the method may include mechanically roughing the mating surfaces of the film element 195 and/or film body 121 as a means to increase the surface area for increasing the strength of an adhesive bond between the film element 195 and the film body 121.

Referring briefly to FIGS. 56-57, the step of coupling the film element 195 to the film body 121 may include mating a meshing surface 129 of a film element 195 to a meshing surface 129 of a film body 121 to form a non-fibrous film 120. As mentioned above, the film element 195 and the film body 121 may each be configured as meshing parts having matching cross-sectional shapes at the meshing surfaces 129. The meshing surfaces 129 may be placed in contact with each other and melt-fused, co-cured, co-bonded or adhesively bonded together at the interface 197. Although FIGS. 56-57 show each meshing surface 129 having a sawtooth cross-sectional shape, the meshing surfaces 129 may be provided with any one a variety of alternative cross-sectional shapes.

Referring briefly to FIGS. 58-59, in a further embodiment of the method 950 of manufacturing a non-fibrous film 120, the step of coupling the film elements 195 to a film body 121 may include filling a plurality of cavities 127 of the film body 121 with non-solid material of a film element 195. The nonsolid material may be provided as a liquid, a gel, a paste or other non-solid form. The method may include allowing the non-solid material of the film element 195 to harden or cure within the cavities 127 of the film body 121. As mentioned above, cavities 127 may be formed in any one of a variety of shapes including spaced, parallel notches or grooves as shown in FIGS. 54 and 57, or a pattern of discrete cavities 127 formed in at least one of the film surfaces 128 of a film body 121 as shown in FIG. 58.

In a still further embodiment, the method 950 of manufacturing the non-fibrous film 120 as shown in FIGS. 60-61 may include co-extruding a plurality of non-fibrous film elements 195 within a film body 121 while extruding the film body 121 in sheet form. The film elements 195 are extruded in parallel relation to each other within the film body 121 forming an interface 197 between each film element 195 and the film body 121. In some examples, the film elements 195 may be co-extruded from the same material and at a different (e.g., higher or lower) temperature than the temperature at which the film body 121 is extruded and which may result in weaker molecular bonds at the interface 197 between the film elements 195 and the film body 121 relative to the strength in other portions of the non-fibrous film 120. For example, film elements 195 co-extruded of polycarbonate material within a film body 121 (e.g., a sheet) extruded of the same polycarbonate material but at a higher or lower temperature than the temperature at which the film elements 195 are extruded may result in the interface 197 between each film element 195 and the surrounding film body 121 being weaker than the strength of the remaining portions of the film body 121. In another example, the film elements 195 may be co-extruded from a different material than the material from which the film body 121 is extruded which may result in weaker or stronger molecular bonds at the interface 197 relative to the strength of either or both the film elements 195 and the film body 121.

Figure 64:
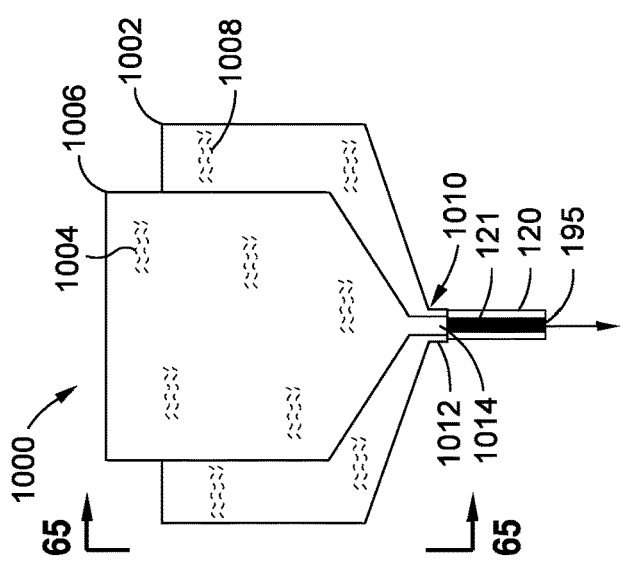
FIG. 64 is a sectional view of the extruding apparatus and illustrating a film body material reservoir and a film element material reservoir for co-extrusion of film body material and film element material from a nozzle located at a lower end of the extruding apparatus.
Figure 65:
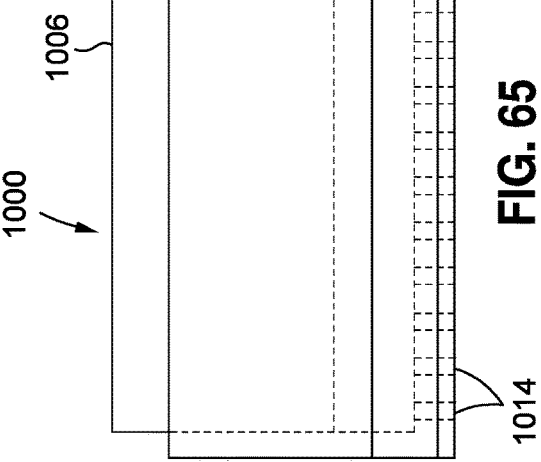
FIG. 65 is a side view of the extruding apparatus illustrating the plurality of nozzles for co-extruding a plurality of film elements during extrusion of the film body.
Figure 63:
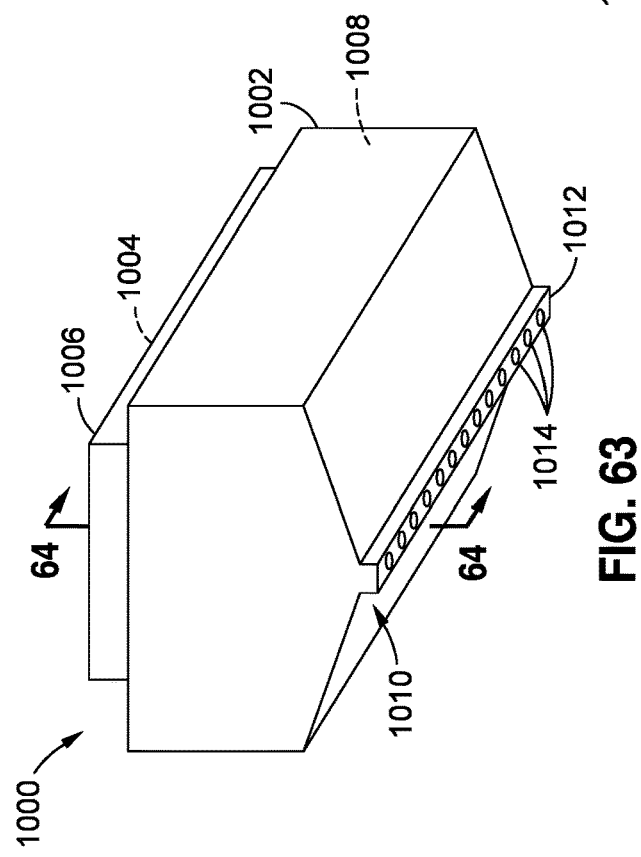
FIG. 63 is a perspective view of an example of an extruding apparatus for co-extruding a plurality of film elements within a film body.

FIGS. 63-65 illustrate an example of an extruding apparatus 1000 that may be implemented for manufacturing a non-fibrous film 120 by co-extruding multiple film elements 195 within a film body 121 while simultaneously extruding the film body 121 in sheet form. The extruding apparatus 1000 may include a film element material reservoir 1006 and a film body material reservoir 1002 for respectively containing film element material 1008 and film body material 1004. The extruding apparatus 1000 may include a nozzle 1010 having a plurality of film element dies 1014 co-located with and surrounded by a film body 121 die 1012. The film element material reservoir 1006 and/or the film body material reservoir 1002 may be configured to respectively contain the film element material 1008 and the film body material 1004 at a relatively high temperature and/or relatively low viscosity to facilitate or promote extruding or drawing of a plurality of film elements 195 from a corresponding plurality of the film element dies 1014 (e.g., FIGS. 63 and 65) simultaneous with the extruding or drawing of the film body 121 in sheet form from the film element dies 1012. During co-extrusion from the nozzle 1010, the molecular chains of the film elements 195 and the film body 121 may intermingle at the interfaces 197.

Although not shown, the non-fibrous film 120 after co-extrusion may be wound onto a take-up spool (not shown) or the non-fibrous film 120 may be laid in a planar state onto a moving conveyor (not shown). In some examples, the manufacturing of the non-fibrous film 120 may include stretching the non-fibrous film 120 along a fiber forming direction as the non-fibrous film 120 is drawn or extruded from the nozzle 1010 and prior to cooling of the non-fibrous film 120. However, in an alternative example, the non-fibrous film 120 may be stretched after cooling using a stretching apparatus (not shown) instead of stretching the non-fibrous film 120 after co-extrusion and prior to cooling.

Figure 66:
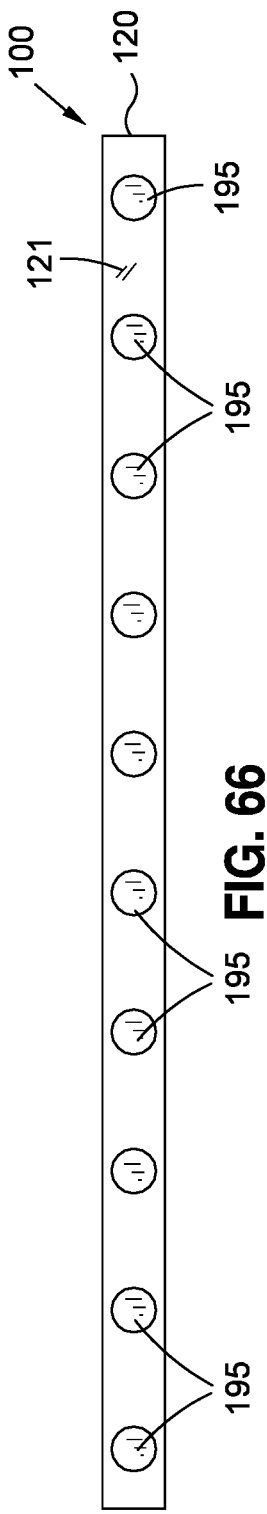
FIG. 66 is a side view of a composite article containing a non-fibrous film having film elements.

Referring to FIGS. 66-72, shown are examples of a composite article 100 having at least one non-fibrous film 120. FIG. 66 is a side view of a composite article 100 containing a non-fibrous films 120 in an example having a plurality of film elements 195 embedded within a film body 121 (e.g., FIGS. 60-61). However, a composite article 100 may contain one or more non-fibrous films 120 of any embodiment disclosed herein including one or more non-fibrous films 120 having parallel strips 193 of film elements 195 and film bodies 121 (e.g., FIGS. 48-50), having strips 193 and or blocks 199 of film elements 195 contained within cavities 127 of a film body 121 (e.g., FIGS. 51-55 and 58-59), having meshed parts (e.g., FIGS. 56-57), and/or having any one or more of a variety of other configurations of non-fibrous films 120.

Figure 67:
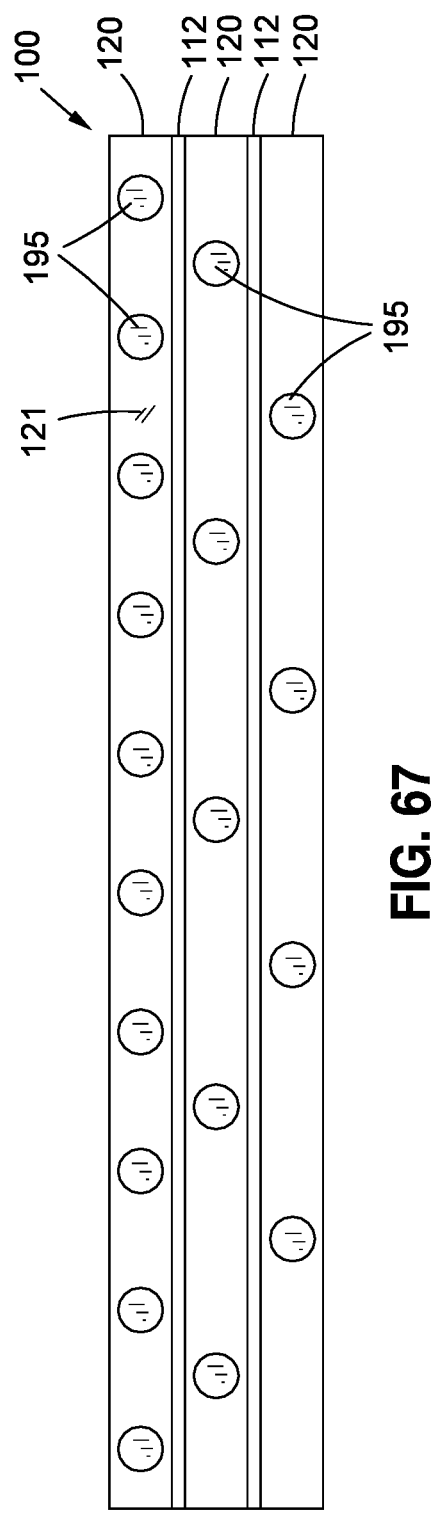
FIG. 67 is a side view of a composite article made up of a plurality of non-fibrous films arranged in a stacked formation and each having different arrangements of film elements.

FIG. 67-72 are examples of a composite article 100 having a plurality of films arranged in a stacked formation in a manner similar to the composite article 100 described above and illustrated in FIGS. 42-47. For example, FIG. 67 shows a composite article 100 made up of a three (3) non-fibrous films 120 arranged in a stacked formation and each having different arrangements of film elements 195 embedded within a film body 121. The different arrangements of film elements 195 of each non-fibrous film 120 may provide differing failure modes as a means to achieve a desired global failure mode of the composite article 100. The non-fibrous films 120 may be bonded together using a relatively thin layer of adhesive, matrix material, resin, or other material.

Figure 68:
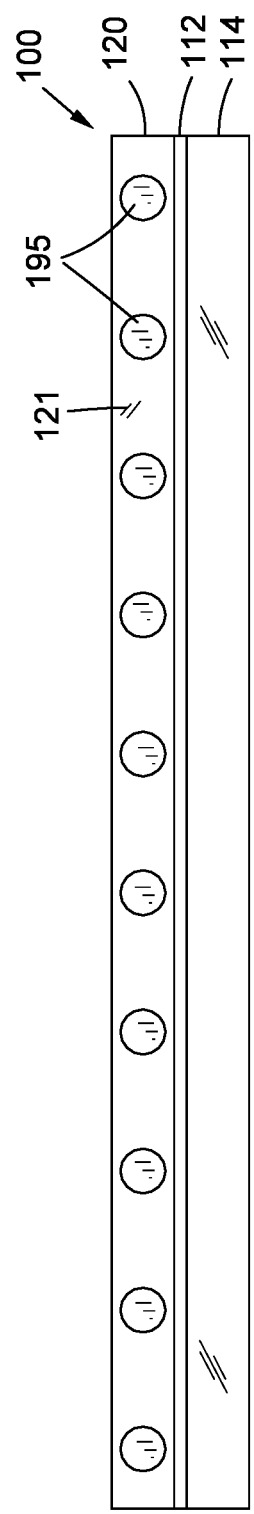
FIG. 68 is a side view of a composite article made up of a non-weakened layer (e.g., a non-weakened film) and a non-fibrous film having film elements.
Figure 69:
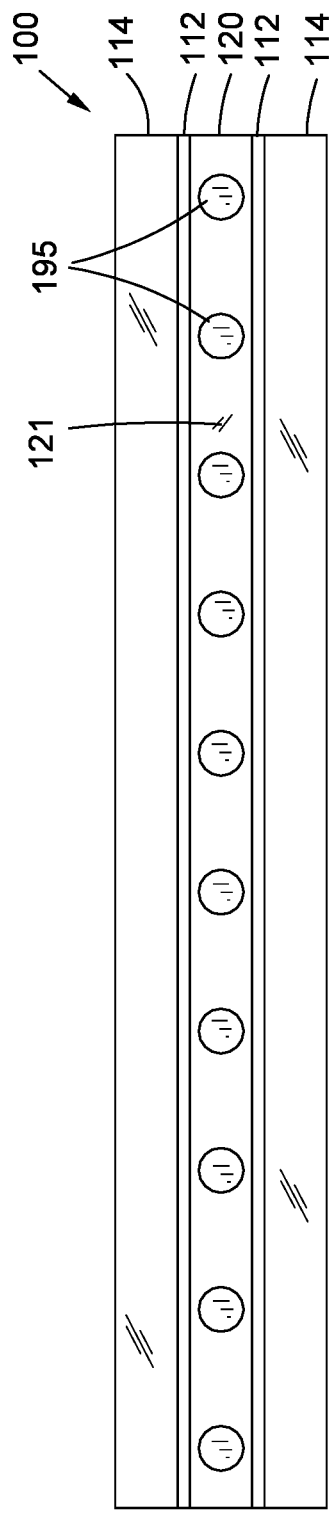
FIG. 69 is a side view of a composite article having a non-fibrous film interposed between a pair of non-weakened layers.
Figure 70:
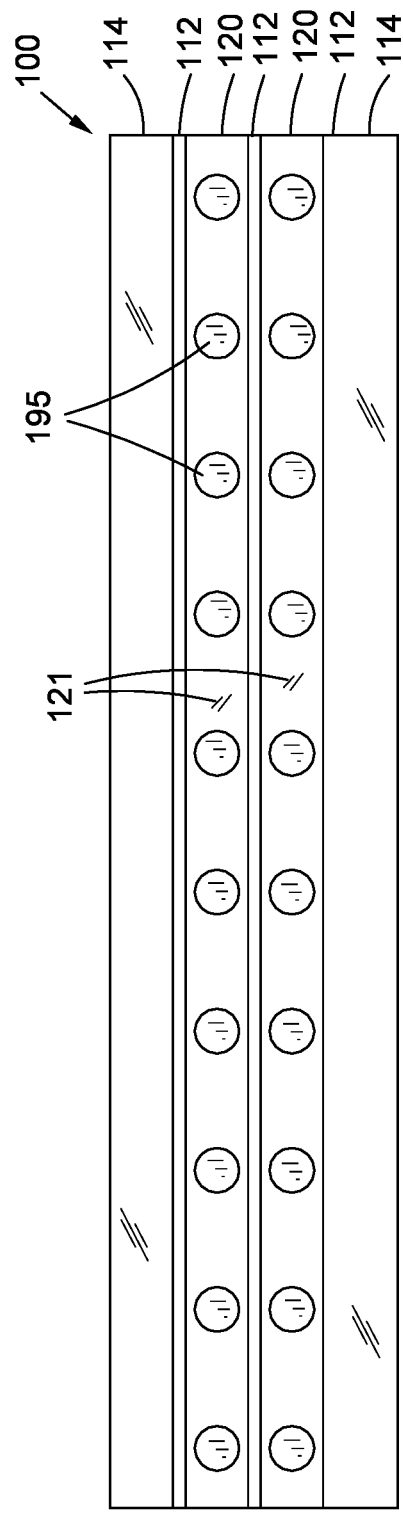
FIG. 70 is a side view of a composite article having an adjacent pair of non-fibrous films interposed between a pair of non-weakened layers.

FIG. 68 shows an example of a composite article 100 made up of a non-weakened layer 114 (e.g., a non-weakened film) and a non-fibrous film 120 having film elements 195. As described above, a non-weakened layer 114 is devoid of film elements 195 and weakened portions. FIG. 69 is a side view of a composite article 100 having a non-fibrous film 120 interposed between in bonded to a pair of non-weakened layers 114. FIG. 70 shows an example of a composite article 100 having an adjacent pair of non-fibrous films 120 interposed between a pair of non-weakened layers 114 on the outermost sides of the composite article 100. FIG. 71 shows an example of a composite article 100 having alternating non-weakened layers 114 and non-fibrous films 120. As may be appreciated, the relative quantity and position of non-fibrous films 120 and non-weakened layers 114 may be provided in any one a variety of different arrangements to provide a desired global failure mode of the composite article 100. FIG. 72 shows an example of a composite article 100 having alternating non-weakened layers 114 and non-fibrous films 120 and having a gap between the innermost non-weakened layer 114 and non-fibrous film 120.

A method of using a non-fibrous film 120 may be similar to the method 600 described above with regard to FIG. 24. For example, the method of using a non-fibrous film 120 may include providing a non-fibrous film 120 having a non-weakened portion 140 and a weakened portion 160 (e.g., FIGS. 31-39), or the non-fibrous film 120 may include at least one film element 195 and at least one film body 121 (e.g., FIGS. 48-61). The method additionally includes placing the non-fibrous film 120 in a non-loaded condition such as a static condition in which the non-fibrous film 120 is part of a vehicle (e.g., an aircraft) that is static or substantially non-moving. The method also includes placing the non-fibrous film 120 in a loaded condition such as when the non-fibrous film 120 is subjected to a dynamic load such as when an aircraft is in motion on a runway or during flight or when a fuselage of the aircraft is pressurized.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A non-fibrous film, having a film width, the non-fibrous film comprising:
   a film body that is non-fibrous and that comprises:
      film body surfaces that face in opposite directions, and cavities; and
   a film element, comprising strips that are non-fibrous, wherein:
      each of the strips has surfaces that are oblique to each other,
      each of the strips has a cross-sectional shape,
      each of the cavities has surfaces that are oblique to each other,
      each of the cavities has a cross-sectional shape,
      the cross-sectional shape of each of the strips is complementary to the cross-sectional shape of a corresponding one of the cavities,
      each of the strips has a film element outer surface that is flush with one of the film body surfaces when the strips are installed in the cavities,
      each of the strips is coupled to the film body at an interface that extends to one of the film body surfaces,
      the interface is non-continuous across the film width,
      the interface, the film element, and the film body each comprises a mechanical property, having a value, and
   wherein:
      the value of the mechanical property of the interface is different than the value of the mechanical property of the film element and different than the value of the mechanical property of the film body, and the value of the mechanical property of the film element is equal to the value of the mechanical property of the film body, or
      the value of the mechanical property of the interface is different than the value of the mechanical property of the film element and different than the value of the mechanical property of the film body, and the value of the mechanical property of the film element is different than the value of the mechanical property of the film body, or
      the value of the mechanical property of the interface is different than either the value of the mechanical property of the flint element or the value of the mechanical property of the film body, and the value of the mechanical property of the film element is equal to the value of the mechanical property of the film body, or
      the value of the mechanical property of the interface is different than either the value of the mechanical property of the film element or the value of the mechanical property of the film body, and the value of the mechanical property of the film element is different than the value of the mechanical property of the film body.

2. The non-fibrous film of claim 1, wherein the mechanical property of the interface is one of a tensile strength, a tensile modulus, an ultimate strain, a failure strain, and a toughness, and the mechanical property of the film element is one of a tensile strength, a tensile modulus, an ultimate strain, a failure strain, and a toughness.

3. The non-fibrous film of claim 1, wherein the film body and the film element are each formed from at least one of a thermoplastic material, a thermosetting material, a ceramic material, a glass material, and a glass-ceramic material.

4. The non-fibrous film of claim 1, wherein the film element and the film body have identical material compositions and different molecular weights.

5. The non-fibrous film of claim 1, wherein the non-fibrous film has a film thickness from approximately 0.0001 inch to approximately 0.50 inch.

6. The non-fibrous film of claim 1, wherein:
   the film body has an elongated cross-sectional shape;
   the elongated cross-sectional shape of the film body has an aspect ratio of a width to a film thickness of approximately 3 to 500; and
   the width of the film body has an upper limit of 10 inches.

7. The non-fibrous film of claim 1, comprising at least one of:
   optical clarity of at least 75 percent;
   optical haze of less than 10 percent; and
   optical transmission of greater than 50 percent.

8. A method of manufacturing the non-fibrous film according to claim 1, wherein the strips are coupled to the film body using a step of joining the strips to the film body via one of pressing, melt-fusing, co-bonding, co-curing, adhesively bonding, or co-extruding.

9. The method of claim 8, wherein the step of joining the strips to the film body comprises:
   filling cavities of the film body with non-solid material; and
   allowing the non-solid material to harden or cure within the cavities of the film body so that the strips are formed within the cavities and joined to the film body.

10. The method of claim 8, wherein the strips and the film body are formed of identical materials and at different temperatures, such that the interface between the strips and the film body is weaker than the film body.

11. A composite article, comprising a plurality of films, arranged in a stacked formation, wherein at least one of the plurality of films is the non-fibrous film according to claim 1.

12. The composite article of claim 11, wherein:
   at least two of the plurality of films are non-fibrous films, bonded to one another; and
   each of the at least two of the plurality of films comprises one or more of the strips.

13. The composite article of claim 11, wherein at least one of the plurality of films is a non-weakened layer that is devoid of the strips and is bonded to the non-fibrous film.

14. The composite article of claim 11, wherein at least two of the plurality of films are spaced apart by a gap.

15. The composite article of claim 11, wherein, in the non-fibrous film, the mechanical property of the interface is one of a tensile strength, a tensile modulus, an ultimate strain, a failure strain, and a toughness, and the mechanical property of the film element is one of a tensile strength, a tensile modulus, an ultimate strain, a failure strain, and a toughness.

16. The composite article of claim 11, wherein, in the non-fibrous film, the film body and the film element are each formed from at least one of a thermoplastic material, a thermosetting material, a ceramic material, a glass material, and a glass-ceramic material.

17. The composite article of claim 11, wherein, in the non-fibrous film, the film element and the film body have identical material compositions and different molecular weights.

18. The composite article of claim 11, wherein the non-fibrous film has a film thickness from approximately 0.0001 inch to approximately 0.50 inch.

19. The composite article of claim 11, wherein, in the non-fibrous film:
the film body has an elongated cross-sectional shape;
the elongated cross-sectional shape of the film body has an aspect ratio of a width to a film thickness of approximately 3 to 500; and
the width of the film body has an upper limit of 10 inches.

20. The composite article of claim 11, wherein the non-fibrous film has at least one of:
optical clarity of at least 75 percent;
optical haze of less than 10 percent; and
optical transmission of greater than 50 percent.

21. A non-fibrous film, having a film width, the non-fibrous film comprising:
a film body that is non-fibrous and that comprises:
film-body surfaces that face in opposite directions, and cavities; and
a film element, comprising strips or blocks that are non-fibrous,
wherein:
each of the strips or blocks has a film element outer surface that is flush with one of the film-body surfaces when the strips or blocks are installed in the cavities,
each of the strips or blocks is coupled to the film body at an interface that extends to one of the film-body surfaces,
the interface is non-continuous across the film width of the non-fibrous film,
the film element and the film body have identical material compositions and different molecular weights,
the interface, the film element, and the film body each comprises a mechanical property, having a value, and
wherein:
the value of the mechanical property of the interface is different than the value of the mechanical property of the film element and different than the value of the mechanical property of the film body, and the value of the mechanical property of the film element is equal to the value of the mechanical property of the film body, or
the value of the mechanical property of the interface is different than the value of the mechanical property of the film element and different than the value of the mechanical property of the film body, and the value of the mechanical property of the film element is different than the value of the mechanical property of the film body, or
the value of the mechanical property of the interface is different than either the value of the mechanical property of the film element or the value of the mechanical property of the film body, and the value of the mechanical property of the film element is equal to the value of the mechanical property of the film body, or
the value of the mechanical property of the interface is different than either the value of the mechanical property of the film element or the value of the mechanical property of the film body, and the value of the mechanical property of the film element is different than the value of the mechanical property of the film body.

22. A non-fibrous film, having a film width, the non-fibrous film comprising:
a film body that is non-fibrous and that comprises:
film-body surfaces that face in opposite directions, and cavities; and
a film element, comprising blocks that are non-fibrous,
wherein:
each of the blocks has a film element outer surface that is flush with one of the film-body surfaces when the blocks are installed in the cavities,
each of the blocks is coupled to the film body at an interface that extends to one of the film-body surfaces,
the interface is non-continuous across the film width of the non-fibrous film,
the interface, the film element, and the film body each comprises a mechanical property, having a value, and
wherein:
the value of the mechanical property of the interface is different than the value of the mechanical property of the film element and different than the value of the mechanical property of the film body, and the value of the mechanical property of the film element is equal to the value of the mechanical property of the film body, or
the value of the mechanical property of the interface is different than the value of the mechanical property of the film element and different than the value of the mechanical property of the film body, and the value of the mechanical property of the film element is different than the value of the mechanical property of the film body, or
the value of the mechanical property of the interface is different than either the value of the mechanical property of the film element or the value of the mechanical property of the film body, and the value of the mechanical property of the film element is equal to the value of the mechanical property of the film body, or
the value of the mechanical property of the interface is different than either the value of the mechanical property of the film element or the value of the mechanical property of the film body, and the value of the mechanical property of the film element is different than the value of the mechanical property of the film body.

\* \* \* \* \*